(12) United States Patent
Akcasu

(10) Patent No.: US 12,235,660 B1
(45) Date of Patent: Feb. 25, 2025

(54) GUIDED ROCKET SYSTEM FOR THE NON-DESTRUCTIVE CAPTURE OF SLOW MOVING HIGH ALTITUDE OBJECTS

(71) Applicant: Akcasu Hypersonics, LLC, Cardiff-by-the-Sea, CA (US)

(72) Inventor: Osman Ersed Akcasu, Cardiff-by-the-Sea, CA (US)

(73) Assignee: Akcasa Hypersonics, LLC, Carlife by the Sea, CA (US)

( * ) Notice: Subject to any disclaimer, the term of this patent is extended or adjusted under 35 U.S.C. 154(b) by 0 days.

(21) Appl. No.: 18/507,452

(22) Filed: Nov. 13, 2023

(51) Int. Cl.
*G05D 1/689* (2024.01)
*B64G 1/00* (2006.01)

(52) U.S. Cl.
CPC ............. *G05D 1/689* (2024.01); *B64G 1/006* (2023.08)

(58) Field of Classification Search
None
See application file for complete search history.

(56) References Cited

U.S. PATENT DOCUMENTS

| | | | | |
|---|---|---|---|---|
| 6,626,077 | B1 * | 9/2003 | Gilbert | F41H 13/0006 102/504 |
| 2009/0224094 | A1 * | 9/2009 | Lachenmeier | B64U 70/20 244/31 |
| 2010/0181424 | A1 * | 7/2010 | Goossen | F41H 13/0006 244/110 F |
| 2018/0339793 | A1 * | 11/2018 | Chaudhary | B64G 1/625 |
| 2023/0204774 | A1 * | 6/2023 | Salter | B64U 20/83 356/4.01 |

OTHER PUBLICATIONS

First Research, "Guided Missile & Space Vehicle Manufacturing", quarterly update Mar. 14, 2016, Fort Mill, South Carolina (Year: 2016).*

* cited by examiner

*Primary Examiner* — Tamara L Weber
(74) *Attorney, Agent, or Firm* — Law Office of Gerald Maliszewski; Gerald Maliszewski

(57) ABSTRACT

A system and method are provided for the non-destructive takedown of a high-altitude aerial object. The method provides a thrusting rocket enabled with a takedown payload, which may be launched from either a ground based or airborne platform. The takedown payload acquires the altitude, motion, and position parameters of a high altitude aerial object and the rocket acquires a position overlying the aerial object. The takedown payload releases a first plurality of ballast units, attached to a capture net, downward in a capture pattern surrounding the aerial object. In response to releasing the ballast units, the top surface of the aerial object is covered with the capture net. Combining the mass of each ballast unit with the mass of the aerial object forms a combined mass, and in response to the combined mass, the aerial object altitude is decreased.

30 Claims, 25 Drawing Sheets

GUIDED ROCKET SYSTEM FOR THE NON-DESTRUCTIVE CAPTURE OF SLOW MOVING HIGH ALTITUDE OBJECTS

RELATED APPLICATIONS

Any and all applications, if any, for which a foreign or domestic priority claim is identified in the Application Data Sheet of the present application are hereby incorporated by reference under 37 CFR 1.57.

BACKGROUND OF THE INVENTION

Field of the Invention

Four high-altitude, unidentified balloon sightings and their tracking over North America between January 28 and Feb. 12, 2023, for the duration of 6 days, captured the top world news headlines and media attention. These sightings were branded as UAPs (Unidentified Aerial Phenomena), which is the new name for UFO (Unidentified Flying Object) by the US government. Since a non-destructive takedown capability didn't exist, the US Airforce shot four of them down, and tried to recover the debris and investigate the origins and capabilities of these UAPs. Efforts only succeeded in recovering one out of the four shoot-downs after a week of costly search and recovery effort. It is clear that the intelligence gathering capabilities of UAPs and the political value of having them recovered undamaged is more desirable than shooting them down.

The relevant published information on the 4 recent UAP sightings, in chronological order as reported by the media, is as follows. Initially spotted over Aleutian Island Chain, Alaska on Jan. 28, 2023 and tracked till Feb. 1, 2023 over Montana, the first balloon was shot down by an F-22 Raptor fighter aircraft firing an AIM-9X Sidewinder heat seeking air-to-air missile on Feb. 4, 2023, over the skies of Myrtle Beach, South Carolina traveling at 60,000-65,000 feet during its long flight over US Airspace. The data given to the media related to the balloon was vague, listing the "height" (sic, radius or diameter?) as approximately 200 feet with an estimated payload of 910 kilograms (kg, 2,000 pounds (lbs.)), also described as "three bus lengths" with 16 solar panels. But it is certain that the origin of the balloon was the PRC (People Republic of China) which was not denied by PRC and who claimed it to be "a weather balloon blown off-course by wind".

It was announced that the recovery of the debris of the balloon was completed on 17 Feb. 2023 from the depth of 47 feet deep in Atlantic waters off the coast of Myrtle Beach, South Carolina, 13 days after its downing. Luckily, the US military picked up a very good place to shoot it down for easy recovery operation with no collateral damage as it is announced by Lieutenant General Douglas Sims II on his TV announcement made in front of the Senate committee on 9 Feb. 2023 as "We think before we shoot." However, even the recovery of debris in shallow water is a very costly and time-consuming operation costing maybe in the order of millions of dollars pay day.

On Feb. 10, 2023, a balloon was shot down by an F-22 Raptor fighter aircraft firing an AIM-9X Sidewinder heat seeking air-to-air missile on Alaska's coast, at 40,000 feet. On Feb. 11, 2023, a balloon with a cylindrical payload was shot down by an F-22 Raptor fighter aircraft firing an AIM-9X Sidewinder heat seeking air-to-air missile over the Yukon Territory, Canada, at 40,000 feet.

On Feb. 12, 2023, a balloon was shot down by an F-16 Fighting Falcon fighter aircraft firing an AIM-9X Sidewinder heat seeking air-to-air missile over Lake Huron on the shores of Upper Peninsula, Michigan, at 20,000 feet. The balloon had an octagonal shape with strings hanging under it, having an unknown propulsion system. As a summary, there were 4 UAP shoot-down incidences in the 9-day period between Feb. 4, 2023, and Feb. 12, 2023, with only one recovered and the rest declared as unrecoverable.

The Department of Defense also noted that between 2016 and 2020 there were 3 suspected spy balloons from unknown origins that flew over the US airspace and were detected with no action or announcements made by the US military to shoot them down.

The headline news on the UAPs posing a possible threat in the US airspace continued into May of 2023 as follows. An NBC report dated May 2, 2023, stated "The U.S. military is tracking a high-altitude balloon that was observed off the coast of Hawaii over the weekend, officials said Monday. It was detected and observed floating at approximately 36,000 feet above the Pacific on April 28. It did not directly pass over sensitive sites or defense critical infrastructure, according to U.S. officials." The news media on May 3, 2023, reported that BlackSky, a US satellite firm, recorded footage of a 100-foot mysterious Chinese blimp at a military base in Xinjiang Province, China, recorded on November 2022.

It would be advantageous if there existed a non-destructive means of taking down and capturing high-altitude aerial objects such as the above-mentioned balloons.

SUMMARY OF THE INVENTION

Described herein is a solution for non-destructive and controlled takedown of high-altitude slow moving UAPs, instead of shooting them down. The systems described herein may be enabled using an airborne launched rocket system, such as the "Rapid Dragon" of Lockheed Martin/Airforce Research Laboratories, giving the system the ability of being a high mobility defense system defending a very large area with a limited number of takedown rockets [17-19]. Launching a rocket from a transport plane was first demonstrated when a Minuteman ICBM (Inter-Continental Ballistic Missile) which is 57 feet long, three stage 87,000 lbs solid fuel rocket was successfully air launched on Oct. 24, 1974, from a C-5 Galaxy transport plane [17, 18]. In addition, a fixed land-based launch capability may be established at key points.

The entire flight trajectory of the rocket system described herein, which may be referred to as the Kracken™ Rocket Deployed Web, is controlled by a sophisticated computer simulation program named the Rocket Flight Control Program. This program, among other tasks, solves the equation of motion in an inverse square gravitational field with air drag for a given rocket physical parameters, to perform a successful non-destructive takedown of the UAP of a given size and mass. The Rocket Flight Control Program is based on highly advanced work done on the Flight and Pilot programs as explained in [10-15].

Typical examples of simulated rocket designs and trajectories of takedowns are presented based on the altitude, mass, and the coordinate data of several slow moving targeted UAPs. The trajectory of the rocket reaches a predetermined peak point ($h_P$), or in other words an apogee that gives a decent ballistic trajectory passing through the top of the UAP at altitude $h_T$ above the UAP, with the UAP altitude being at $h_{Balloon}$ ($h_P = h_T + h_{Balloon}$). The downward momentum potential energy conversion from the height hr is less than the limits of the reaction control rocket guidance system. After minor coordinate adjustments to place it directly on the target, the rocket may launch a minimum of 3, and typically 5, rockets which are referred to herein as capture/web deployment rockets, decent rockets, or ballast rockets. In another example, independent ballast units are deployed from the apogee using high pressure gas discharge or compressed spring mechanisms. Returning to the first example, the ballast rockets are launched simultaneously from above the UAP, for example at the apogee point, with small equal angles, less than 135° with respect to the downward descent direction, pulling a high strength polymer web with a long enough chords to envelope the UAP securely by bringing the center of gravity below the original center of gravity after being fully deployed. The takedown system has an equivalent mass lower than the UAP center of mass. For a successful capture the diameter of the web must be larger than the target diameter (as seen from above), and the chords must be longer than the diameter of the balloon. If rockets are employed for deploying the web having equal mass ballasts $m_{ballast}$, the thrusts of the rockets are typically equal, and fired simultaneously, with equal burn times. If the equal ballasts are deployed by other means like compressed air or springs, they are typically launched with the same initial velocity to preserve symmetry of the takedown web with respect to the center of the balloon (as seen from above the balloon). Alternatively, ballast launch times and velocities may be modified to adjust for differences in the relative positions of the rocket and balloon. For example, a total mass of 1 ton may be calculated based on the largest mass that the system is designed to bring down non-destructively. Continuing the example, for a 3 ballast rocket guided web each rocket has $$\frac{m_{ballast}}{3} = 330[\text{kg}]$$

of ballast. For a 5 ballast rocket deployed web system each launchable ballast has $$\frac{m_{ballast}}{5} = 200 \ [\text{kg}]$$

of controllable ballast. The symmetry of the downward motion of the rocket driven web with respect to the center of the target balloon is important for the operation of the system.

A ballast mass control mechanism controls the descend rate and makes mass adjustments for stability of the UAP during takedown. The ballast may be water, sand, or small metal balls (e.g., ball bearings) for example, with a valve to decrease the combined mass of the takedown system. A giant squid or octopus with all its tentacles open and descending vertically towards the UAP is a good visual representation of the capture mechanism of the takedown system.

The web center has a radio communication module for command and telemetry functions between the takedown system and a central control station, and is referred to herein as the controller. The controller also acts to increase the stability of the descent phase due to its high mass density, as compared to the low density polymer web material. The system may also have a parachute attached to the controller for additional control of the descend speed, if needed.

A detailed system feasibility through advanced computer simulations is presented below showing that the takedown system can capture slow moving UAPs, (balloons or airships) with no size and altitude restrictions (100,000+ feet) non-destructively in a pre-determined area.

Accordingly, a method is provided for the non-destructive takedown of a high-altitude aerial object. The method provides a thrusting rocket enabled with a takedown payload, which may be launched from either a ground based or airborne platform. The takedown payload may be embedded, for example, in the nosecone of a single-stage rocket, or in the case of a two-stage rocket, embedded with the nosecone of the second stage. The takedown payload acquires altitude, motion, and position parameters of a high-altitude aerial object and the rocket acquires a position overlying the aerial object. The takedown payload releases a first plurality of ballast units attached to a capture net, downward in a circular capture pattern surrounding the aerial object. In response to releasing the ballast units, the top surface of the aerial object is covered with the capture net. Combining the mass of each ballast unit with the mass of the aerial object forms a combined mass, and in response to the combined mass, the aerial object altitude is decreased.

The rocket may acquire the position overlying the aerial object using a go-onto-target (GOT) guidance system to accept the aerial object altitude, position, and motion data, and use a reaction control system (RCS) to control the movement of the rocket in response to signals from the GOT. Typically, the GOT or payload controller is responsible for calculating the ballast unit release height between the takedown payload and the aerial object. For best results, the ballast units are released from the takedown payload at an angle of 135 degrees, or less, with respect to the downward vertical direction (towards the center of the earth). The ballast units are released using a mechanism such as compressed springs or gas discharge firing, or using attached ballast rockets as mentioned above.

The method also determines the aerial object altitude decent rate (with the takedown system attached to the aerial object), compares the aerial object altitude decent rate to a desired altitude decent rate, and supplies a ballast management signal in response to the comparison. This comparison may be based on a predetermined calculation or an in-situ measurement. The ballast units include a divisible default mass, and if the controller determines that the decent rate is too great, ballast mass can be vented from the ballast units in response to the ballast management signal, and the combined mass is diminished in response to venting the ballast. As a result, the decent rate can be controlled using a predetermined mass estimation or a calculation based upon altitude, velocity, and acceleration measurements. In some aspects the takedown payload may include a takedown payload parachute that can be deployed in response to comparing the aerial object altitude decent rate to a desired altitude decent rate, and so used to diminish the combined mass if necessary. Alternatively or in addition, the takedown payload may further include a takedown payload harpoon. In the case of the aerial object being a lighter than air gas inflated balloon, the harpoon can be launched at the balloon in response to comparing the aerial object altitude decent rate to a desired altitude decent rate so that the combined mass is increased.

Additional details of the above described method and a takedown system for the non-destructive capture of high-altitude aerial objects is provided below.

DETAILED DESCRIPTION i. The Problem to be Solved.

Although balloons and airships are the earliest form of flying, they remain as one of the best airborne platforms for electronic and optical intelligence/surveillance due to their long endurance, as they are capable of maintaining even a stationary position in the air, especially as compared to other air and space reconnaissance alternatives. In satellite photo reconnaissance, the hundreds of miles of altitude and very high orbital speeds required to keep them in their orbit, often mean that the spy satellites can only stay over their desired target for a very short time. This problem can be quantified by showing the orbital speeds needed to stay in an orbit at a given altitude.

Figure 1A:
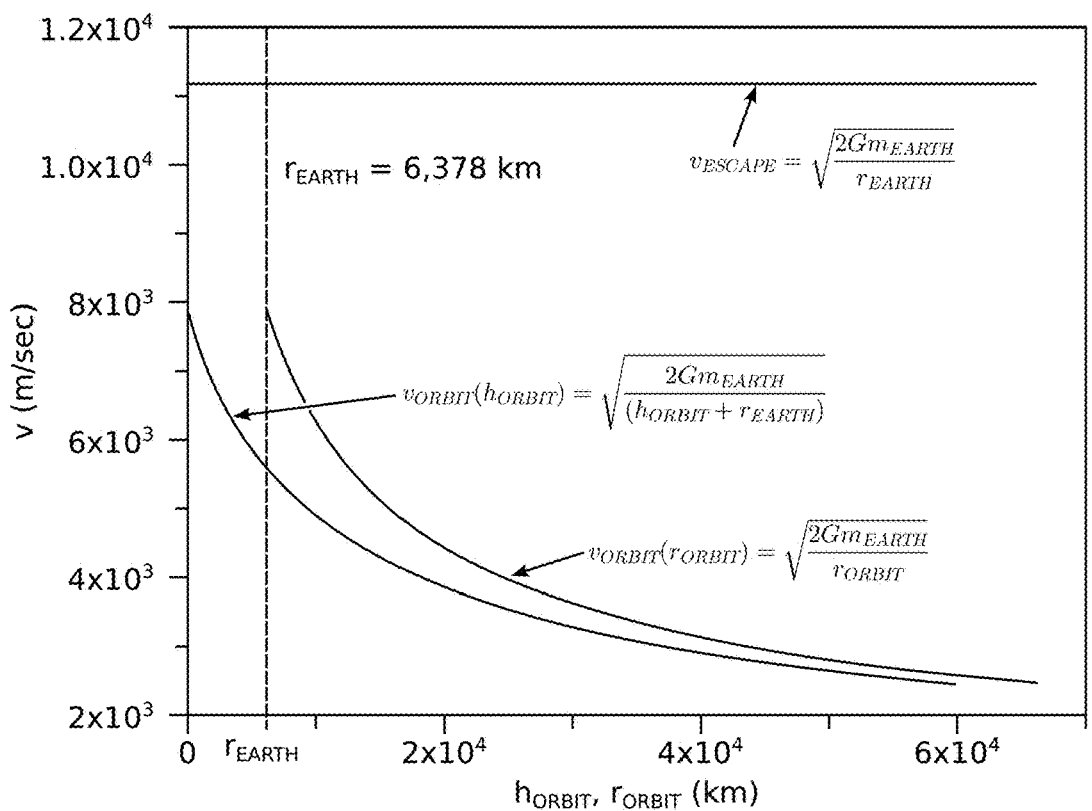
FIG. 1A depicts the orbital speed in [m/s] (meter per second) versus radius measured with respect to the stationary coordinate system where its origin is in the center of Earth and altitude measured from sea level.

FIG. 1A depicts the orbital speed in [m/s] (meter per second) versus radius measured with respect to the stationary coordinate system where its origin is in the center of Earth and altitude measured from sea level.

Figure 1B:
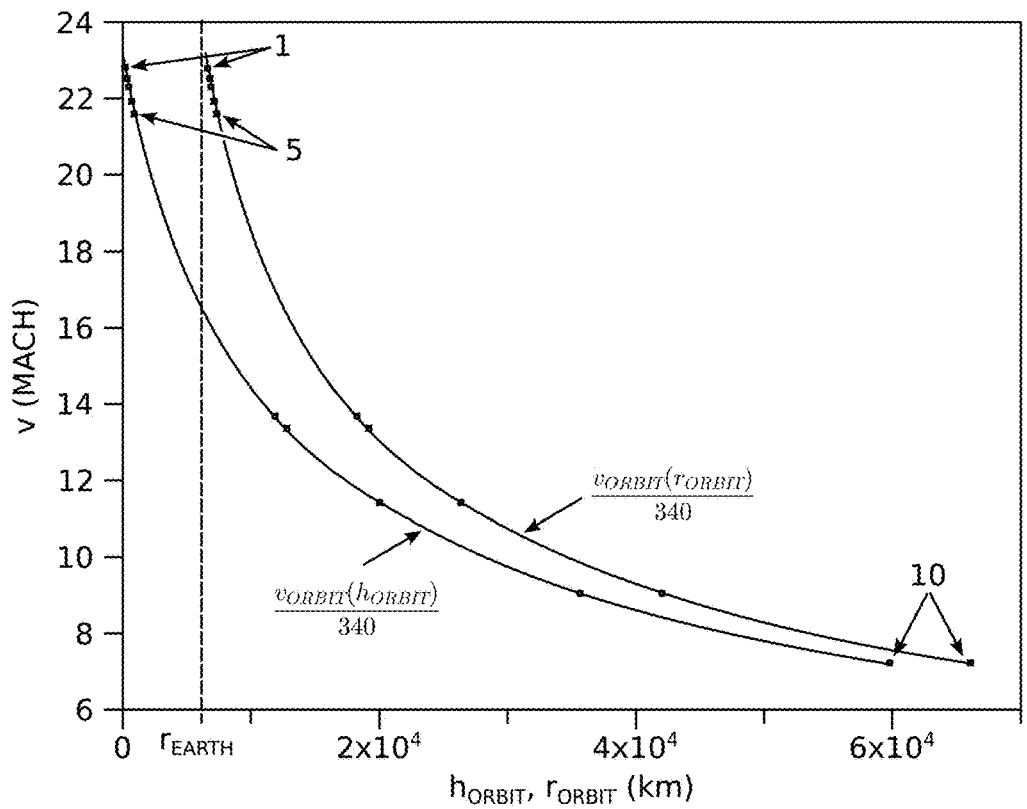
FIG. 1B depicts the orbital speed in Mach number, versus radius measured with respect to the stationary coordinate system where its origin is in the center of Earth and altitude measured from sea level, where 1 Mach is speed of sound at sea level, 1 Mach=340 [m/s] and the numbers 1, 5, and 10 correspond to the row numbers in Table 1.

FIG. 1B depicts the orbital speed in Mach number, versus radius measured with respect to the stationary coordinate system where its origin is in the center of Earth and altitude measured from sea level, where 1 Mach is speed of sound at sea level (1 Mach=340 [m/s]) and the numbers 1, 5, and 10 correspond to the row numbers in Table 1. As is conventional, speed is represented herein as a Mach number. One of the early questions to be explored in rocketry was to determine if rocket propulsion could generate velocities sufficient to put an object into orbit, or sufficient to create an escape velocity $v_{ESCAPE}$ from the Earth. To illustrate, escape velocity $v_{ESCAPE}$ is shown superimposed in FIGS. 1A and 1B.

Figure 1C:
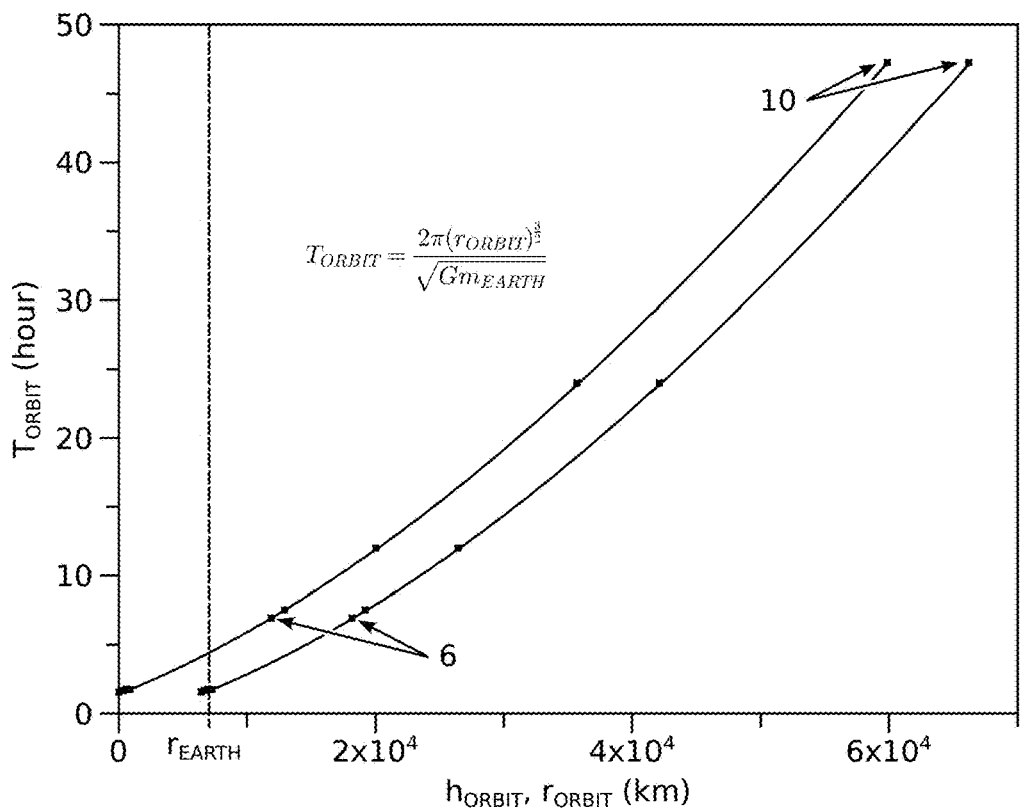
FIG. 1C depicts the orbital period in hours versus radius measured with respect to the stationary coordinate system where its origin is in the center of Earth and altitude measured from sea level.

FIG. 1C depicts the orbital period in hours versus radius measured with respect to the stationary coordinate system where its origin is in the center of Earth and altitude measured from sea level. This is a way of presenting the extreme hypersonic speeds needed for putting a satellite into orbit in terms of orbital periods. For low Earth orbits (LEOs) the orbital periods are on the order of 90 minutes, meaning that satellites in LEOs rotate around the Earth every hour or two. The orbital periods of some well-known satellites are given in Table 1, with related data.

A list of some orbital radiuses of well-known satellites and Van Allen Radiation Belts are presented in Table 1. These orbital radiuses between the Earth and the Moon, along with orbital periods, velocities, their orbital masses, and free fall times to the Earth surface, are calculated by the analytical formula given in [4, 5] from the orbits that are presented in table. These orbitals are marked on the curves in FIG. 1B, FIG. 1C, and FIG. 2B.

| Satellite or critical Distances Between Earth and the Moon | Altitude[km]/mass[kg] | Free Fall time to Sea Level with no air resistance [minutes] and $g/g_0$ | Orbital Period [Hour] | Orbital Velocity [m/sec]/ [Mach] |
| --- | --- | --- | --- | --- |
| 1 | 255/1,000 | 37.23/0.9246 | 1.49 | 7,751/22.8 |
| 2 | 400/Multiple Launches | 38.75/0.8854 | 1.54 | 6,668/22.55 |
| 3 | 540/11,110 | 40.22/0.8499 | 1.59 | 7,590/22.32 |
| 4 | 781/689 | 42.78/0.7937 | 1.67 | 7,461/21.94 |

-continued

| Satellite or critical Distances Between Earth and the Moon | Altitude[km]/mass[kg] | Free Fall time to Sea Level with no air resistance [minutes] and $g/g_0$ | Orbital Period [Hour] | Orbital Velocity [m/sec]/ [Mach] |
| --- | --- | --- | --- | --- |
| 5 | 20,200/1,630 | 352.8/0.05758 | 11.98 | 3,872/11.39 |
| 6 | 35,786/4,276 | 711.6/0.02288 | 23.94 | 3,074/9.04 |
| 7 | 1,000 (~0.2 $r_{EARTH}$)/NA | 45.17/0.7472 | 1.75 | 7,350/21.62 |
| 8 | 12,000 (~2 $r_{EARTH}$)/NA | 200/0.12 | 6.89 | 4,657/13.70 |
| 9 | 13,000 (~3 $r_{EARTH}$)/NA | 217/0.1083 | 7.46 | 4,535/13.34 |
| 10 | 60,000 (~10 $r_{EARTH}$)/NA | 1,412/0.00923 | 47.28 | 2,450/7.21 |

TABLE 1. Some Satellite altitudes and critical distances between the Earth and Moon along with orbital periods, velocities, typical orbital masses, calculated fall times to Earth, and the ratio of the gravitational acceleration ratio to the $g_0$ at the Earth's surface.

i. Geo-Synchronous: Latest Geo-Synchronous satellite.
  ii. Inner Van Allen (Min): Lower altitude of the Van Allen inner radiation belt, due to interaction between Earth's magnetic field and incoming high speed charged particles, mainly from the sun.
  iii. Inner Van Allen (Max): Higher altitude of the Van Allen inner radiation belt.
  iv. Outer Van Allen (Min): Lower altitude of the Van Allen outer radiation belt.
  v. Outer Van Allen (Max): Higher altitude of the Van Allen outer radiation belt.

Included in the table are the GOCE 1,000 kg ESA Gravity Field and Steady-State Ocean Circulation Explorer, Iridium 689 kg, Hubble 11,110 kg, GPS Block 11F 1,630 kg, Latest Geo-Synchronous satellite 4,276 kg. The Van Allen belts are radiation belts surrounding the Earth due to interaction between Earth's magnetic field and incoming high speed charged particles, mainly from the sun.

Further, very advanced optics and electronics are required for a good enough high-resolution image. On the other hand, the balloons and airships can maintain a high enough altitude to be relatively immune to fighter aircraft and SAM (Surface to Air Missile) attack and take very high-resolution reconnaissance photos with relatively less sophisticated optics and electronics. In addition to these advantages, balloons and airships can even adjust their altitude easily, which can be very advantageous in their mission and their survivability against threats. These same advantages can accrue to any type of balloon electronic surveillance.

2. Aerial Intelligence Gathering.

The increased speed and payload of post-First World War aircraft created a serious concern that an adversarial air force could pose a threat in a future war in England, as well as for other the major powers such as Germany, USA. Soviet Union, Japan, and Holland. Since the mid 1930's Britain had been secretly using electromagnetic waves to develop the first early warning radar network under the direction of Sir Robert Watson-Watt working at the National Physical Laboratory. Bawdsey Manor, an old English mansion in Suffolk, which dates back to 1886 on the eastern coast line of England, was taken over in March 1936 by the Air Ministry for developing the Chain Home radar system. Its first superintendent was Sir Robert Watson-Watt, followed by A. P. Rowe, and the Bawdsey Manor name changed later to Royal Air Force (RAF) Bawdsey, housing the first Chain Home radar station 200 yards from the manor. Coastal radar systems went into continuous service in the spring of 1938.

By September 1939, there were 21 radar stations along the majority of Britain's south and east coast, establishing the Chain Home system. The Chain Home pulsed radar system detected aircraft out to 200 [km], 120 miles, flying at altitudes of 1,000-25,000 feet, providing roughly 20 minutes of warning from German aircraft. The Chain Home system looked very different than today's radars. A three in-line 110 [m] (360 ft) steel transmitter tower, with transmitting aerials suspended between and four 73 [m] (240 ft) wooden receiver towers placed in a square, made up each station operating at 20-60 MHz giving 5.15 [m] wavelength with an output power of 100 kilowatts [kW]-1 megawatt [MW].

Roughly at the same time in 1939 the Germans were also developing radar systems of their own, known as the Freya and Würzburg systems. Freya was also a pulsed radar, developed mainly for the German Navy, operating at 250 MHz having a 1.2 meter [m] (3.9 ft.) wavelength with an output power of 20 kW. This allowed Freya to use a much smaller antenna system, one that was easier to rotate, move, and position, and able to detect smaller targets with better precision. The Würzburg system was a newer radar system with a 3 [m] diameter parabolic reflector antenna operating at 560 MHz with an output power of 7-11 [kW] of power. Unaware of the British work, the Germans were interested in finding out if the British bad similar capabilities after observing the "mysterious" 110 [m] steel towers of the Chain Home antennas on the British coast.

Gathering intelligence on whether Britain was using the electromagnetic spectrum for communications, navigation, and radar somehow using these mysterious towers became a priority for the Luftwaffe Intelligence. As explained earlier, an airship or a balloon is very suitable for electronic intelligence due to its long endurance and being capable of maintaining a stationary position in the air for electronic espionage. The German airship Graf Zeppelin II (D-LZ130) was modified for this purpose. The Graf Zeppelin II (D-LZ130) was virtually identical to the 245 [m] (804 ft.) long Hindenburg (D-LZ129), which burned during its landing on May 6, 1937, Lakehurst, New Jersey. Therefore, it was a target easily detected by the Chain Home radar network. On 12 Jul. 1939 the German airship Graf Zeppelin II (D-LZ130) with high-frequency receivers installed and an aerial array rigged underneath the gondola with General Martini on board, set course for the RAF Bawdsey research station [16]. After some radio intelligence it turned north and flew parallel to the British east coast all the way north to Hull. Nothing was detected by the airship, but the airship itself was detected by Chain Home. Over the Humber Estuary the Graf Zeppelin II transmitted a position report back to Germany stating it was off the coast of Yorkshire. This was a navigational mistake, as its actual position was over Hull. The airship then turned back to Germany on the $14^{th}$ of July. This 45-hour airborne electromagnetic intelligence gathering by searching the radio spectrum for potential enemy signals, as a prelude to countering them, was the world's first recorded radio espionage. The airship picked up radar signals from Britain's Chain Home system, but in a stroke of luck, discredited the signals, believing that they had come from a station in Germany. It is also important to note that Britain's newly erected Chain Home radar network was tracking Zeppelin's every move and keeping the tracking secret so that Germans would be kept in the dark.

On the evening of the 2 Aug. 1939, with a 45 person crew, 28 personnel engaged in the second and final radio signal measurements carried out aboard the Graf Zeppelin II. This time the airship flew northwards close to the British east coast all the way north to the Shetland Isles and back. The 48 hours and 4,203 km (2,612 mi) surveillance mission was the longest trip the LZ 130 ever made. It even involved stopping the engines at Aberdeen pretending they had engine failure to investigate the strange antenna masts. They drifted freely westwards over land and some unconfirmed accounts claim that they were intercepted by the new Supermarine Spitfires, which were then photographed as they circled the airship. The last sighting from the ground of the LZ 130 was by the lighthouse keeper of Girdle Ness Lighthouse who was surprised to see the airship overhead at below 1,000 feet. LZ 130 cruised on up to the Scapa Flow naval base, in Orkney Islands catching glimpses of British warships through the clouds and returned back on the 4 Aug. 1939.

Electronic intelligence was also performed by the British. In February 1942, a Würzburg-A system at Bruneval, on the Atlantic coast of France was captured and taken back to Britain by the British Commandos under the command of Major John Frost in a daring commando raid named "Operation Biting". Frost became a legendary figure in the Parachute Regiment of the British Army and became the commander of the 2nd Parachute Battalion and was later captured by the Germans in the Battle of Arnhem, in the ill-fated operation "Market Garden" of September 1944. These historical events are very good examples showing the importance of capturing the electronic equipment used by the enemy rather than just destroying it.

Today, electronic intelligence continues among sophisticated and capable adversaries in a far more advanced form by using balloons, drones, blimps, aircraft, and satellites carrying very sophisticated electronics. Although balloons and blimps are the oldest form of flight, they have many advantages over the latest means of air or space surveillance. They can stay much longer over a designated area and, since they can maintain much lower altitudes compared to satellites, the information that they can gather in the optical, infrared, and radio spectrums is more complete. In doing this task they have to maintain a safe altitude, higher than fighter aircraft can operate, at a ceiling or 45,000 feet and above, which is easily achievable with a balloon or a blimp. As an example, disposable weather balloons are a basic commodity item made from latex. They are launched from 900-1,300 locations around the globe, 2-4 times a day, can reach 100,000 [feet] (30 [km]) with payloads in the order of 3-6 [lbs.], and they are 6-20 [feet] in diameter. In the largest size range, NASA's highest flying "zero-pressure" giant 60 million cubic foot balloon "Big 60" broke an altitude record of 159,000 [feet] (48,500 [m]) in 2018. It can also lift 2,000 [kg] of payload. This record was possible by using ultra-thin polyethylene skin with a thickness less than kitchen plastic wrap (8-10 [μ] thick), when unfolded covering 20 acres of land.

Governments do not feel secure if their airspace is violated by any type of a UAP, but shooting them down by fighter aircraft using standard air-to-air missiles can be very difficult, if not impossible, when the UAPs operate at or above the 90,000+ feet range. Each AIM-9X costs roughly $400,000-$500,000 with a range of 0.6 to 35 km, depending on the altitude differences between the launcher and the target. Using the Table 2 (2016) numbers with a 2× cost adjustment, the 2023 hourly operating cost for F-22 is approximately $70,000 compared to $16,000 for a F-16 and $60,000 for F-35. For comparison, November 2022 figures show a $9,000 hourly operating cost for a medium size commercial plane like Airbus A320 or Boeing 737, which can carry 140-180 passengers [6, 7]. As mentioned above, the search and recovery cost of missile-intercepted debris is in the millions per day and recovery is not a sure thing either, as in the case of 3 of 4 Chinese balloon shoot-downs. The capability of capturing and controlling the takedown of a UAP without damaging it is worth more to the military than shooting it down destructively and later picking up the pieces.

TABLE 2

Hourly Operating cost of U.S. Military Aircraft.

| U.S. Military Aircraft in Use | Hourly Operating Cost Per Hour (2016 Figures in U.S. $) |
|---|---|
| F-22 | 35,000 |
| F-35 | 29,000 |
| F-15 | 24,000 |
| F-18 | 11,000 |
| F-16 | 8,000 |
| A-10 | 6,200 |
| P-3 | 8,000 |
| C-130 | 7,000 |

It is logical to expect the 2023 figures to be twice as great as the figures shown in Table 2 [6, 7].

2.1. The Takedown System Goal.

The takedown system described herein is designed to be a low cost country-wide defense system; therefore, it can be an airborne launched rocket system launched from a cheaper hourly operating cost airborne platform like the C-130 or C-17 flying at lower altitudes like at 10,000-20,000 feet with a range of 2,000 miles and a payload less than 40,000 lbs. In the examples below the takedown system is typically described using a 2-stage rocket, with the takedown payload of the second stage performing the capture of the UAP.

Before beginning any takedown system design, the expected physical qualities of the UAP must be determined, such as its mass, volume, radius, and expected altitudes. Taking the Chinese reconnaissance balloon as an example, the UAP can be assumed to be a balloon, with its mass being in the order of 2,000 lbs. flying at 60,000 feet as published. Safeguarding the feasibility of the takedown system design to altitudes of 100,000+ feet and payloads of 3,000 kg, the size of the balloon can be estimated as a function of its payload and altitude.

3. Balloon Fundamentals.

The Archimedean buoyancy of air, in other words lift $F_{LIFT}$ for a balloon is due to the difference in the gas density filling the balloon and the air density surrounding it at any given altitude given as, $$F_{LIFT}=gV(\rho_{Air}-\rho_{GAS}) \quad (3.1)$$

where g, V, $\rho_{Air}$, $\rho_{GAS}$ are the Earth's gravitational acceleration in [m/s$^2$], volume of the balloon in m$^3$, the air density at the altitude [kg/m$^3$], and the density of the gas in the balloon in [kg/m$^3$] respectively. The most common gases used in high altitude balloons are and Hydrogen (H$_2$) and Helium (He), being gases having the two smallest densities of 0.08988 [kg/m$^3$] and 0.16 [kg/m$^3$] respectively. Compared to the air density of 1.275 [kg/m$^3$] at room temperature and pressure, the density ratios are 14.185 and 7.96 times less for (H$_2$) and Helium (He) respectively.

Writing (3.1) for a Helium filled balloon employing $\rho_{He/Air}$ gives, $$F_{LIFT}=gV(\rho_{Air}-\rho_{Air}\cdot\rho_{He/Air}) \quad (3.2)$$

Air temperature, density, viscosity, and speed of sound as a function altitude in the earth's atmosphere are well known and characterized quantities and several close-fit analytical formulations are widely used [8, 14, 15]. For analysis simplicity it is assumed that He density changes the same as the air density as a function of altitude. For now, it is also assumed that the Earth's gravitational acceleration is also a function of altitude h, which can be represented by g(h).

Figure 1D:
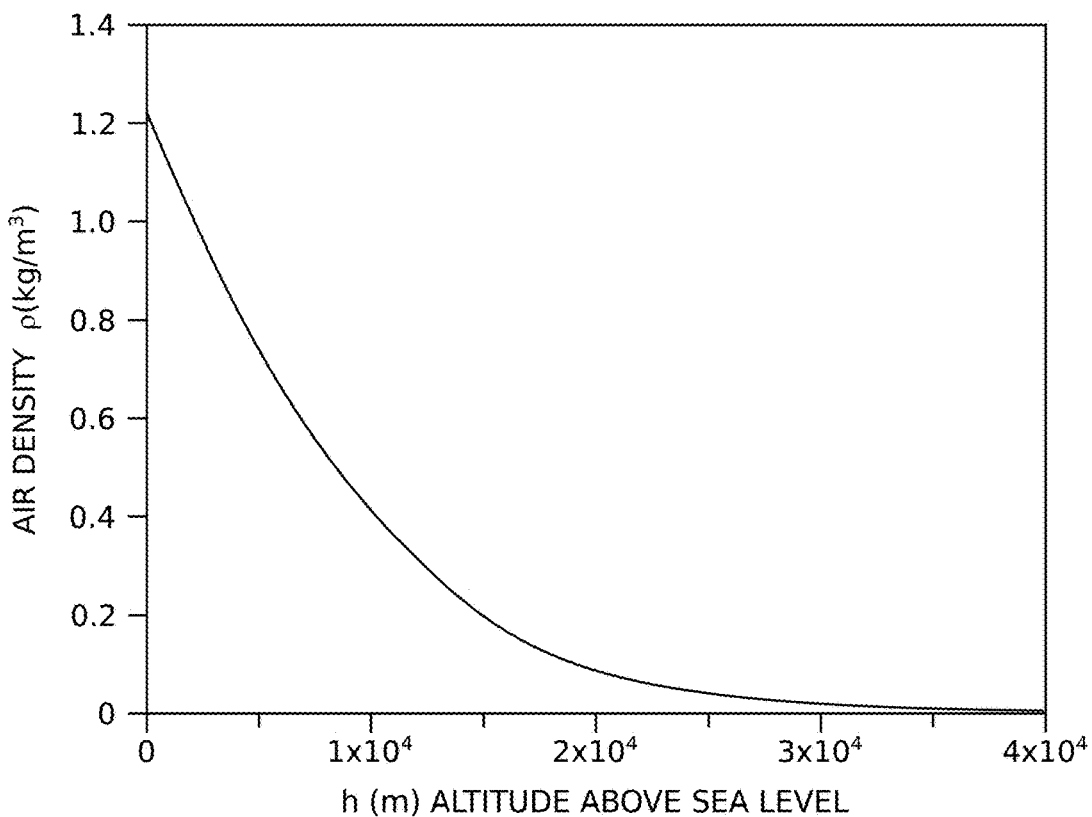
FIG. 1D depicts the density of air as a function of altitude.

FIG. 1D depicts the density of air as a function of altitude. Assuming He density behaves the same way as air as a function of altitude, the altitude dependent lift can be approximated as, $$F_{LIFT}(h)=g(h)\cdot\rho_{Air}(h)\cdot(1-\rho_{He/Air})\cdot V \quad (3.3)$$

Figure 2A:
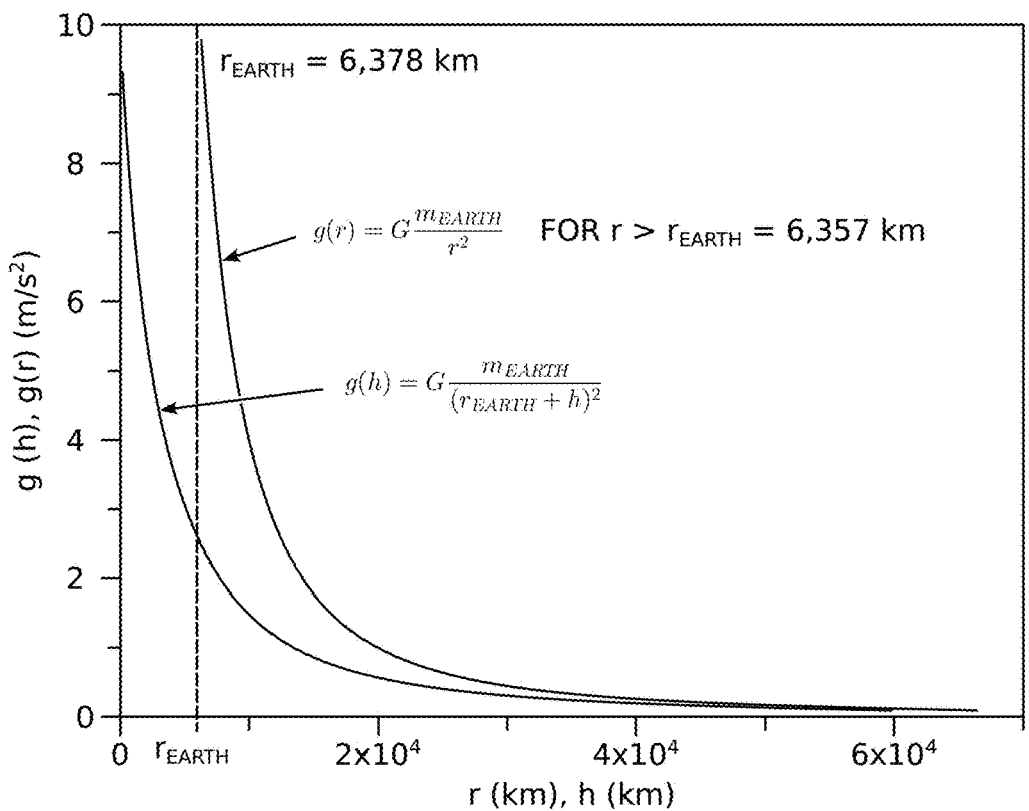
FIG. 2A depicts the gravitational acceleration g(h) as function of altitude h from sea level and distance from the earth's centered radius g(r) where $r=h+r_{EARTH}$ for $r \geq h+r_{EARTH}$.

FIG. 2A depicts the gravitational acceleration g(h) as function of altitude h from sea level and distance from the Earth's centered radius g(r) where $r=h+r_{EARTH}$ for $r\geq h+r_{EARTH}$. The figure shows altitude distances even further than the GPS and geosynchronous satellite orbitals, which are at 20,200 [km] and 35,786 [km] away from Earth's surface respectively.

Figure 2B:
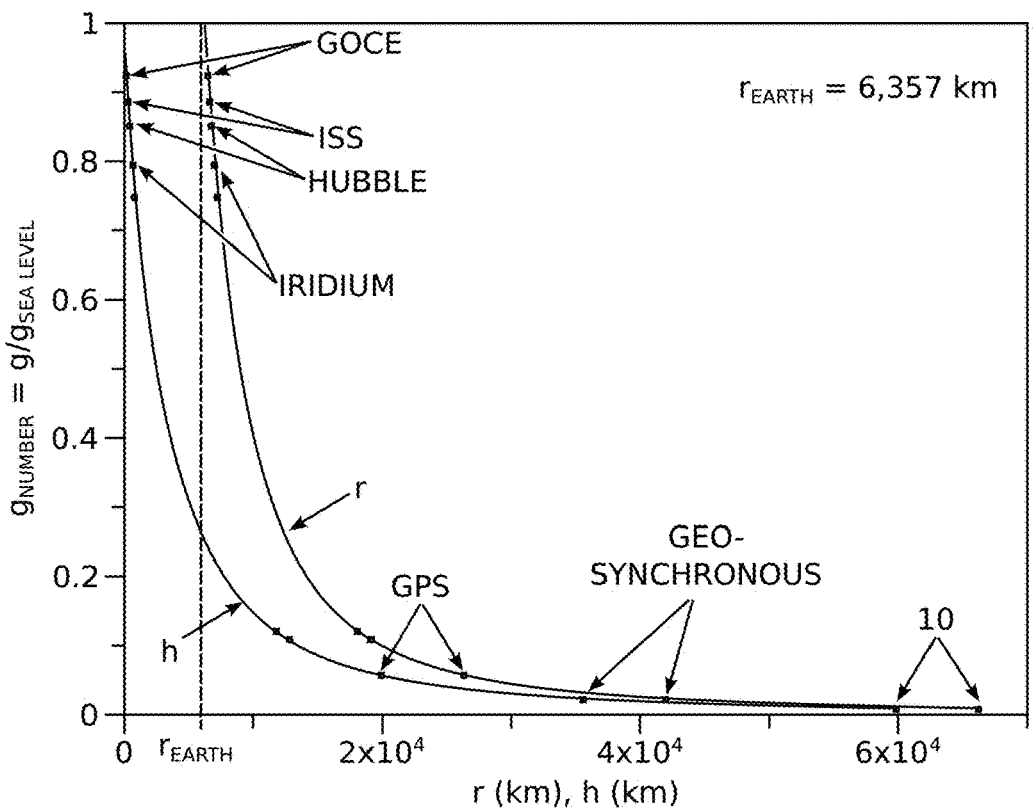
FIG. 2B depicts the gravitational acceleration normalized to its sea level value as a function of altitude g(h) and the distance from the Earth's centered radius r, where g(r) is the radius of the Earth taken at the equatorial radius of $r_{EARTH}=6,378$ km.

FIG. 2B depicts the gravitational acceleration normalized to its sea level value as a function of altitude g(h) and the distance from the Earth's centered radius r, where g(r) is the radius of the Earth taken at the equatorial radius of $r_{EARTH}=6,378$ km.

Figure 2C:
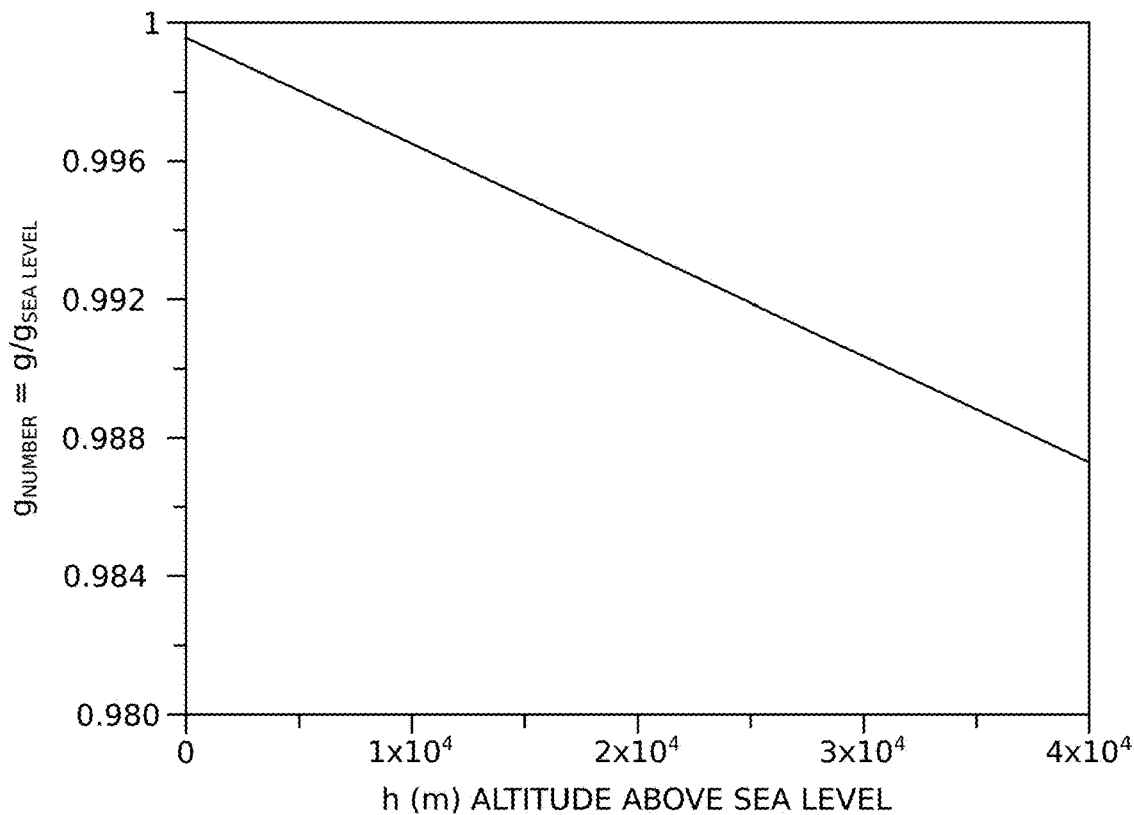
FIG. 2C depicts the gravitational acceleration normalized to its sea level value as a function of altitude g(h) up to 40,000 meters (120,000 feet).

FIG. 2C depicts the gravitational acceleration normalized to its sea level value as a function of altitude g(h) up to 40,000 meters (120,000 feet). As can be seen in FIG. 2C the variation of the gravitational acceleration as a function of altitude g(h) is very insignificant in the range of altitudes and can be assumed as a constant in the calculations below.

Assuming the balloon is spherical with a radius of r and made of Nylon with a density of 800 [kg/m$^3$] and a thickness of Nylon represented by $\rho_{Nylon}$ and $t_{Nylon}$ with a payload of $m_{Pay}$, the force equilibrium equation as a function of altitude can be written as, $$g(h)\pi\left[\frac{4}{3}r^3\rho_{Air}(h)(1-\rho_{He/Air})-4r^2 t_{Nylon}\rho_{Nylon}\right]-g(h)m_{Pay}=0 \quad (3.4)$$

As can be seen in (3.4) the g(h) term vanishes, giving a third order equation in terms of r which needs to be solved to calculate the radius r for a given payload $m_{Pay}$. To solve the third order equation (3.4) in terms of r, first it must be converted to its standard form written as [23, 24], $$r^3+C_1 r^2+C_2 r+C_3=0 \quad (3.5)$$

This is done by dividing all the coefficients of (3.4) by the coefficient in front of the r$^3$ term giving, $$C_1=-\frac{3 t_{Nylon}\rho_{Nylon}}{\rho_{Air}(h)(1-\rho_{He/Air})} \quad C_2=0 \quad C_3=-\frac{m_{Pay}}{\rho_{Air}(h)(1-\rho_{He/Air})\pi} \quad (3.6)$$

Since the density of He is always less than the density of air in in any altitude, $$C_1, C_3<0 \text{ for } (1-\rho_{He/Air})>0 \quad (3.7)$$

Therefore, the roots of equation (3.4) always give one real and two complex conjugate roots [23, 24]. Since radius is a real quantity, the only real root of (3.4) gives a physically meaningful solution. The mass of the enclosure of the balloon can be ignored in (3.4) by setting, $$t_{Nylon}\rho_{Nylon}=0 \text{ giving } C_1=C_2=0 \quad (3.8)$$

For this case the solution of (3.4) can be given by the simple cube root relation, $$r(h) \cong \left[ \frac{m_{Pay}}{\frac{4}{3}\pi \rho_{Air}(h)(1-\rho_{He/Air})} \right]^{\frac{1}{3}} \quad (3.9)$$

As can be seen in (3.4) and its simplified version, ignoring the weight of the balloon material, the balloon radius for a given payload is also a function of the altitude. In the detection stage of the balloon, its payload and the total weight of it can be approximately calculated by its measured radius and altitude by solving (3.4) for any gas.

Figure 3A:
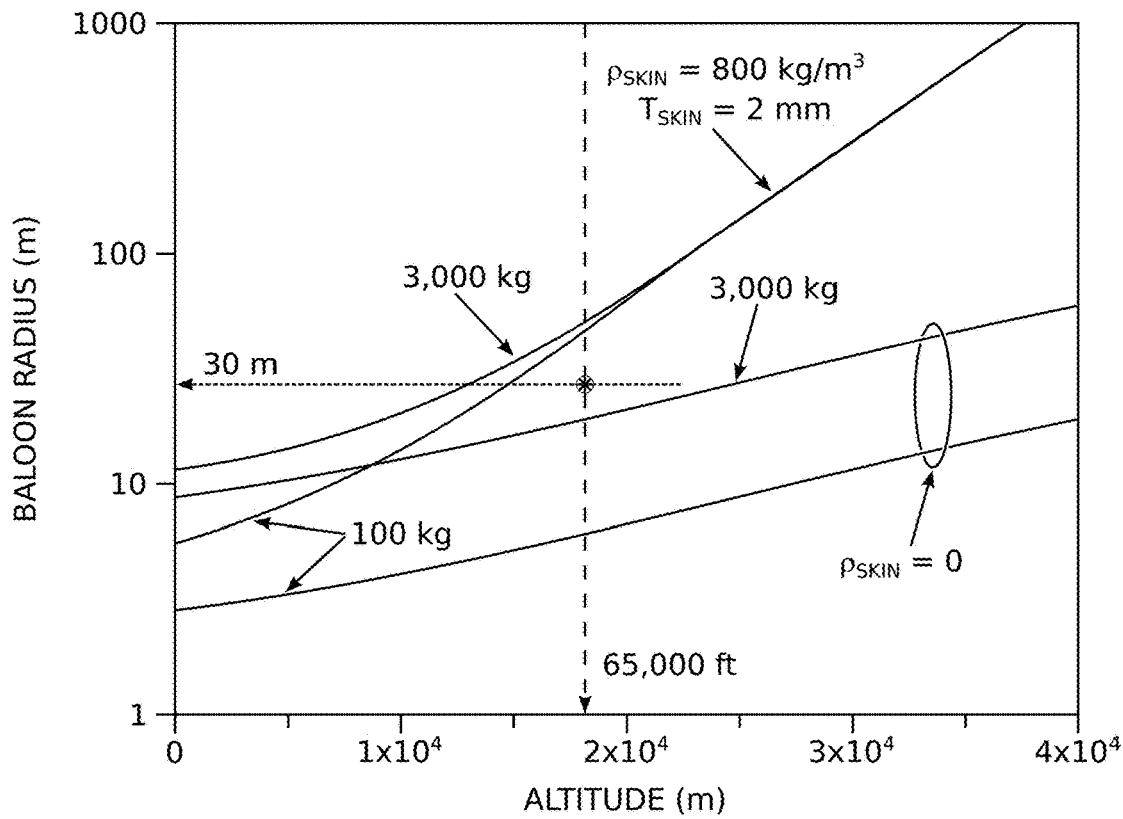
FIG. 3A depicts the radius r of the balloon as a function of altitude for $m_{Pay}=100$ and 3,000 [kg] with and without the mass of the balloon skin taken into consideration.

FIG. 3A depicts the radius of the balloon as a function of altitude for $m_{Pay}$=100 and 3,000 [kg] with and without the mass of the balloon skin taken into consideration. The balloon skin being modeled has a thickness of 2 mm and is made from a nylon material with a density of ($\rho_{skin}$) of 800 kg/m$^3$.

Figure 3B:
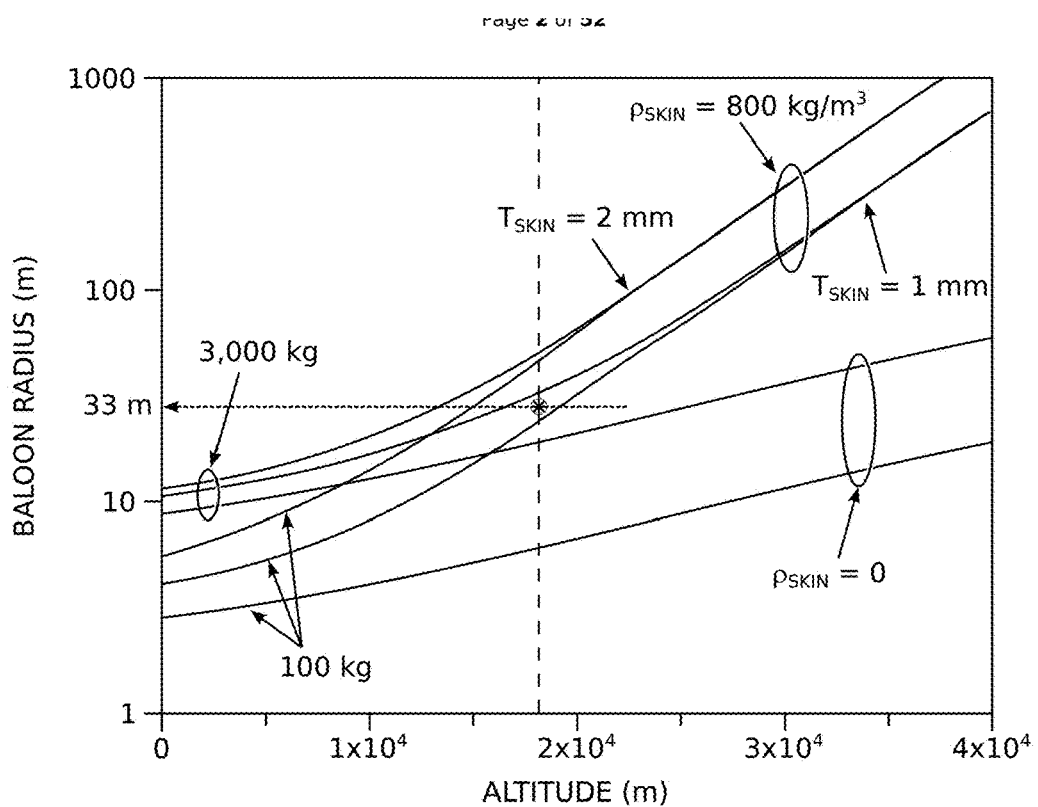
FIG. 3B depicts the radius r of the balloon as a function of altitude for $m_{Pay}=100$ and 3,000 kg.

FIG. 3B depicts the radius r of the balloon as a function of altitude for $m_{Pay}$=100 and 3,000 kg. The figure compares balloon skin thicknesses of 1 and 2 mm, made from nylon with a density of ($\rho_{skin}$) of 800 kg/m$^3$.

Figure 3C:
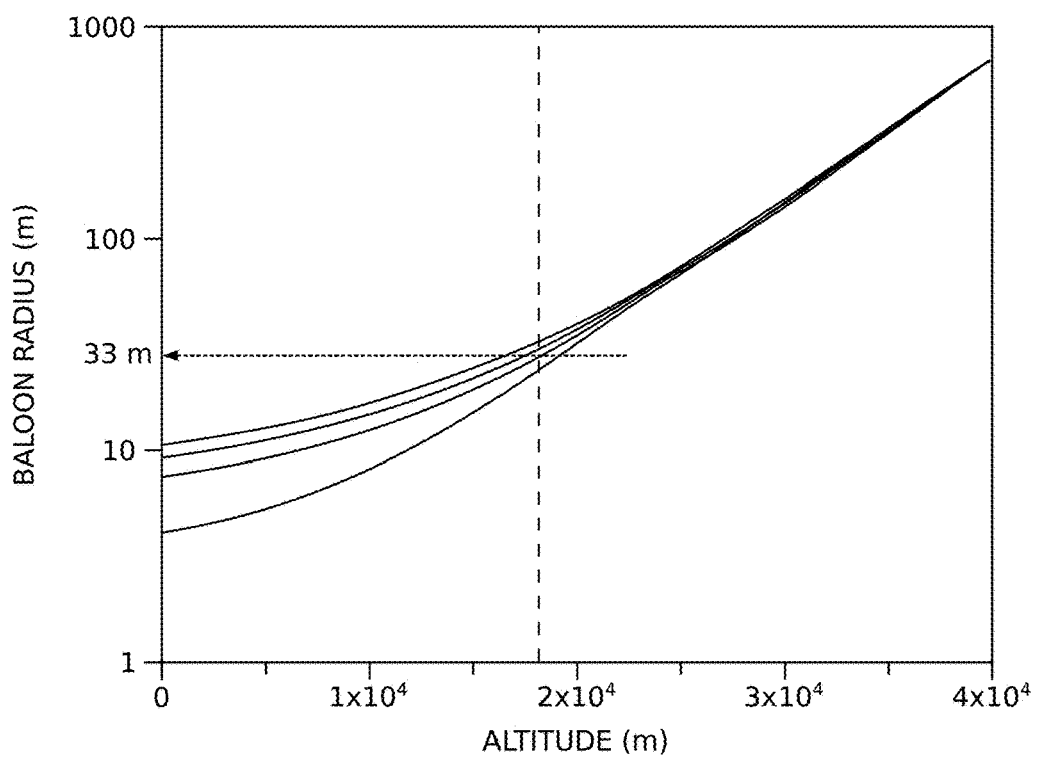
FIG. 3C depicts the radius of the balloon at payloads of 100 [kg] and 3000 [kg] with a skin thickness of 1 [mm].

FIG. 3C depicts the radius of the balloon at payloads of 100 [kg] and 3000 [kg] with a skin thickness of 1 [mm].

The vertical line in FIG. 3A and FIG. 3B corresponds to the Chinese balloon at 60,000 feet with a payload of approximately 2,000 [lbs.]. The "height" of the balloon was reported as 200 feet. Assuming the balloon was a sphere, then its diameter would be approximately 66 meters giving its radius as 33 meters. The horizontal dashed lines in FIG. 3A and FIG. 3B correspond to 33 meters. As can be seen, the 2 [mm] skin thickness curves in FIG. 3A do not show a good fit for any payloads, but in FIG. 3B a skin thickness of 1 mm has an excellent fit with 1,000 [kg] of payload.

As can be seen, the payload of a balloon can be estimated from its altitude, and some basic assumptions concerning the skin construction and its diameter, using a cubic equation which is important information for a non-destructive take down.

As can be seen in FIG. 3B it is possible to build balloons reaching much higher altitudes than even the service ceiling of the most modern fighter aircraft like the F-22 Raptor, which has a service ceiling of 20,000 meters (65,000 feet) with limited maneuverability. Thus, the takedown altitudes of the balloons can be high, making the design of a takedown system challenging.

The balloon gas density calculations can be more generalized and will be useful in Section 7 where some basic rocket fuel and oxidizer calculations are given. Modifying the well-known ideal gas law, $$PV=nRT \quad (3.10)$$

Or more conveniently written as, $$PVM=mRT \quad (3.11)$$

Where P, V, n, R, T, m and M are pressure, volume, mol, ideal gas constant, temperature, mass of the gas, and molecular mass respectively. Dividing both sides of (3.11) with V gives the ideal gas law as, $$PM = \frac{m}{V}RT = \rho RT \quad (3.12)$$

Where $\rho$ is the density of the gas which leads to the gas density formula, $$\rho = \frac{PM}{RT} \quad (3.13)$$

Gases related to this work are $H_2$, $N_2$, $O_2$, $CO_2$ and He. Molecular masses M for these gases can be calculated based on their atomic masses giving approximately 2, 28, 32, 44 and 4 [gr/mol] respectively.

Since the system described herein may employ rockets for the takedown process, possibly in two stages, it is important to have insights into rocket propulsion as a vehicle to launch a given payload to a given altitude and guide the descent of the takedown stage over the target. All the trajectory calculations are done by a simulator named GOT using the 4th order Runge-Kutta method solving the equation of motion in a gravitational field obeying an inverse square law at an altitude dependent on the air density environment as given in FIG. 1D, using a spherical earth assumption. This requires a good initial approximation that leads to an achievable trajectory. The rocket equation is key in determining the design specifications of the rocket for a given payload and target altitude, including the thrust of the rocket engines and propellant mass for both stages.

4. Rocket Thrust and Mass.

Rockets create thrust by ejecting parts of its mass with high velocity, which can be mathematically formulated using the conservation of momentum principle, and can be considered a straight-forward calculus exercise [1-3]. There are many scientists who need to be credited for this derivation going back to 1810 [3]. The first record of the derivation of the rocket equation is known to have been done by the British mathematician William Moore in his work "Theory on the motion of Rockets" and "Treatise on the Motion of Rockets and an assay on Naval Gunnery", which was published in 1813. The minister William Leitch, another British scientist also independently derived the fundamentals of rocketry in 1861. Robert Goddard in the USA also independently derived the rocket equation in 1912. Hermann Oberth in Germany derived the same equation studying the feasibility of space travel in 1920's.

The Russian scientist Konstantin Tsiolkovsky's (1857-1935) derivation of the rocket equation in 1897 is accepted as being the first to consider whether rockets could achieve the speeds necessary for space travel and therefore it is named as Tsiolkovsky Rocket Equation, which he called "formula of aviation". He is also the inventor of multi-stage rockets based on the very interesting mathematical properties of the rocket equation. He is also the inventor of the "space elevator" and many other things related to rocket science and is therefore accepted as being the father of rocket science. Hermann Julius Oberth (1894-1989) a German rocket scientist also derived the rocket equation while working in Peenemunde during Second World War for the V-2 ballistic rocket with his student Werner von Braun who ended up running the Apollo program at NASA.

5. The Rocket Equation.

Several forms of derivation are possible [1-3]. The equation of motion for the rocket in vector notation can be written as, $$\vec{F}_{EXT} = m(t)\frac{d\vec{v}}{dt} + v_e\frac{d[m(t)]}{dt}\vec{u} \quad (5.1)$$

where $\vec{F}_{EXT}$, m(t), $\vec{v}$, $v_e$ and $\vec{u}$ are sum of external forces, the mass of the rocket, which is a function of time, velocity of the rocket, exhaust gas velocity relative to the rocket, and the unit exhaust gas velocity vector with respect to the rocket, respectively. The time dependent mass of the rocket for constant fuel burn rate $b_r$ can be given as, $$m(t) = m_0 - b_r t \tag{5.2}$$

$$m(t)\frac{dv}{dt} = -v_e \frac{d[m(t)]}{dt} \tag{5.3}$$

where $v_e$ is the effective exhaust velocity in [m/s], which has a range of 2,500-4,500 [m/s] based on the propellant used, the rocket engine design, its convergent-divergent nozzle geometry, and injection-mix efficiency of the propellant into the thrust chamber for liquid propellants. The range of these some values of $v_e$ for some popular rockets are presented in Table 3.

Multiplying both sides of (5.3) with dt gives, $$m(t)dv = -v_e d[m(t)] \tag{5.4}$$

On the other hand, differentiating (5.2) the generated thrust, $F_T$ in scalar form in [Newtons] becomes, $$F_T = -v_e b_r \tag{5.5}$$

The negative sign indicates that the generated thrust is in the opposite direction of the exhaust gas flow relative to the rocket. Multiplying both sides of (5.4) with dt eliminates the time dependency and gives the very simple differential equation where its analytical solution is trivial as, $$dv = -v_e \frac{dm}{m} \tag{5.6}$$

Integration of both sides of (5.6) using the proper limits gives,

| Rocket Engine Country of Origin | Launch Vehicle | Fuel Oxidizer | $V_E$[m/s] Specific Impulse[s] | Thrust [kN] | Mass Flow Rate [kg/s] | Thrust to weight (T2W) Dry weight |
|---|---|---|---|---|---|---|
| V-2 Rocket Engine NAZI Germany | A-4 (V-2) | (75% Alcohol 25% water) LOX | 1,989 m/s 203 s | 245 | 133 kg/s | |
| Aerojet LR-87-AJ-1 (2 Nozzle) USA | TITAN II GLV (Gemini Launch Veichle) | Hypergolic Propellant (Oxidizer ignites at contact) Hydrezeine (Aerozine-50) and $N_2O_4$ | 2,528 m/s 258 s | 1,900 | | |
| Rocketdyne F-1 USA | Saturn V First Stage (5 F-1's giving total thrust of 35,000 [kN]) | RP-1 LOX | 2,580 m/s 263 s | 7,740 | 2,577 kg/s | 94 8,400 kg |
| Energomash RD-170 (4 nozzle) Russia | Energia | RP-1 LOX | 3,030 m/s 309 s | 7,250 | | 82 9,750 kg |
| Enorgamash RD-180 (2 nozzle) Russia | Atlas V | RP-1 LOX | 3,050 m/s 311 s | 3,830 | 1,250 kg/s | 78.44 5,480 kg |
| Rocketdyne RS-25 USA | Space Shuttle (3X RS-25) | Liquid Hydrogen LOX | 4,460 m/s 455 s | 5,250 | | |
| Thiokol/Pratt-Withney SRB USA | Space Shuttle 2 Solid Rocket Boosters | Solid Fuel PBNA-APCP | 2,370 m/s 242 s | 2 × 6,500 | 250 Ton Propellant Tb = 127 s | 45 Tons Empty Diameter 3.71 m Height 45.46 m |
| Blue Horizon BE-4 USA | ULA Vulcan Centaur | $CH_4$ LOX | 3,087 m/s 315 s | | | |
| Vulcain 2 European Space Agency | Ariene-5 First Stage | Liquid Hydrogen LOX | | 1,390 | | |
| P241 European Space Agency | Ariene-5 First Stage 2 Solid Rocket Boosters | Solid Fuel AP Aluminum HTBP | | 2 × 7,080 | 273 Ton Gross Tb = 140 s | 33 Tons Empty Diameter 3.06 m Height 31.6 m |
| SpaceX Merlin USA | SpaceX Falcon | RP-1 LOX | 2,770 m/s 311 s | 854 kN | | 184 470 kg |
| SpaceX Raptor USA | SpaceX Starship Heavy 33X Raptors 72MN | $CH_4$ LOX | 3,400 m/s | 2,210 kN | 650 kg/s | 200 1,500 kg |

$$\int_{v_0}^{v_f} dv = -v_e \int_{m_0}^{m_f} \frac{dm}{m} \quad (5.7)$$

where $m_0$, $m_f$, $v_0$ and $v_f$ are the initial and final total mass of the rocket in [kg], and initial and final velocity of the rocket, respectively in [m/s]. Finally, the solution of (5.7) leads rocket equation to its most common form as, $$\Delta v = v_e \ln\left(\frac{m_0}{m_f}\right) = I_{SP} g_0 \ln\left(\frac{m_0}{m_f}\right) \quad (5.8)$$

where, $$\Delta v = v_f - v_0 \quad (5.9)$$

where $\Delta v$, $I_{SP}$, and $g_0$ are the difference in velocity, specific impulse in seconds [s], and standard gravity in [m/s²] respectively. Since in a rocket $m_0 \gg m_f$, $\Delta v$ is always larger than the mass ejection velocity or exhaust gas exit velocity from the rocket engine nozzle, which is in the range of 2,500-4,500 [m/s] as can be seen in Table 3. As can be seen relations (5.9) and (5.11) enable the rocket to achieve very large orbital velocities or even escape velocity, which is 11,000 [m/s] on Earth's surface, and theoretically propel the rocket to an infinite distance away from the Earth ignoring other gravitational effects present.

For constant fuel burn rate $b_r$ the fuel burn time $T_B$ relates the final mass $m_f$ to the burn rate $b_r$ as, $$m_f = m_0 - m_{prop} = m_0 - b_r T_B \quad (5.10)$$

where $m_{prop}$ is the mass of the (fuel+oxidizer), which is consumed until the end of fuel burn time $T_B$. One of the most important and useful applications of the rocket equation is in relating the initial and final mass of the rocket as a function of desired speed difference $\Delta v$. Taking the first part of (5.8), it can be written as, $$\Delta v = v_e \ln\left(\frac{m_0}{m_f}\right) \quad (5.11)$$

Dividing both sides with $v_e$ gives, $$\frac{\Delta v}{v_e} = \ln\left(\frac{m_0}{m_f}\right) \quad (5.12)$$

(5.12) can also be written as, $$e^{\frac{\Delta v}{v_e}} = \frac{m_0}{m_f} \quad (5.13)$$

Solving $m_f$ from (5.13) gives, $$m_f = m_0 e^{-\frac{\Delta v}{v_e}} \quad (5.14)$$

Substituting the first part of (5.10), $$m_f = m_0 - m_{prop} \quad (5.15)$$

Into (5.14) gives, $$m_0 e^{-\frac{\Delta v}{v_e}} = m_0 - m_{prop} \quad (5.16)$$

Solving $m_{prop}$ from (5.16) gives, $$m_{prop} = m_0 \left(1 - e^{-\frac{\Delta v}{v_e}}\right) \quad (5.17)$$

The equation (5.17) is very useful because by entering 2 numbers into it, it is possible to calculate $m_{prop}$, the fuel needed as a percentage of the initial mass $m_0$ to gain a given speed and rocket exhaust velocity for the case of no external forces.

For a rocket moving straight up vertically against Earth's gravitational force the most important force to consider is the Earth's gravitational force. The resulting gravitational acceleration g acting upon is formulated as [15], $$g = G \frac{m_{EARTH}}{r^2} \text{ where } r = r_{EARTH} + h \quad (5.18)$$

where r, G, $m_{EARTH}$, h, $r_{EARTH}$ are object distance to the center of the Earth, Newton's constant of gravitation, mass of the Earth, and altitude measured from the surface of the Earth. Following are the numerical values in (5.18) as, G=6.674×10¹¹ [m³·kg⁻¹] or [N·m²·kg⁻²]

Mass of Earth $m_{EARTH}$=5.972×10²⁴ [kg]

The Earth's Polar and Equatorial radiuses are slightly different and are, $r_{EPolar}$=6,357 [km] and $r_{EEqutorial}$=6,378 [km].

As shown in FIG. 2C, for all practical purposes the gravitational acceleration g for the range of altitudes involved in this analysis can be assumed constant with a numerical value of 9.81 [m/s²] at sea level. Since rocket propulsion can deliver the very high velocities required to put a satellite into orbit, it became the only practical means of doing so. In this mode the Earth's gravitational acceleration g must be included in the rocket equation [1–3].

For this case the rocket equation of motion becomes, $$\vec{F}_{EXT} = m\frac{d\vec{v}}{dt} - v_e \frac{dm}{dt}\vec{u} \quad (5.19)$$

The second term on the right-hand side is the thrust generated in vector form where $\vec{u}$ is the unit vector in the direction of the flight path relative to the rocket, which is opposite to the rocket velocity vector $\vec{v}$. Rearranging (5.19) gives, $$m\frac{d\vec{v}}{dt} = \vec{F}_{EXT} - v_e \frac{dm}{dt}\vec{u} \quad (5.20)$$

The constant force $\vec{F}_{EXT}$ generated by a constant acceleration g opposing the direction of the thrust can be introduced into (5.20), and ignoring air drag gives the one-dimensional scalar rocket equation of motion as, $$m\frac{dv}{dt} = -mg - v_e\frac{dm}{dt} \quad (5.21)$$

Multiplying both sides of (5.21) with dt as done before gives, $$mdv = -mgdt - v_e dm \quad (5.22)$$

Dividing both sides of (5.22) by m gives, $$dv = -gdt - v_e\frac{dm}{m} \quad (5.23)$$

(5.23) can be analytically integrated as, $$\int_{v_0}^{v_f} dv = -\int_{t_0}^{t_f} gdt - v_e\int_{m_0}^{m_f}\frac{dm}{m} \quad (5.24)$$

Giving, $$v_f - v_0 = -g(t_f - t_0) - v_e[\ln(m_f) - \ln(m_0)] \quad (5.25)$$

On the other hand, $(t_f-t_0)$ in (5.25) is the burn time $T_B$ for constant burn rate $b_r$ calculated as, $$T_B = (t_f - t_0) = \frac{m_{prop}}{b_r} \quad (5.26)$$

Arranging (5.25) and substituting (5.26) in it gives, $$v_f = v_0 + v_e\ln\left(\frac{m_0}{m_f}\right) - g\frac{m_{prop}}{b_r} \quad (5.27)$$

Equation (5.27) is the corresponding equation (5.11) for the case of no external forces. In this work the rocket in the launch stage moves in the opposite direction of gravitational force, but during the decent or capture stage the rocket moves in the same direction as gravitational force. If the gravitational acceleration is in the direction of the thrust, the sign of the last term in (5.27) changes to a positive sign (+). Covering both cases (5.27) can be written as, $$\Delta v = v_f - v_0 = v_e\ln\left(\frac{m_0}{m_f}\right) \mp g\frac{m_{prop}}{b_r} \quad (5.28)$$

where the + sign corresponds to gravitational acceleration if it is in the same direction as thrust, the case where it is used in the decent stage of the system described herein. The velocity difference $\Delta v(\mp g)$, which is defined as the rocket velocities going opposite and in the same direction of gravitational acceleration, has the same mass parameters, $$\Delta v(\mp g) = 2 \cdot g\frac{m_{prop}}{b_r} = 2gT_B \quad (5.29)$$

Equation (5.29) shows that the same velocity can be gained with a significantly smaller mass of propellant. Coming back to lift-off case, since the rocket should be able to lift-off the ground with full initial mass $m_0$, the thrust $F_T$ must satisfy, $$m_0 = \frac{F_T}{T2W \cdot g} = \frac{v_e b_r}{T2W \cdot g} \text{ where } T2W > 1 \quad (5.30)$$

The parameter T2W is the thrust-to-weight ratio of the rocket at the launch pad, which must be greater than 1 for a successful launch. Due to safety of the launch the typically T2W at the launch is set to a number greater than 1.5.

Relation (5.27) and its more general form (5.28) can be represented better by introducing a parameter μ(t) as, $$\mu(t) = \frac{m(t)}{m_0} \text{ where } 0 < \mu \le 1 \quad (5.31)$$

The minimum value of μ(t) is reached when all the propellant is consumed. Since there is always a payload involved with any launch $m_f>0$, the final value of $\mu_f$ is greater than zero as given in (5.31). The inverse of μ(t) can be written as, $$\frac{1}{\mu_f} = \frac{m_0}{m_f} = \frac{m_0}{m_0 - m_{prop}} \quad (5.32)$$

Since, $$m_{prop} = m_0 - m_f \quad (5.33)$$

Time dependency of μ(t) in terms of burn rate can be written explicitly as, $$\mu(t) = \frac{m(t)}{m_0} = \frac{m_0 - b_r t}{m_0} \quad (5.34)$$

Substituting t=0 and $t=T_B$ in (5.34), the upper (final) and lower (initial) limits of $\mu_f$ in powered flight can be written as, $$\mu(0) = \mu_0 = 1 \text{ and } \mu(T_B) = \mu_f = \frac{m_0 - m_{prop}}{m_0} \quad (5.35)$$

Some arithmetic performed on the second part of (5.27) and (5.28) gives, $$g\frac{m_{prop}}{b_r} = g\frac{m_0 - m_f}{b_r} = g\frac{m_0\left(1 - \frac{m_f}{m_0}\right)}{b_r} \quad (5.36)$$

Multiplying dominator and the denominator of (5.36) with $v_E$ and T2W gives, $$\frac{(v_E T2W)gm_0\left(1 - \frac{m_f}{m_0}\right)}{(v_E T2W)b_r} = \frac{v_E(gm_0 T2W)(1 - \mu)}{(v_E b_r)T2W} \quad (5.37)$$

On the other hand, writing thrust in terms of thrust-to-weight ratio T2W gives, $$F_T = gm_0 T2W = v_E b_r \quad (5.38)$$

Substituting (5.38) in (5.37) gives, $$\frac{v_E g m_0 T2W(1-\mu_f)}{v_E b_r T2W} = \frac{v_E F_T(1-\mu_f)}{F_T \cdot T2W} = \frac{v_E(1-\mu_f)}{T2W} \quad (5.39)$$

The equation (5.29) which gives the velocity of the rocket accelerating in the opposite direction of the uniform gravitational acceleration g after burning all its propellant $m_{prop}$ becomes expressed in a very compact form with very simple rocket related variables $\mu_f$ and T2W as, $$\Delta v(\mu_f, T2W) = v_B = v_E\left[\ln\left(\frac{1}{\mu_f}\right) - \frac{(1-\mu_f)}{T2W}\right] \quad (5.40)$$

Since the initial velocity of the rocket when it is standing on the launch pad is zero, using $v_B$, where the subscript "B" representing "Burnt", instead of $\Delta v (\mu_f, T2W)$, is a more meaningful and more convenient in the following math. Close examination of (5.40) gives, for $\mu_f \to 0$ $v_B(0) \to \infty$ (5.41)

This result is clearly non-physical and needs correction which is explained in Section 6 below. And, for $\mu_f = 1$ $v_B(1) = 0$ (5.42)

Figure 4A:
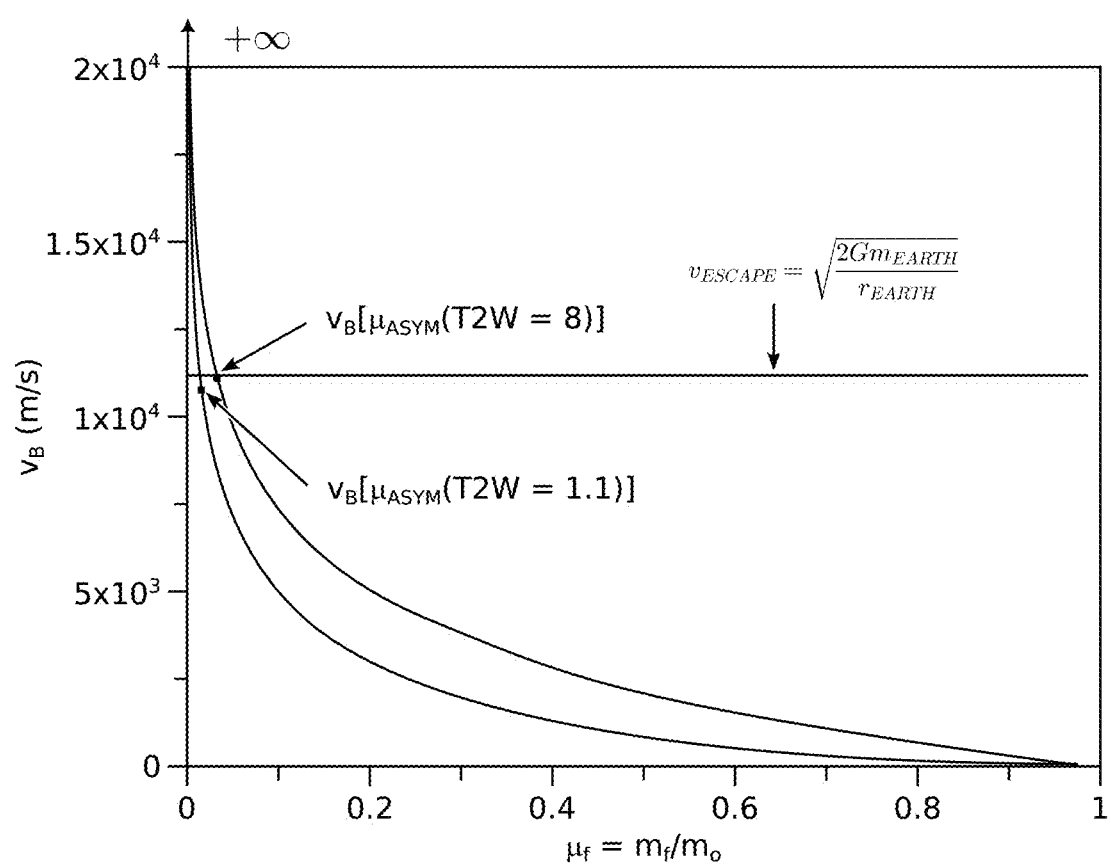
FIG. 4A depicts $v_B(\mu_f, T2W)$ for thrust-to-weight ratio T2W=1.1 and 8 with a constant acceleration g.

FIG. 4A depicts $v_B(\mu_f, T2W)$ for thrust-to-weight ratio T2W=1.1 and 8 with a constant acceleration g. The asymptote at which makes $v_B \to \infty$ at $\mu_f = 0$ is marked with dotted vertical line is clearly shown. One of the early questions to be explored in rocketry was to determine if rocket propulsion could generate velocities sufficient to put an object into orbit, or sufficient to create an escape velocity $v_{ESCAPE}$ from the Earth. To illustrate, escape velocity $v_{ESCAPE}$ is superimposed on the $v_B(\mu_f, T2W)$ curves. As can be seen, for Ulf values very close to zero, $v_B(\mu_f, T2W) \geq v_{ESCAPE}$, where the rocket escapes the Earth's gravitational pull and reaches an infinite altitude $h \to +\infty$. The linear scale of $\mu_f$ in FIG. 4A does not clearly show how close the $\mu_f$ value must become for $v_B(\mu_f, T2W) \geq v_{ESCAPE}$ or for any hypersonic velocities to put a satellite into a desired orbit as shown in FIGS. 1A and 1B. This could be achieved by presenting the same data in FIG. 4A where the horizontal axis is drawn in logarithmic scale.

Figure 4B:
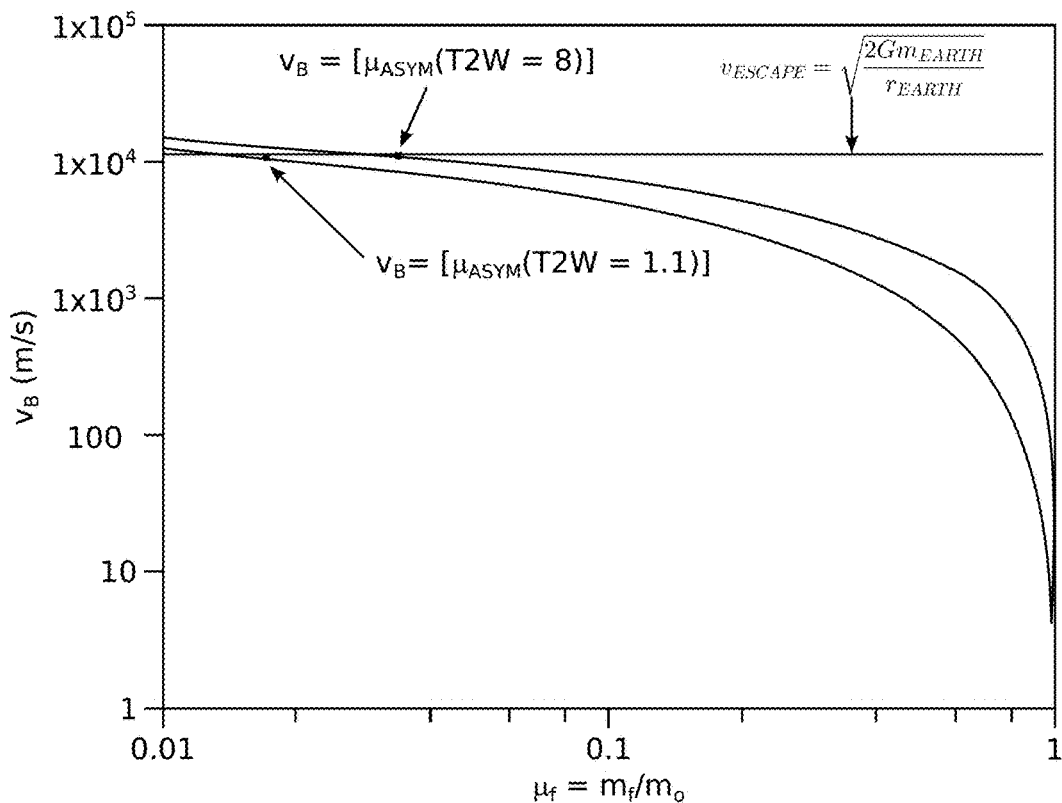
FIG. 4B depicts $v_B(\mu_f, T2W)$ for thrust-to-weight ratio T2W=1.1 and 8 at a constant acceleration g, where the horizontal axis is in logarithmic scale.

FIG. 4B depicts $v_B(\mu_f, T2W)$ for thrust-to-weight ratio T2W=1.1 and 8 with a constant acceleration g, where the horizontal axis is in logarithmic scale. The required $\mu_f$ values for achieving $v_B(\mu_f, T2W) \geq v_{ESCAPE}$ or for any hypersonic velocities needed to put a satellite into a desired orbit have to be below 0.1, meaning that majority of the rocket mass has to be propellant.

Writing everything in scalar form for simplicity, if Z represents the distance traveled up, or in the opposite direction of the gravitational acceleration, the velocity along the same direction becomes the derivative of Z traveled expressed as, $$v_B = \frac{dz}{dt} \quad (5.43)$$

Integrating (5.43) as, $$\int_{z=0}^{z=h_B} dz = v_E \int_{t=0}^{t=T_B} \left[\ln\left(\frac{1}{\mu}\right) - \frac{(1-\mu)}{T2W}\right] dt \quad (5.44)$$

The integral (5.44) can be evaluated with a variable transformation applying Leibnitz's chain rule [20-24] given as, $$v_B = \frac{dz}{dt} = \frac{dz}{d\mu}\frac{d\mu}{dt} = -\frac{b_r}{m_0}\frac{dz}{d\mu} \quad (5.45)$$

Differentiating (5.34) with respect to t gives, $$\frac{d\mu}{dt} = -\frac{m_0}{b_r} \quad (5.46)$$

Substituting (5.46) in (5.45) becomes, $$dz = -\frac{m_0}{b_r} v(\mu) d\mu \quad (5.47)$$

Giving the integral with the help of the lower and upper limits of $\mu$ given in (5.35), $$\int_{z=0}^{z=h_B} dz = -\frac{m_0}{b_r} v_E \int_{\mu=\mu_0}^{\mu=\mu_f} \left[\ln\left(\frac{1}{\mu}\right) - \frac{(1-\mu)}{T2W}\right] d\mu \quad (5.48)$$

The upper limit $h_B$ in the integral on the left-hand side of the integral equation (5.48) is the altitude that the rocket reaches after ejecting all its propellant, or at $t=T_B$.

To integrate the first term in the right hand-side of the integral equation (5.48), $$\int_{\mu=\mu_0=1}^{\mu=\mu_f} \ln\left(\frac{1}{\mu}\right) d\mu \quad (5.49)$$

With the variable transformation, $$x = \frac{1}{\mu} \text{ giving } d\mu = \frac{1}{x^2} dx \quad (5.50)$$

resulting in the integral which has an open form integral expression [22-24] as, $$\int \ln\left(\frac{1}{\mu}\right) d\mu = -\int \frac{\ln(x)}{x^2} dx = \frac{\ln(\mu)}{\mu} + \frac{1}{\mu} \quad (5.51)$$

Substituting $\mu_f$ in $\mu$ (5.51) for calculating the integral value at the upper integration limit $I_2$ of (5.49) becomes, $$I_2 = \mu_f \ln\left(\frac{1}{\mu_f}\right) + \mu_f \quad (5.52)$$

Substituting the lower integration limit $\mu_0=1$ in (5.51) for calculating the integral value at the lower limit $I_1$ of (5.49) gives, $$I_1 = \mu_0 \ln\left(\frac{1}{\mu_0}\right) + \mu_0 = 1 \cdot \ln\left(\frac{1}{1}\right) + 1 = 1 \quad (5.53)$$

The resulting integral value $I_2-I_1$ of the first part in (5.49) becomes, $$\int_{\mu=1}^{\mu=\mu_f} \ln\left(\frac{1}{\mu}\right) d\mu = \mu_f \ln\left(\frac{1}{\mu_f}\right) + \mu_f - 1 \quad (5.54)$$

Integration of the second term in right hand-side of (5.48) is straightforward giving [22-24], $$\int \frac{(1-\mu)}{T2W} d\mu = -\frac{1}{2} \frac{(1-\mu)^2}{T2W} \quad (5.55)$$

Applying the integration limits at (5.48) to (5.55) gives $$-\int_{\mu=1}^{\mu=\mu_f} \frac{(1-\mu)}{T2W} d\mu = \frac{1}{2} \frac{(1-\mu_f)^2}{T2W} \quad (5.56)$$

Substituting (5.56) in (5.48) the integral (5.48) finally becomes, $$h_B = v_E \frac{m_0}{b_r}\left[1 - \mu_f \ln\left(\frac{1}{\mu_f}\right) - \mu_f - \frac{1}{2}\frac{(1-\mu_f)^2}{T2W}\right] \quad (5.57)$$

The multiplier in front of (5.57) can be simplified further by multiplying denominator and the dominator with $(g \cdot v_E)$ giving, $$\frac{v_E m_0 (v_E g)}{b_r (v_E g)} = \frac{v_E^2 m_0 g}{F_T g} = \frac{v_E^2}{g \cdot T2W} \quad (5.58)$$

Giving the height $h_B$ that the rocket reaches in powered flight at the time of $T_B$, in other words when it runs out of propellant, with a vertical velocity in opposing direction of constant acceleration g as, $$h_B(\mu_f, T2W) = \frac{v_E^2}{g \cdot T2W}\left[1 - \mu_f \ln\left(\frac{1}{\mu_f}\right) - \mu_f - \frac{1}{2}\frac{(1-\mu_f)^2}{T2W}\right] \quad (5.59)$$

At that point the rocket has a velocity $v_B$ as given in (5.40) and it keeps gaining altitude. In other words, it coasts until it reaches its final altitude h also known as "apogee" in the rocket literature where its velocity becomes zero.

The limits of $h_B(\mu_f, T2W)$ at $\mu_f=0$ and $\mu_f=1$ are worth mentioning giving, $$\text{for } \mu_f \to 0 \quad h_B(0, T2W) \to \frac{v_E^2}{g \cdot T2W}\left(1 - \frac{1}{2T2W}\right) \quad (5.60)$$

$$\text{for } \mu_f \to 1 \quad h_B(1, T2W) = 0 \quad (5.61)$$

Figure 5A:
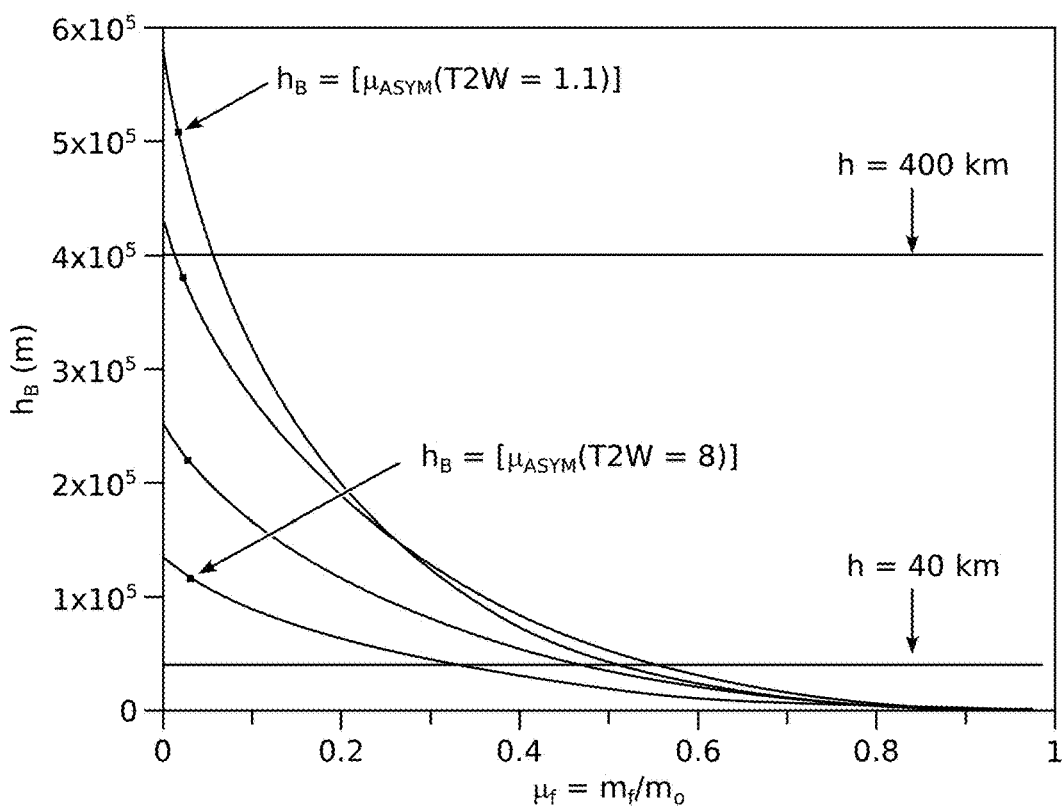
FIG. 5A depicts $h_B(\mu_f, T2W)$ for thrust-to-weight ratio T2W=1.1, 2, 4, and 8 with a constant acceleration g.

FIG. 5A depicts $h_B(\mu_f, T2W)$ for thrust-to-weight ratio T2W=1.1, 2, 4, and 8 with a constant acceleration g.

Figure 5B:
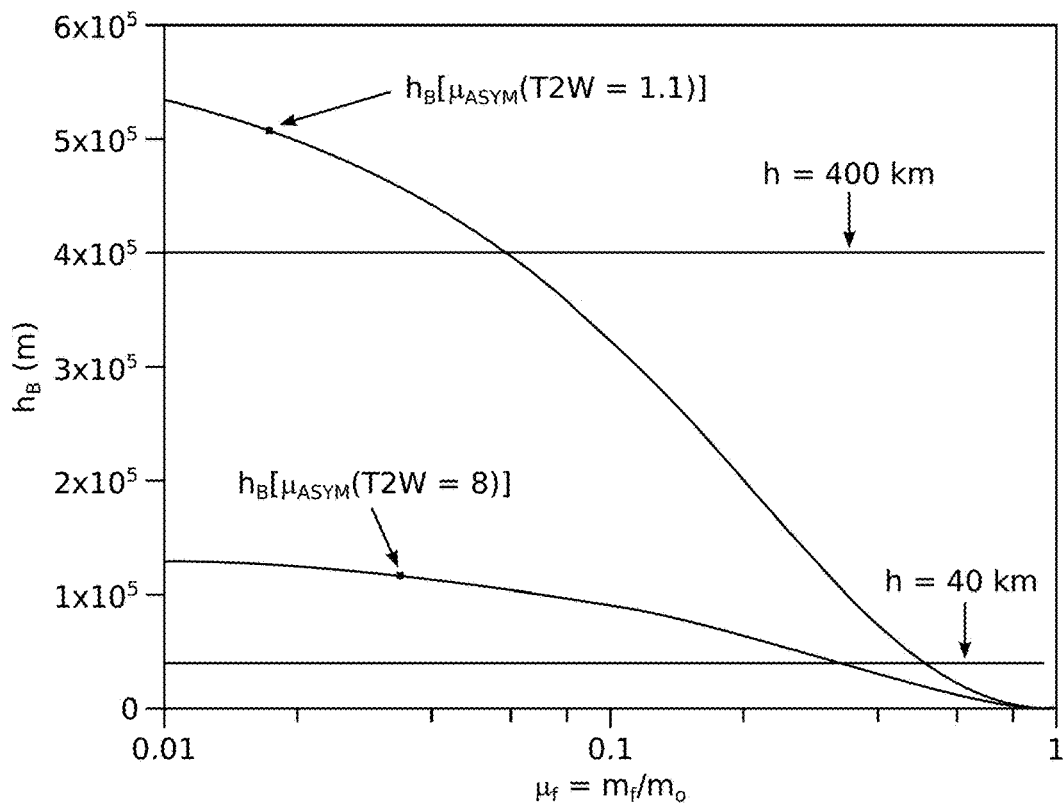
FIG. 5B depicts $h_B(\mu_f, T2W)$ for thrust-to-weight ratio T2W=1.1 and 8 with a constant acceleration g, where the horizontal axis is in logarithmic scale.

FIG. 5B depicts $h_B(\mu_f, T2W)$ for thrust-to-weight ratio T2W=1.1 and 8 where the horizontal axis is in logarithmic scale.

What is interesting to observe is $h_B(0, T2W)$, as given in (5.60) and shown in FIGS. 5A and 5B, has a finite value that is less than 600 [km] for any practical thrust to weight ratio of T2W. As shown in FIGS. 2A, 2B, and 2C, the g(h) variation for altitudes of 600 [km], which can be considered to be the maximum burn height $h_{BMAX}$, is negligible, meaning that the constant acceleration g assumption for any condition is an excellent approximation, at least for the burn stage of any rocket on Earth. This property is used for the derivation of the inverse square law gravitational case in as described in Section 6.

The horizontal lines superimposed on FIGS. 5A and 5B show $h_{GIVEN}=40$ and 400 [km]. Their intersection points with the $h_B(\mu_f, T2W)$ curves give the corresponding $\mu_f$ values which is the graphical solution to the non-linear problem given as the equation $h_B(\mu_f, T2W) - h_{GIVEN} = 0$. FIG. 5A shows that for $h_B(\mu_f, T2W) = 40$ [km], $\mu_f$ should be roughly in the interval of $0.3 \leq \mu_f \leq 0.6$ for all the ranges of T2W, which demonstrates the graphical solution method to this non-linear problem related to rocket design altitude. FIG. 5A does clearly show the intersection points of $h_B(\mu_f, T2W)$ curves and $h_{GIVEN}=400$ [km], but FIG. 5B, having logarithmic horizontal axes, gives roughly $\mu_f=0.06$, illustrating some of the difficulties in reaching higher altitudes.

The final altitude h can be solved by applying the energy conservation law as, $$KE(h_B) + PE(h_B) = KE(h) + PE(h) \quad (5.62)$$

Where $KE(h_B)$ and $PE(h_B)$ are the kinetic and potential energies at the altitude $h_B$, where the velocity of the rocket is the known value of $v_B$. Similarly, $KE(h)$ and $PE(h)$ are the kinetic and potential energies at the final altitude h, where the rocket velocity $v_h^2$ is zero, giving zero kinetic energy at apogee, which can be written explicitly as, $$\frac{1}{2} m_f v_B^2 + m_f g h_B = \frac{1}{2} m_f v_h^2 + m_f g h \quad (5.63)$$

Solving h from (5.59) for $v_h^2=0$ gives, $$h(\mu_f, T2W) = \left[\frac{v_B^2(\mu_f, T2W)}{2g} + h_B(\mu_f, T2W)\right] \quad (5.64)$$

Figure 6A:
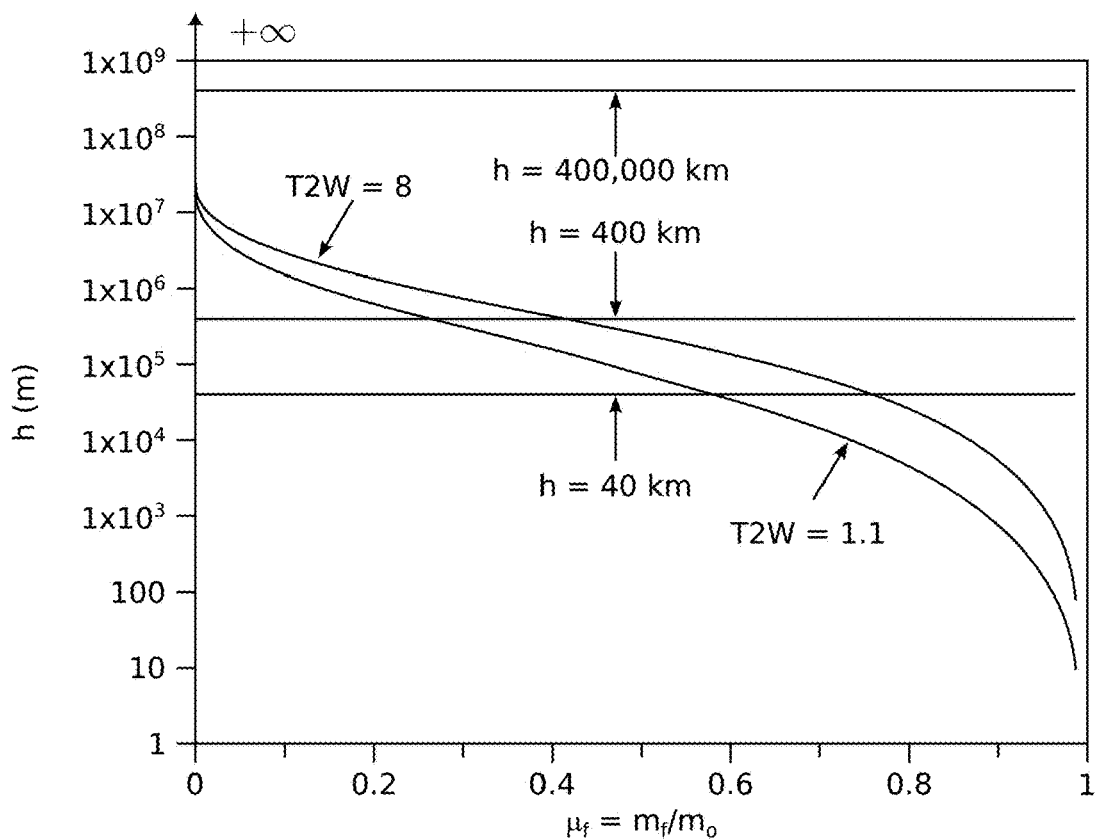
FIG. 6A depicts the climb altitude $h(\mu_f, T2W)$ for the constant gravitational acceleration of g=9.8 [m/s²] with thrust-to-weight ratio T2W=1.1 and 8 where the vertical axis is in logarithmic scale.

FIG. 6A depicts the climb altitude $h(\mu_f, T2W)$ for the constant gravitational acceleration of $g=9.8$ [m/s$^2$] with thrust-to-weight ratio T2W=1.1 and 8 where the vertical axis is in logarithmic scale. Since the $v_B(\mu_f, T2W)$ term in (5.64) becomes $+\infty$ for $\mu_f=0$, $h(\mu_f, T2W)$ also becomes $+\infty$, as shown with an asymptote (dotted vertical line) in FIG. 6A at $\mu_f=0$.

The horizontal lines superimposed on $h_{GIVEN}=40$, 400 and 400,000 [km], and their intersection points with the $h(\mu_f, T2W)$ curves give the corresponding $\mu_f$ values that is the graphical solution to the non-linear problem $h(\mu_f, T2W) - h_{GIVEN} = 0$. FIG. 6A shows that for $h(\mu_f, T2W) = 40$ [km], $\mu_f$ should be roughly in the interval of $0.6 \leq \mu_f \leq 0.75$ for all the ranges of T2W, which is an easily achievable task. This demonstrates the graphical solution method of solving this non-linear problem for rocket design altitude. FIG. 6A also clearly shows that the intersection points of the $h(\mu_f, T2W)$ curves and $h_{GIVEN}=400$ [km] are roughly in the interval of $0.275 \leq \mu_f \leq 0.45$. FIG. 6A shows the difficulty in reaching extreme altitudes of 400,000 [km] which is the approximate distance to the Moon, requiring very small $\mu_f$ values. FIG. 6A graphically demonstrates that reaching LEO orbital heights is only achievable with multi-stage rockets.

The first term in the brackets of (5.64) is the distance that the rocket "coasts" after depleting all its propellant under constant acceleration "g" and is represented as, $$h_C(\mu_f, T2W) = \frac{v_B^2(\mu_f, T2W)}{2g} \quad (5.65)$$

Naming this distance $h_C$, as the "coast" distance, writing (5.64) in terms of the sum of $h_B$ and $h_C$ becomes handy in evaluating the derivatives and limits with respect to $\mu_f$ giving, $$h(\mu_f, T2W) = h_C(\mu_f, T2W) + h_B(\mu_f, T2W) \quad (5.66)$$

Since (5.41) holds the limit of $h_C(\mu_f, T2W)$ at $\mu_f = 0$ becomes, $$\mu_f \to 0 \; v_B^2(0, T2W) \to \infty \; h_C(0, T2W) \to \infty \quad (5.67)$$

The limit of $h_C(\mu_f, T2W)$ at $\mu_f = 1$ gives, $$\mu_f \to 1 \; v_B^2(1, T2W) \to 0 \; h_C(1, T2W) \to 0 \quad (5.68)$$

Due to (5.66), the limits of h at at $\mu_f = 0$ and $\mu_f = 1$ give the same values as (5.67) and (5.68). Due to (5.67), $\mu_f > 0$ becomes the asymptotes for the $h_C(\mu_f, T2W)$ $h(\mu_f, T2W)$ curves, as shown in FIGS. 6A and 6B.

Figure 6B:
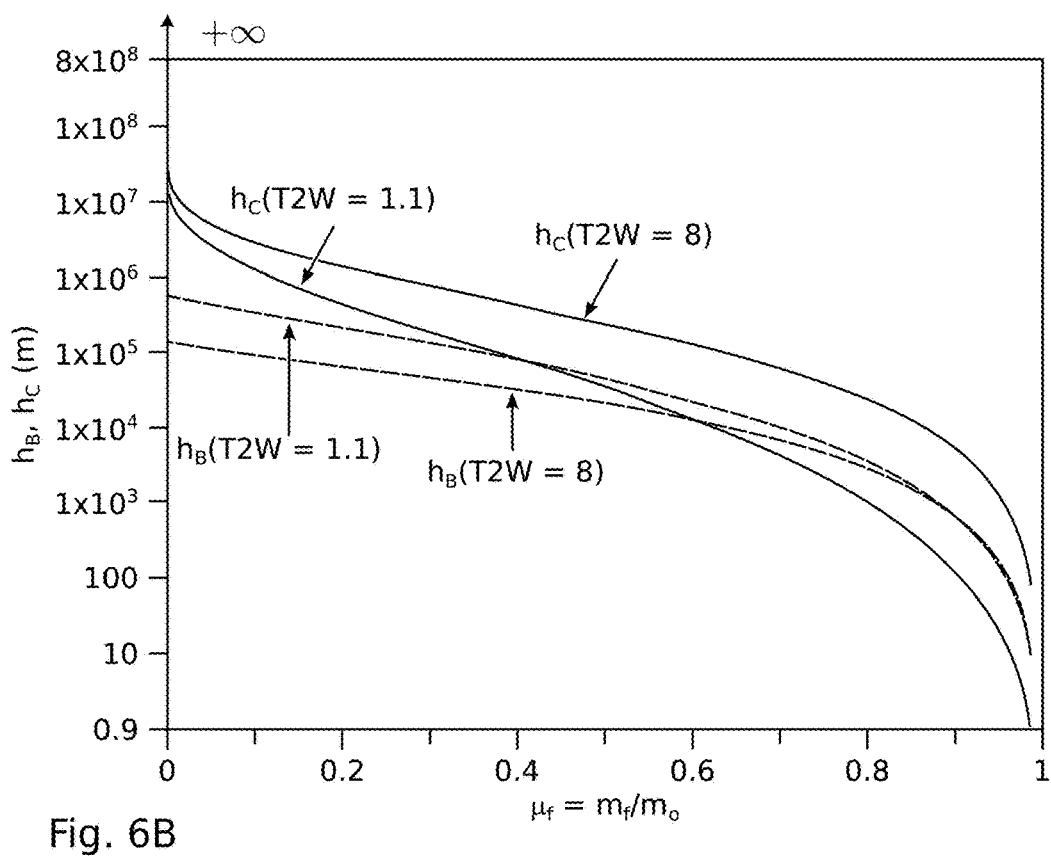
FIG. 6B depicts burn height $h_B(\mu_f, T2W)$ and coast height $h_C(\mu_f, T2W)$ for the constant gravitational acceleration of g=9.8 [m/s²] with thrust-to-weight ratio T2W=1.1 and 8 where the vertical axis is in logarithmic scale.

FIG. 6B depicts burn height $h_B(\mu_f, T2W)$ and coast height $h_C(\mu_f, T2W)$ the constant gravitational acceleration of g=9.8 [m/s²] with thrust-to-weight ratio T2W=1.1 and 8 where the vertical axis is in logarithmic scale. The asymptote for $h_C(\mu_f, T2W)$ is shown at $\mu_f \to 0$ with the dotted vertical line while $h_B(\mu_f, T2W)$ has a finite value less than 600 [km].

6. Modifying the Rocket Equation for Inverse Square Gravitational Field.

The Inverse Square Law Gravitational Field Relation can be incorporated into the conservation of energy formulation for calculating a more accurate final altitude h. If the final altitude h, calculated by (5.61) is comparable to or larger than the radius of Earth $r_{EARTH}$, the potential energy expression for constant gravitational acceleration g becomes inaccurate. FIG. 2B clearly shows the ratio of the inverse square law calculated acceleration versus constant acceleration value on the surface of the Earth as a function of radius measured from the center of the Earth and at sea level. The marked altitude on the curve is $h_{BMAX}$, which shows that highest altitude that that any rocket can reach giving 80% of the gravitation acceleration of the surface value, giving a much smaller h than the gravitational potential energy derived for the inverse square law gravitational field. This problem can be fixed by replacing the potential energy with the formulation for the inverse square law gravitational field giving (6.1), $$\frac{1}{2} m_f v_B^2 - G \frac{m_f m_{EARTH}}{r_B} = \frac{1}{2} m_f v_{hINV2}^2 - G \frac{m_f m_{EARTH}}{r_{hINV2}} \quad (6.1)$$

Subscripts "INV2" represent the "inverse square law gravitational field formulation" quantities, where $r_B$ and $r_{hINV2}$ are radiuses corresponding to the altitudes $h_B$ and $h_{INV2}$ given as, $$r_B = h_B + r_{EARTH} \text{ and } r_{hINV2} = h_{INV2} + r_{EARTH} \quad (6.2)$$

Since $r_{EARTH}$ is a constant, the following derivative relations are also valid, $$\frac{dr_B}{d\mu_f} = \frac{dh_B}{d\mu_f} \text{ and } \frac{dr_{hINV2}}{d\mu_f} = \frac{dh_{INV2}}{d\mu_f} \quad (6.3)$$

Solving $r_{hINV2}$ from (6.1), gives, $$r_{hINV2} = \frac{-2Gr_B m_{EARTH}}{-2Gm_{EARTH} + r_B(v_B^2 - v_{rhINV2}^2)} \quad (6.4)$$

Multiplying denominator and dominator of (6.4) with −1 gives, $$r_{hINV2} = 2Gm_{EARTH} \frac{r_B}{2Gm_{EARTH} - r_B(v_B^2 - v_{rhINV2}^2)} \quad (6.5)$$

Substituting $v_{hINV2}^2 = 0$ in (6.5), which is the case of interest gives, $$r_{hINV2} = 2Gm_{EARTH} \frac{r_B}{2Gm_{EARTH} - r_B v_B^2} \quad (6.6)$$

Since a proper ($r_B$, $v_B$) combination can make the denominator of (6.6) zero, an infinite value for both $r_{hINV2}$ and $h_{INV2}$ is possible with a finite $v_B$. The equation gives the "finite" $v_B$. The equation which gives the finite $v_B$, resulting with an infinite value for both $r_{hINV2}$ and $h_{INV2}$ can be solved by solving, $$2Gm_{EARTH} - r_B v_B^2 = 0 \quad (6.7)$$

Giving, $$v_{BASY} = \sqrt{\frac{2Gm_{EARTH}}{r_B}} = v_{ESCAPE}(r_B, m_{EARTH}) \quad (6.8)$$

This corresponds to the escape velocity from a spherical boundary with a radius of $r_B$ enclosing the mass of $m_{EARTH}$ in it. This means that the rocket reaches infinite radius or altitude if it has a velocity of $v_{BASY}$ at $r_B$ or at the altitude $h_B$. As can be seen this makes perfect physical sense for the defined escape velocity, which the solution of the rocket equation under constant g formulation does not give. Writing (6.8) in terms of the previously calculated altitude $h_B$ and velocity $v_B$ gives, $$h_{INV2} = 2Gm_{EARTH} \frac{h_B + r_{EARTH}}{2Gm_{EARTH} - r_B v_B^2} - r_{EARTH} \quad (6.9)$$

The corresponding "coast height" $h_{CINV2}$ becomes, $$h_{CINV2} = h_{INV2} - h_B \quad (6.10)$$

Figure 7A:
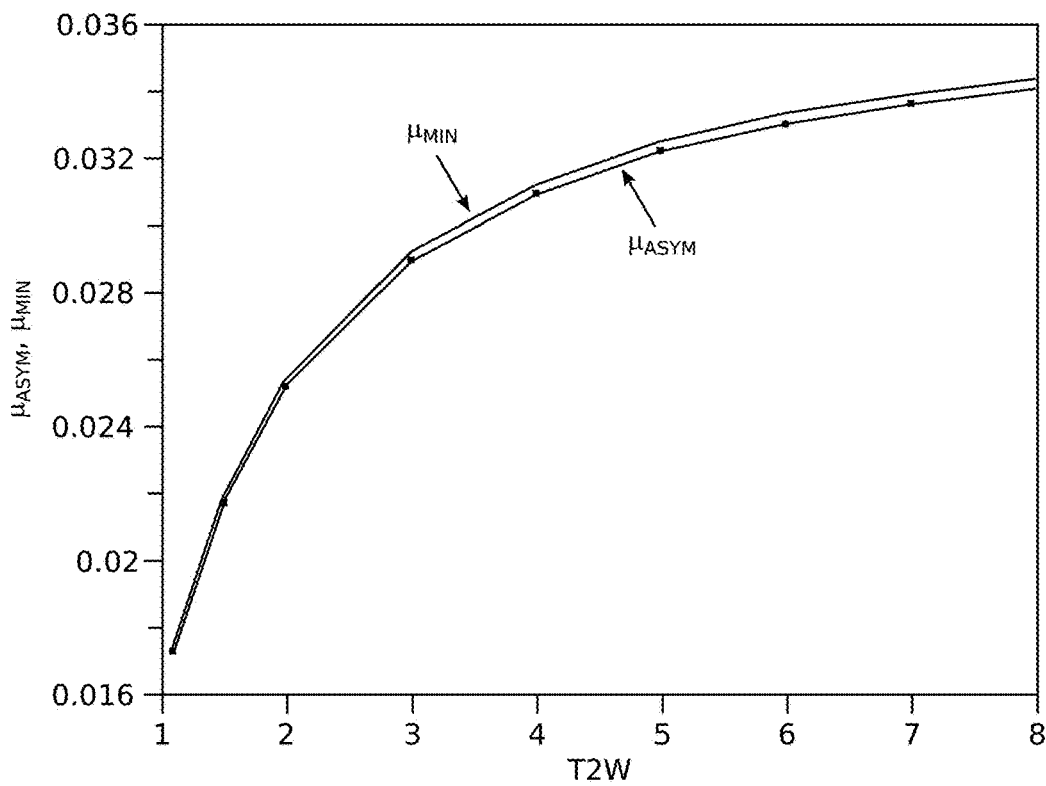
FIG. 7A depicts asymptote x intercept $\mu_{ASYM}(T2W)$ vs. T2W and $\mu_{MIN}(T2W)$ by solving the non-linear equation (6.7).

FIG. 7A depicts asymptote x intercept $\mu_{ASYM}(T2W)$ vs. T2W and $\mu_{MIN}(T2W)$ by solving the non-linear equation (6.7). As can be seen, the asymptotes for any T2W are very close to zero, in the range of $0.016 < \mu_f < 0.036$, and getting closer to zero with decreasing thrust-to-weight ratio T2W. As given by (6.6) $r_{hINV2}$ becomes $+\infty$ along with the altitude $h_{INV2}$ due to the linear relation given in relation (6.2), which causes plotting and interpolation to be very difficult, if not impossible for $\mu_f=\mu_{ASYM}(T2W)$. To avoid this problem, $\mu_{MIN}(T2W)$ is defined by a small $\delta$ value greater than the $\mu_{ASYM}(T2W)$ with very large altitude values in the family of altitude vs $\mu_f$ curves in FIG. 7B through 7E.

Figure 7B:
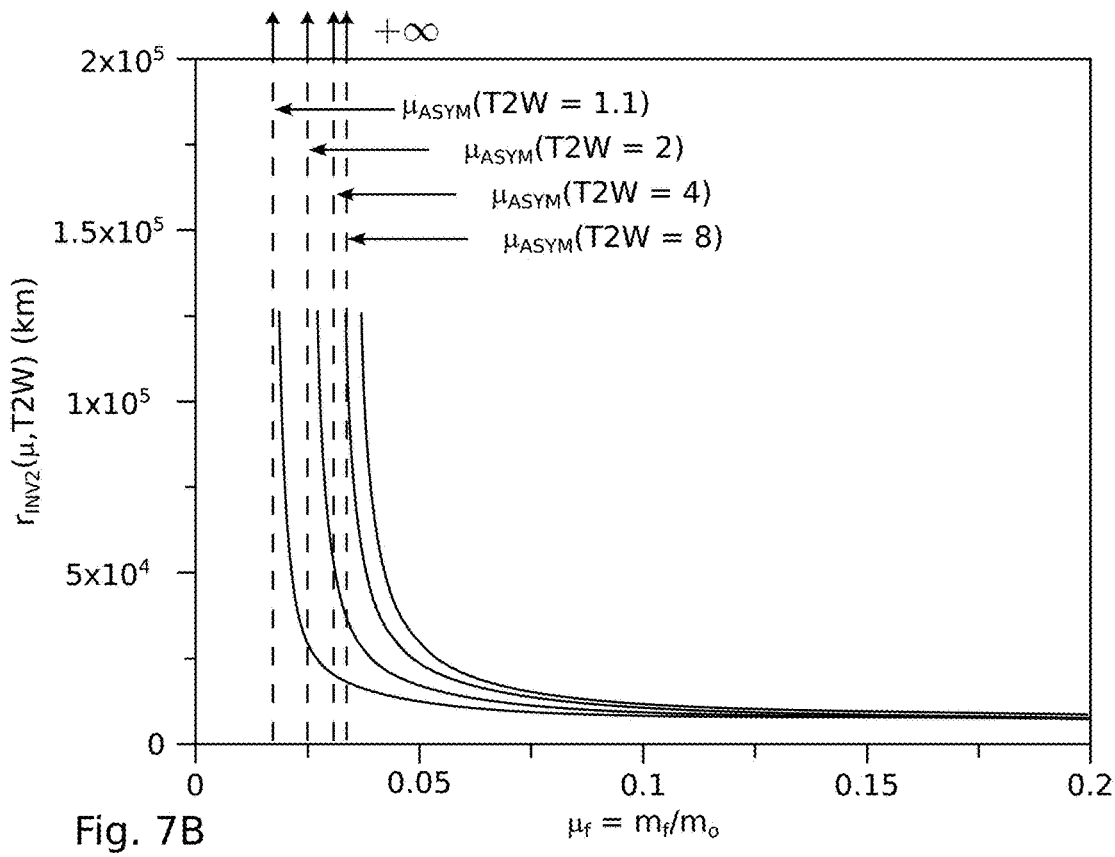
FIG. 7B depicts climb altitude $h_{INV2}(\mu_f, T2W)$ for the inverse square gravitational field with asymptotes where vertical axis is in logarithmic scale for thrust-to-weight ratio T2W=1.1 and 8.

FIG. 7B depicts climb altitude $h_{INV2}(\mu_f,T2W)$ for the inverse square gravitational field with asymptotes where vertical axis is in logarithmic scale for thrust-to-weight ratio T2W=1.1 and 8.

Figure 7C:
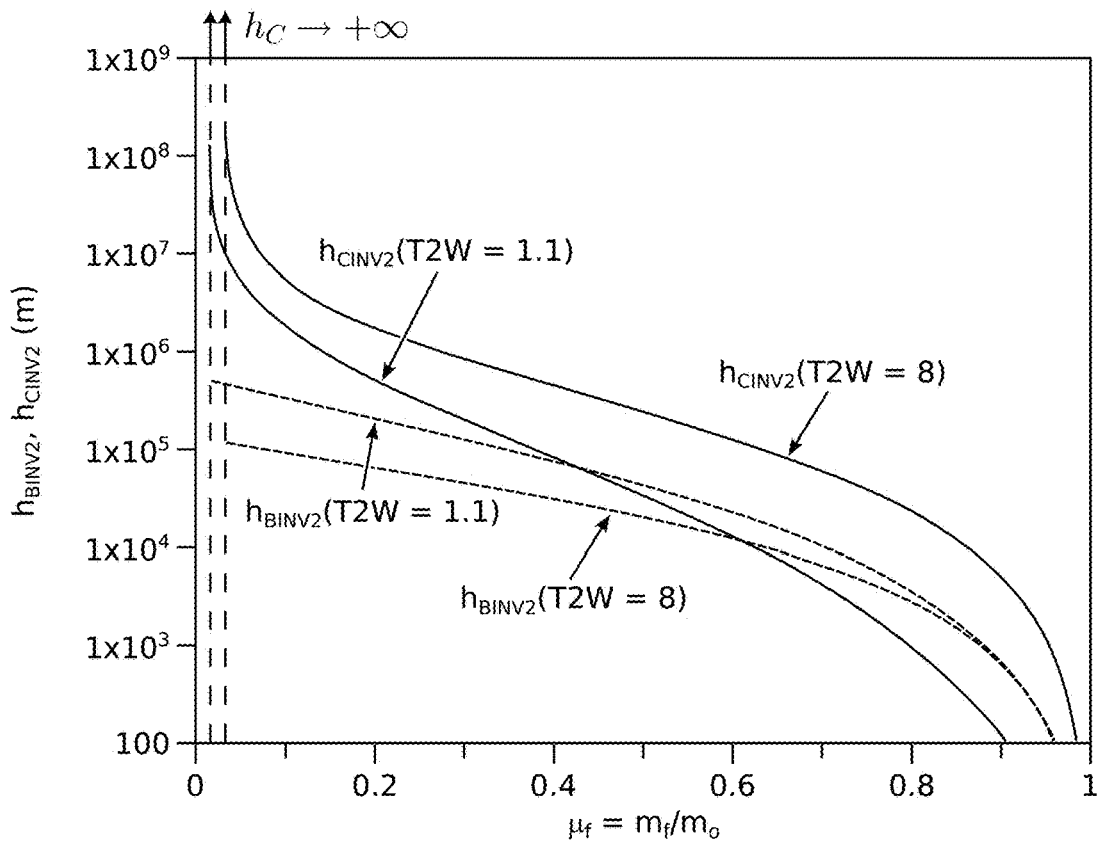
FIG. 7C depicts burn height $h_{BINV2}(\mu_f, T2W)$ and coast height $h_{CINV2}(\mu_f, T2W)$ at T2W for the inverse square gravitational field with asymptotes where the vertical axis is in logarithmic scale.

FIG. 7C depicts burn height $h_{BINV2}(\mu_f,T2W)$ and coast height $h_{CINV2}(\mu_f,T2W)$ at T2W for the inverse square gravitational field with asymptotes where the vertical axis is in logarithmic scale.

Figure 7D:
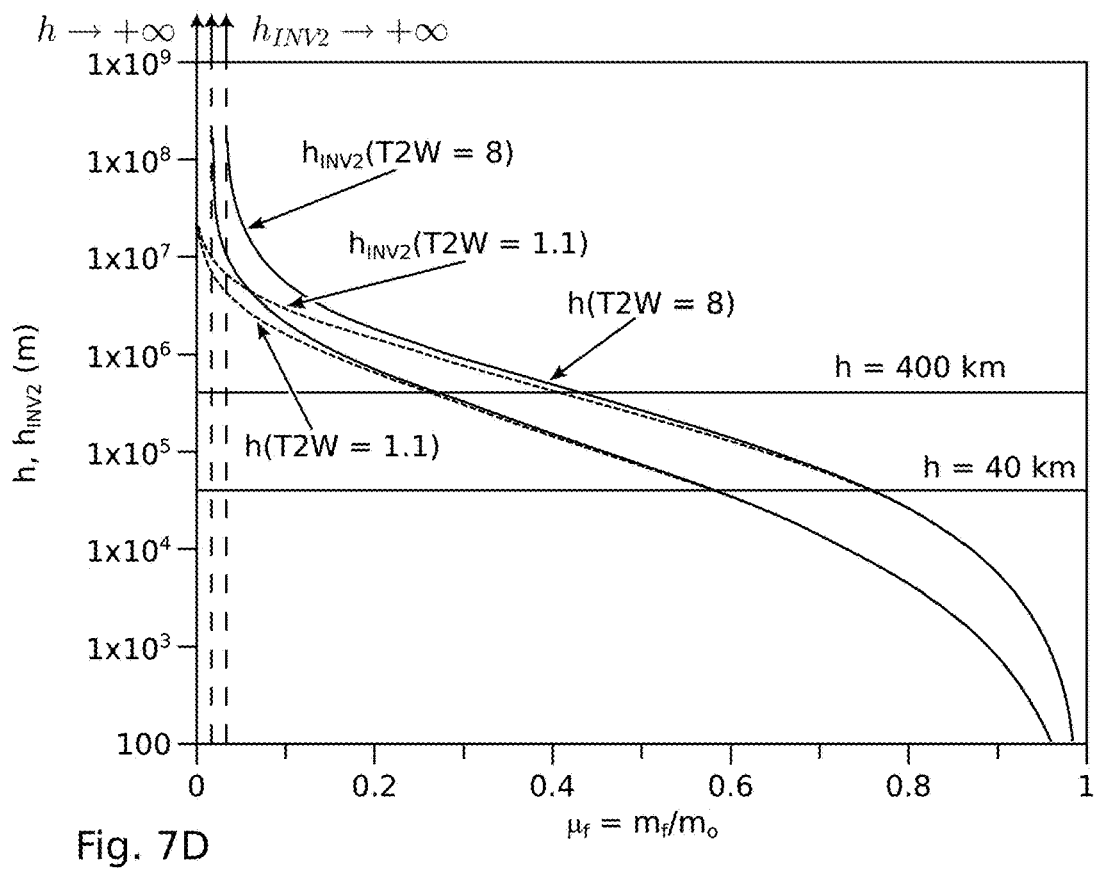
FIG. 7D depicts climb altitude $h_{INV2}(\mu_f, T2W)$ for the inverse square gravitational field with asymptotes and $h(\mu_f, T2W)$ for the constant gravitational acceleration of g=9.8 [m/s²] where the vertical axis is in logarithmic scale for thrust-to-weight ratio T2W=1.1 and 8.

FIG. 7D depicts climb altitude $h_{INV2}(\mu_f,T2W)$ for the inverse square gravitational field with asymptotes and $h(\mu_f,T2W)$ for the constant gravitational acceleration of g=9.8 [m/s²] where the vertical axis is in logarithmic scale for thrust-to-weight ratio T2W=1.1 and 8. Although the differences are self-explanatory, they can be better seen in logarithmic horizontal axes.

Figure 7E:
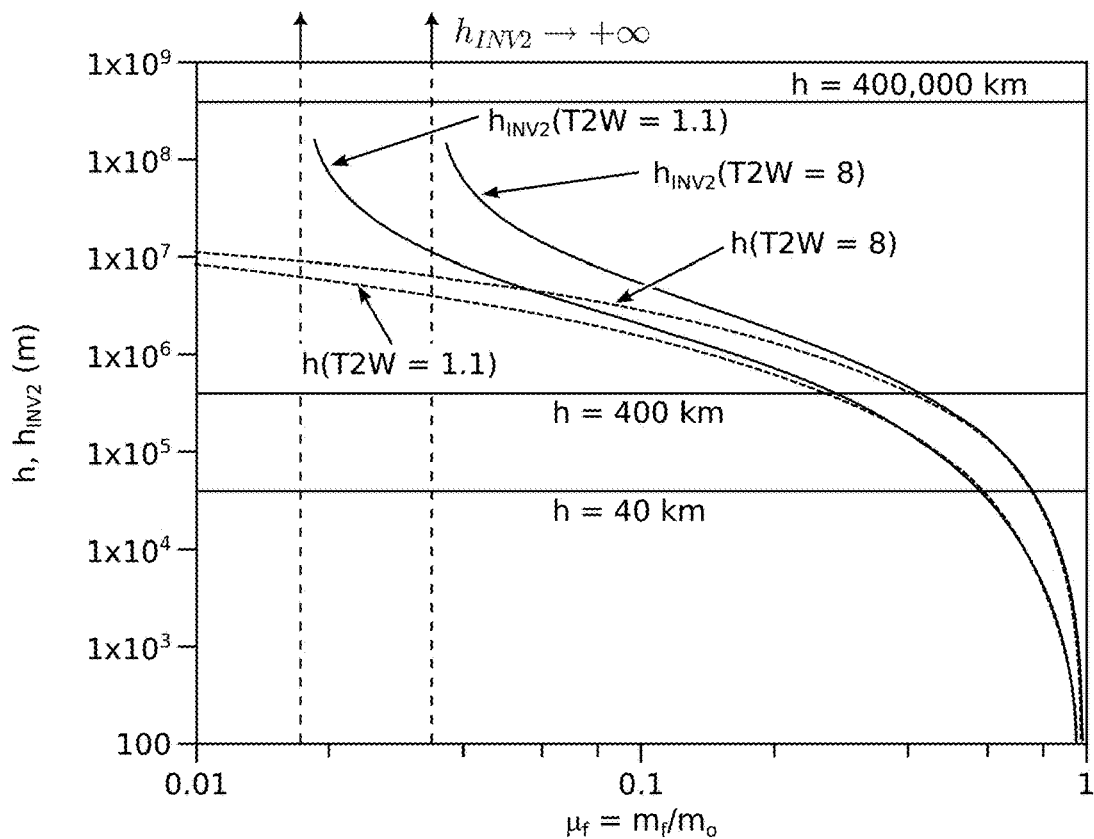
FIG. 7E depicts climb altitude $h_{INV2}(\mu f, T2W)$ for the inverse square gravitational field with asymptotes and $h(\mu_f, T2W)$ for the constant gravitational acceleration of g=9.8 [m/s²] where the vertical and horizontal axes are in logarithmic scale for thrust-to-weight ratio T2W=1.1 and 8.

FIG. 7E depicts climb altitude $h_{INV2}(\mu_f,T2W)$ for the inverse square gravitational field with asymptotes and $h(\mu_f,T2W)$ for the constant gravitational acceleration of g=9.8 [m/s²] where the vertical and horizontal axes are in logarithmic scale for thrust-to-weight ratio T2W=1.1 and 8. Important to note is that the inverse square gravitational field assumption has to be used for solving $\mu_f$ for altitudes higher than 400 [km]. The constant gravitational acceleration assumption can be safely used for calculating $\mu_f$ as well as altitudes less than 400 [km].

Figure 7F:
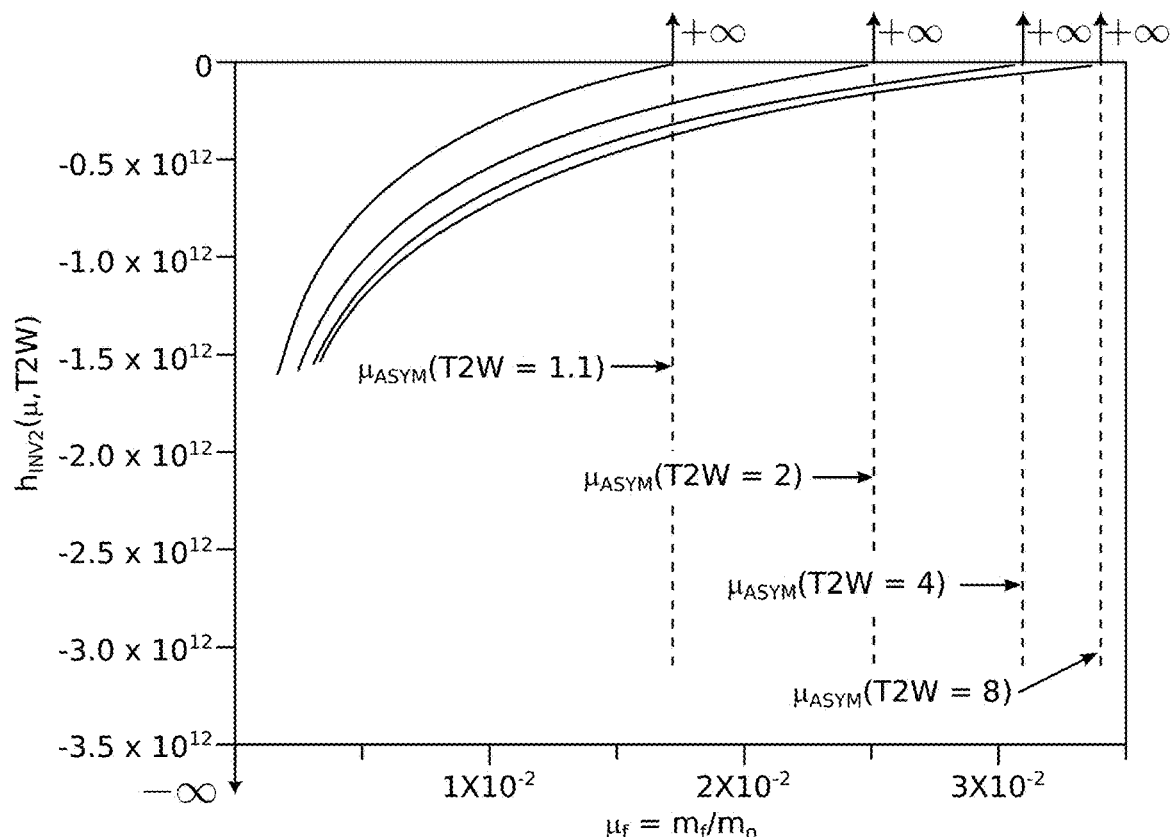
FIG. 7F depicts climb altitude $h_{INV2}(\mu_f, T2W)$ for the inverse square gravitational field with asymptotes for $\mu < \mu_{ASYM}(T2W)$ with thrust-to-weight ratio T2W=1.1, 2, 4, and 8.

FIG. 7F depicts climb altitude $h_{INV2}(\mu_f,T2W)$ for the inverse square gravitational field with asymptotes for $\mu<\mu_{ASYM}(T2W)$ with thrust-to-weight ratio T2W=1.1, 2, 4, and 8.

As can be seen very clearly in FIG. 7F there are 2 asymptotes for each $h_{INV2}(\mu_f,T2W)$ curve. The first one is at $\mu_f=0$ and all the $h_{INV2}(\mu_f,T2W)$ functions approach-$\infty$, which is non-physical. The second asymptotes of every $h_{INV2}(\mu_f,T2W)$ curve has an asymptote where their x axes intercept, as shown in FIG. 7A, at $\mu_f=\mu_{ASYM}(T2W)$, where the $h_{INV2}(\mu_f,T2W)$ functions approach +∞. This asymptote brings also a "jump" type discontinuity where $h_{INV2}(\mu_f,T2W)$ jumps from +∞ to zero when $\mu_f$ crosses the asymptote as can be seen clearly in FIG. 7E and FIG. 7F. This can be worded as in the interval of $0 \le \mu_f \le \mu_{ASYM}(T2W)$ the $h_{INV2}(\mu_f,T2W)$ function becomes non-physical.

Figure 8:
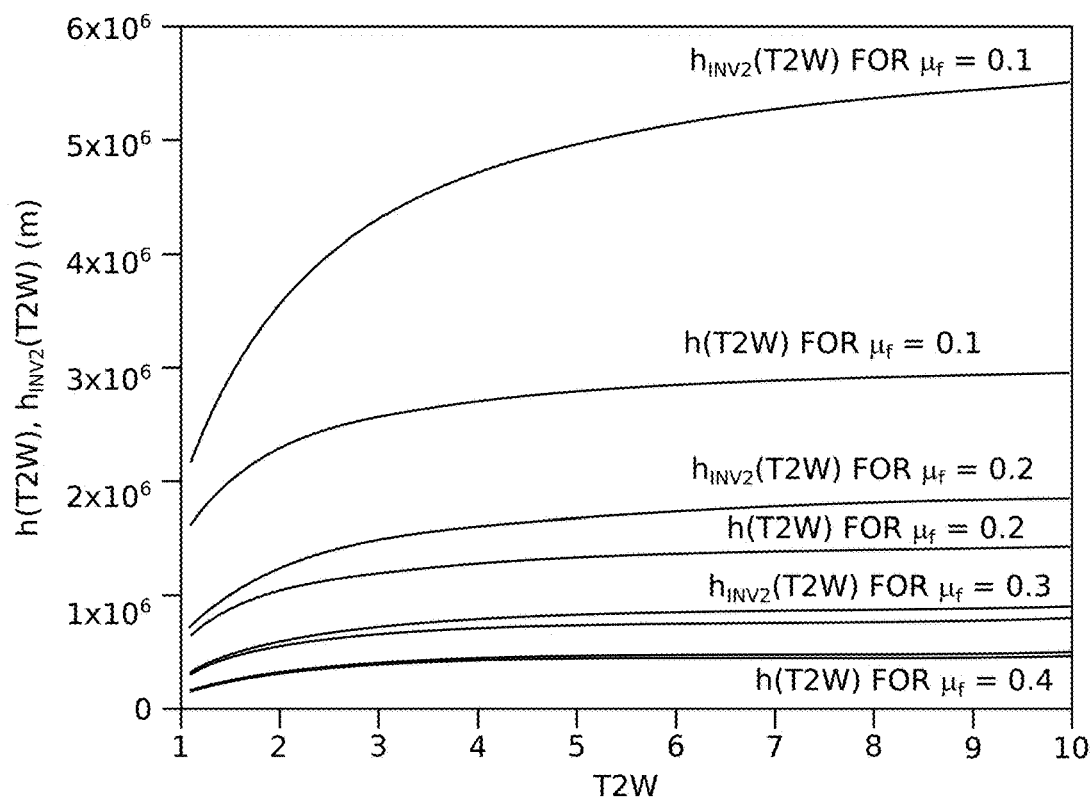
FIG. 8 depicts climb altitude $h_{INV2}(\mu_f, T2W)$ for the inverse square gravitational field and climb altitude $h(\mu_f, T2W)$ with the constant gravitational acceleration of g=9.8 [m/s²] vs. T2W, where $\mu_f$=0.1, 0.2, 0.3, and 0.4.

FIG. 8 depicts climb altitude $h_{INV2}(\mu_f,T2W)$ for the inverse square gravitational field and climb altitude $h(\mu_f,T2W)$ with the constant gravitational acceleration of g=9.8 [m/s²] vs. T2W, where $\mu_f=0.1, 0.2, 0.3$, and $0.4$. At $\mu_f>0.3$ the $h(\mu_f,T2W)$ and $h_{INV2}(\mu_f,T2W)$ curves become indistinguishable. FIG. 8 is another way of showing that the constant gravitational acceleration assumption can be safely used for calculating $\mu_f$ by simply looking at the calculated $\mu_f$ value. If $\mu_f>0.3$, the constant gravitational acceleration assumption is accurate enough to use, with no need to employ the inverse square gravitational field formulation or to question the formulation used in the solution, both give very close results.

7. Introducing Propellant Tank to Propellant Mass Ratio k.

The propellant tank mass is related to the mass of the propellant that it stores, by introducing a parameter k as, $$k = \frac{m_{tank}}{m_{prop}} \quad (7.1)$$

The initial mass $m_0$ of the rocket can be written as, $$m_0 = m_{prop}(1+k) + m_{RE} + m_{PAYLOAD} \quad (7.2)$$

where $m_{prop}$, $m_{RE}$ and $m_{PAYLOAD}$ are the mass of the propellant, rocket engine and payload, and where the parameter k is called the "propellant tank-to-propellant mass ratio". Typical values of k should be a small number like 0.05 to 0.2, with a smaller ratio being more advantageous. The chemistry and the resulting k parameter for liquid and solid fuel rockets are different. Here the analysis for a very simplified formulation applicable of a liquid rocket having a propellant tank being made from only a single cylinder is presented. A similar approach for k parameter calculations for the solid rockets can also be derived.

In a liquid fuel rocket the $m_{prop}$ consists of oxidizer plus the fuel masses given as, $$m_{prop} = m_{fuel} + m_{oxi} \quad (7.3)$$

which are typically stored in two different cylindrical tanks having two semi-spherical caps at the top and bottom. Due to the chemistry of burning the fuel with the oxidizer, their masses, densities, and their resulting volumes are not necessarily equal and can be calculated with their reaction chemistry. The simplest example uses hydrogen; $H_2$ as fuel and oxygen; $O_2$ for the oxidizer giving the chemical reaction of, $$H_2 + \frac{1}{2}O_2 \rightarrow H_2O \quad (7.4)$$

Applying stoichiometry analysis to the chemical reaction given at (7.4) shows that 2 kg of hydrogen reacting with 16 kg of oxygen (1/8 mass ratio) gives 18 kg of steam. This 18 kg of hot steam is ejected from the rocket nozzle with a velocity of $v_E$. Assuming each are stored in liquid form, hydrogen has a density of 71 kg/m³ at 20.28 K (−252.87° C.) and liquid oxygen has a density of 1,141 kg/m³ at 90.19 K (−297.33° C.). As can be seen liquid oxygen is denser than water and approximately 16 times denser than liquid $H_2$. The question becomes how to calculate the volumetric ratios of the liquid $H_2$ and $O_2$ satisfying the calculated 1/8 mass ratio. Using this example, 2 kg of hydrogen volume $V(H_2)=2/71=0.02817$ m³, reacts with an oxygen volume of $V(O_2)=16/1,141=0.01402$ m³. This shows that the $H_2$ tank must be volumetrically 2.009 times larger than the $O_2$ tank to satisfy the calculated 1/8 mass ratio.

In rocket design there are some other factors that are considered for maximizing thrust and cooling issues of the rocket engine. For $H_2/O_2$ rockets the highest impulse power, $I_{SP}$ is achieved when the $H_2/O_2$ mass ratio is 1/4 (leaving half of the $H_2$ unburnt), not when it is 1/8 corresponding to full burn of $H_2$. In practice the mass ratio is kept as 1/6 for other reasons. As an example, the space shuttle liquid $O_2$ tank is 19,563 cubic feet (553.96 m³) and $H_2$ tank is 53,518 cubic feet (1,515.46 m³), having volumetric ratio of 2.7357. The full load oxygen and hydrogen mass that can be stored in these tanks are 632.068 and 107.597 tons, giving the 1/6 mass ratio, as given earlier. As can be seen, calculating optimal mass and volumetric propellant/oxidant ratios is not that simple.

In a liquid propellant rocket the fuel and oxidizer are stored in two separate tanks, with piping and some additional essential parts like turbo pumps, controls, etc. To simplify all the calculations, it is assumed that the oxidizer and propellant tanks are two cylinders with same radiuses and spherical caps both having a uniform skin thickness $t_{skin}$.

Once the oxidizer and fuel masses and volumes for the mission are calculated as shown in the $H_2/O_2$ example above, calculating the parameter k simply becomes a trivial volume and mass calculation. The goal here is to quantify the significant dependency of the parameter k to the geometrical parameters of the rocket, like its height and radius under these assumptions. This can be achieved by doing the analysis for only one tank, named the propellant tank. The parameter k as given in (7.1) is defined as the mass ratio between the propellant tank and the propellant stored in it, k can be simply calculated by the propellant tank skin area $S_{skin}$, skin material density $\rho_{skin}$, propellant volume contained in the propellant tank, $V_{prop}$, and its density, $\rho_{prop}$. A good estimate of k can be given as, $$k \cong \frac{m_{skin}}{m_{prop}} \cong \frac{s_{skin} t_{skin}}{V_{prop}} \frac{\rho_{skin}}{\rho_{prop}} \quad (7.5)$$

Ignoring the masses of both end caps of the propellant tank gives k as, $$k \cong \frac{\pi r^2 - \pi(r - t_{skin})^2}{\pi(r - t_{skin})^2} \frac{\rho_{skin}}{\rho_{prop}} = \frac{\rho_{skin}}{\rho_{prop}} \frac{(2rt_{skin} + t_{skin}^2)}{(r - t_{skin})^2} \quad (7.6)$$

As can be seen in (7.6) k is a decreasing function of the rocket radius r, closer to a function inversely proportional to the radius r of the rocket. A better estimate of k can be obtained by adding the masses of the top and bottom caps of the propellant tank. Assuming the caps are semi-spherical and has the same skin thickness $t_{skin}$, the skin volume $V_{sksph}$ of the two semi-spherical shell regions on the top and the bottom of the propellant tank is, $$V_{sksph} = \frac{4}{3}\pi[r^3 - (r - t_{skin})^3] \quad (7.7)$$

The volume of the cylindrical shell region $V_{skcyl}$ with a height of $h_{cyl}$ and a skin thickness of $t_{skin}$ is, $$V_{skcyl} = \pi h_{cyl}[r^2 - (r - t_{skin})^2] \quad (7.8)$$

The empty mass of the tank becomes, $$m_{tank} = \rho_{skin}(V_{sksph} + V_{skcyl}) \quad (7.9)$$

Assuming the propellant tank is filled completely prior to launch gives the internal volume of the propellant tank as, $$V_{int}(h) = \pi\left[h_{cyl}(r - t_{skin})^2 + \frac{3}{8}(r - t_{skin})^3\right] \quad (7.10)$$

The propellant mass $m_{prop}$ becomes, $$m_{prop} = \rho_{oxi} V_{int}(h_{oxi}) + \rho_{fuel} V_{int}(h_{fuel}) \quad (7.11)$$

Figure 11:
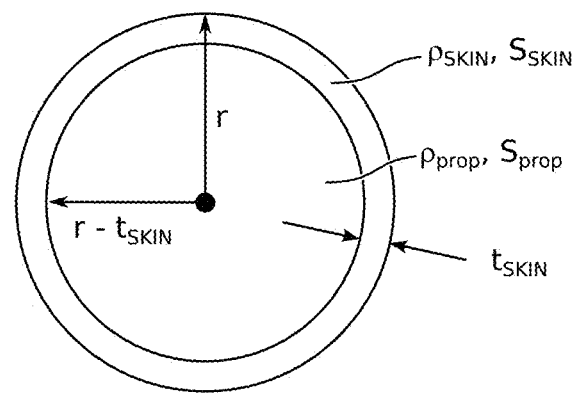
FIG. 11 depicts the skin of a propellant tank.

FIG. 11 depicts the skin of a propellant tank.

Figure 12:
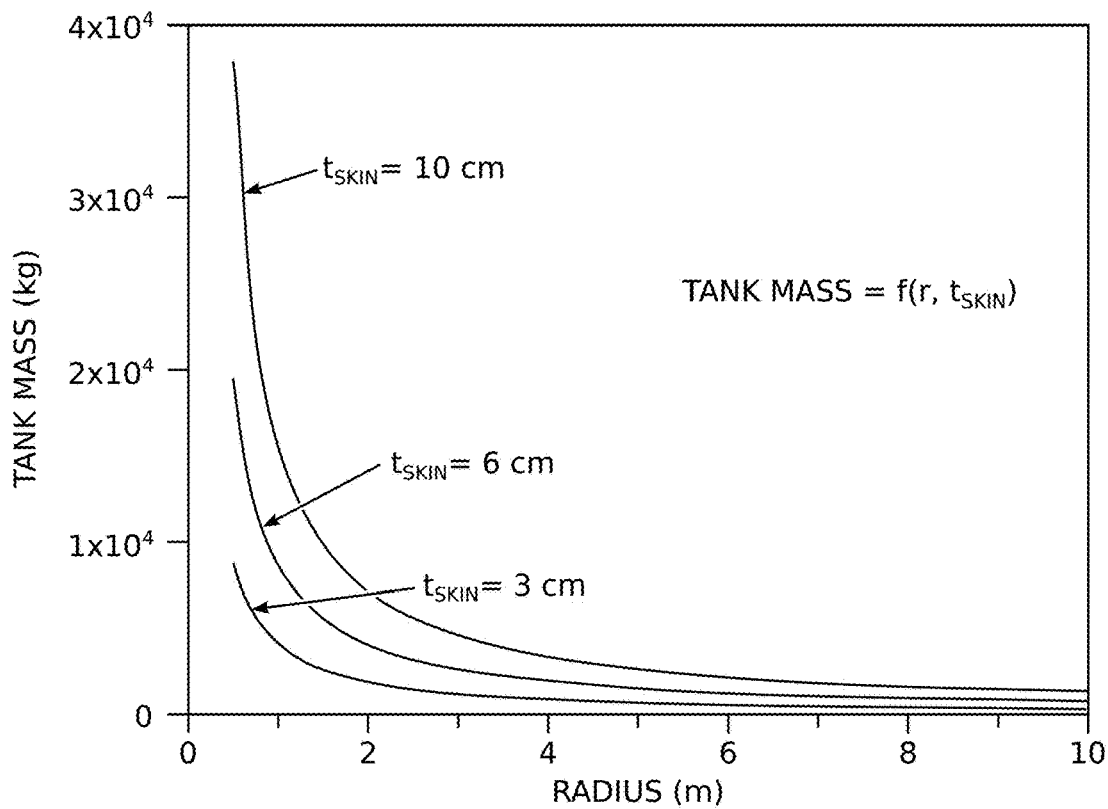
FIG. 12 depicts the mass of the propellant tank $m=f(r,t_{skin})$ for the skin thickness of $t_{skin}=3$, 6, and 10 cm carrying 20 tons of propellant mass.

FIG. 12 depicts the mass of the propellant tank m=f(r,$t_{skin}$) for the skin thickness of $t_{skin}$=3, 6, and 10 cm carrying 20 tons of propellant mass. It is clear from FIG. 12 that the mass of the propellant tank m is inversely proportional to the radius of the propellant tank for a desired volume or mass.

Figure 13A:
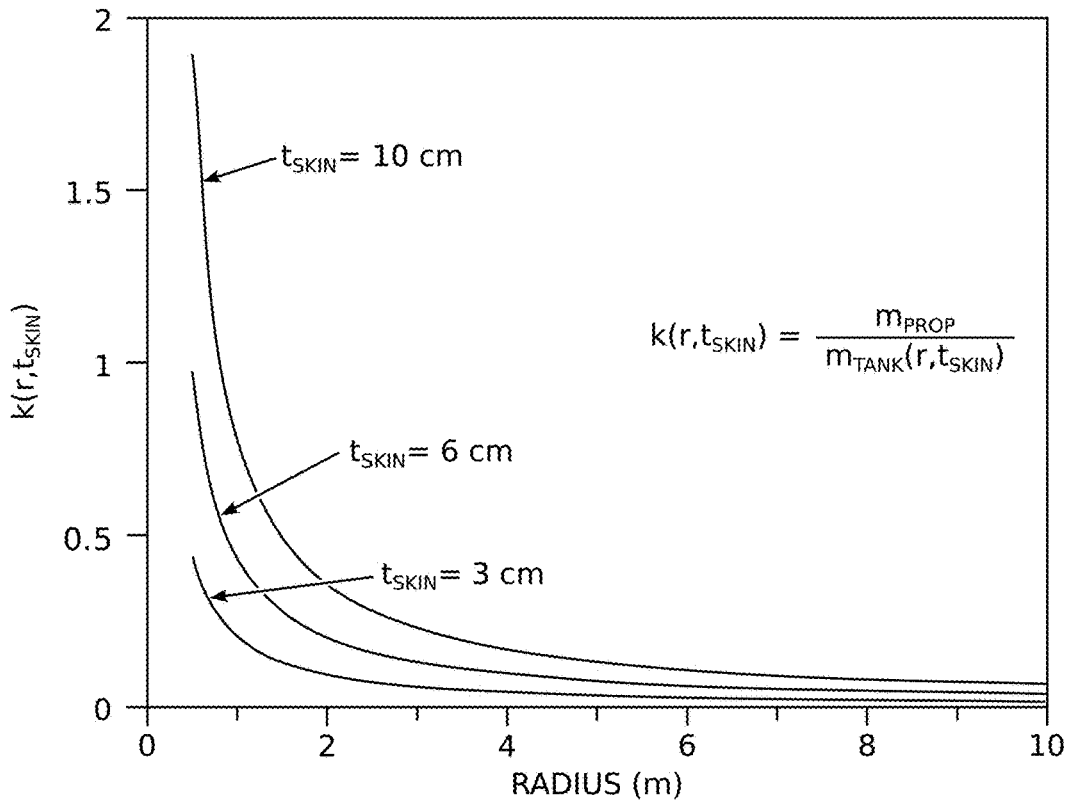
FIG. 13A depicts $k=f(r,t_{skin})$ for an aluminum skin thickness of $t_{SKIN}=3$, 6, and 10 cm when carrying 20 tons of propellant mass.

FIG. 13A depicts k=f(r,$t_{skin}$) for an aluminum skin thickness of $t_{skin}$=3, 6, and 10 cm when carrying 20 tons of propellant mass. It is clear from FIG. 13A that k is inversely proportional to the radius of the propellant tank for a desired volume or mass. Section 8 below describes how k determines the maximum altitude that a rocket can reach.

8. Thrust, $F_T$ and the Remaining Rocket Parameters Calculated from $\mu_f = m_f/m_0$ and k=$m_{tank}/m_{prop}$.

The introduction of the parameter k leads into very elegant solutions for all the rocket parameters and very interesting design relations. Propellant with a mass of $m_{prop}$ in a rocket is stored in a cylindrical tank with a mass of $m_{tank}$. Since most of the rocket mass is propellant mass, most of the volume of the rocket will also be the volume of the propellant tank. Since the density of the propellant is known, it is straightforward to calculate the cylindrical volume of the propellant tank for a given diameter. The mass of the tank can be calculated with a given skin thickness and density of the tank.

$$\mu_f = \frac{m_f}{m_0} = \frac{m_0 - m_{prop}}{m_0} = 1 - \frac{m_{prop}}{m_0} \quad (8.1)$$

Solving $m_{prop}$ from (8.1) gives, $$\frac{m_{prop}}{m_0} = 1 - \mu_f \quad (8.2)$$

The initial mass $m_0$ is related to the thrust $F_T$ given as, $$m_0 = \frac{F_T}{g \cdot T2W} \quad (8.3)$$

Solving $m_{prop}$ from (8.2) gives, $$m_{prop} = m_0(1 - \mu_f) \quad (8.4)$$

Resulting in, $$m_{prop} = \frac{F_T}{g \cdot T2W}(1 - \mu_f) \quad (8.5)$$

With the introduction of the parameter k, the propellant tank mass can be simply related to the propellant mass. Employing the parameter k the initial rocket mass $m_0$ becomes, $$m_0 = m_{prop}(1+k) + m_{RE} + m_{PAY} \quad (8.6)$$

As can be seen $m_{prop}(1+k)$ term in (8.6) gives the sum of the propellant mass and the mass of the tank with which it is stored. In general, propellant mass also is the main structure of the rocket, everything is basically attached to it, which means that the parameter k determines a significant portion of the rocket mass as a function of the propellant mass which is in the rocket equation.

Other parameters in equation (8.6) are $m_{RE}$, which is the mass of the rocket engine that includes all the other additional mass in the rocket like pumps, electronics, guidance, etc. $m_{PAY}$ is the mass of the payload and associated additional mass related to its housing. Substituting (8.5) into (8.6) gives the thrust equation, $$\frac{F_T}{g \cdot T2W} = \frac{F_T}{g \cdot T2W}(1 - \mu_f)(1 + k) + m_{RE} + m_{PAY} \quad (8.7)$$

Both sides of the equation are equal to the total initial mass $m_0$ and becomes the thrust equation. The thrust $F_T$, required to put a payload $m_{PAY}$ into an altitude of h, equation (8.7) can be solved giving, $$F_T = \frac{g \cdot T2W(m_{RE} + m_{PAY})}{1 - (1 - \mu_f)(1 + k)} \quad (8.8)$$

Relation (8.8) assumes that the rocket has a single rocket engine. Simplifying the denominator gives, $$F_T = \frac{g \cdot T2W(m_{RE} + m_{PAY})}{\mu_f(1 + k) - k} \quad (8.9)$$

Since there is only one rocket engine and its thrust and mass are already specified as $F_T$ and $m_{RE}$, solving its thrust does not make much sense, as it is already known. Instead, one can calculate the payload $m_{PAY}$ that the rocket can put to an altitude h with that thrust, $$m_{PAY} = \frac{F_T[\mu_f(1 + k) - k]}{g \cdot T2W} - m_{RE} \quad (8.10)$$

Since $F_T$, $m_{PAY} > 0$ and must be finite, the denominator of relation (8.9) puts some important restrictions between $\mu_f$ and k as, $$\mu_f > \frac{k}{(1 + k)} \quad (8.11)$$

and, $$k < \frac{\mu_f}{(1 - \mu_f)} \quad (8.12)$$

Figure 13B:
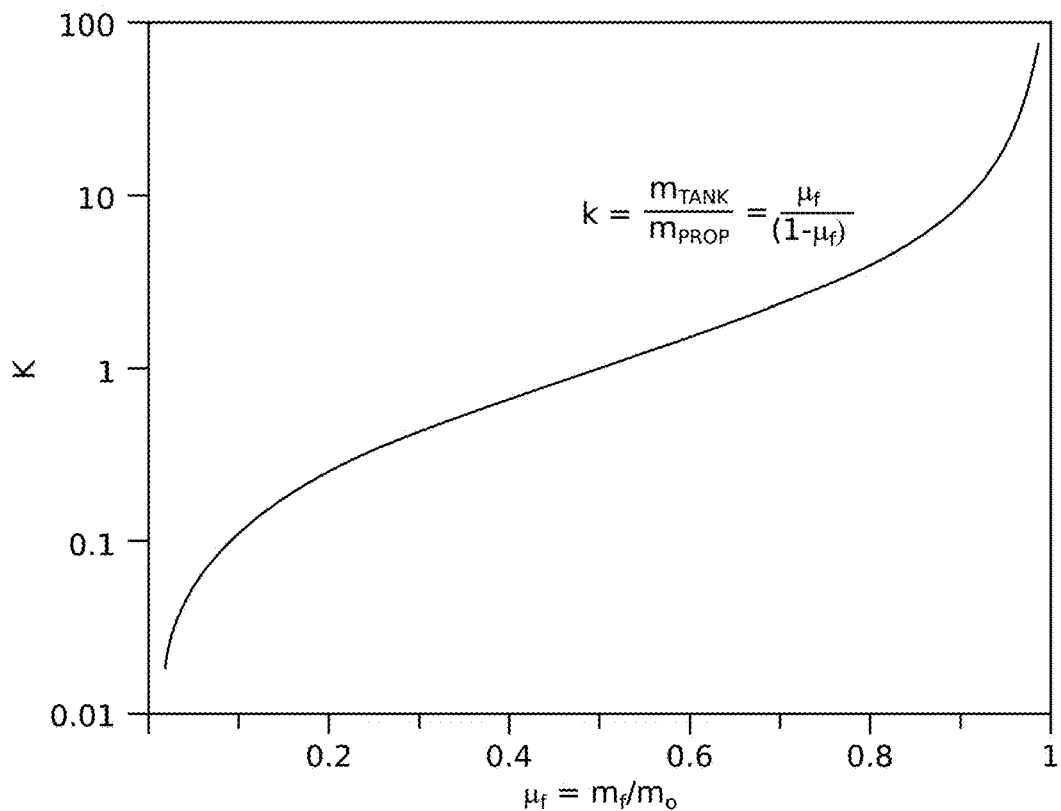
FIG. 13B depicts the plot of relation (8.12), which gives the minimum value of $k=k_{MAX}$ that needs to be satisfied to give a desired value of $\mu_f$.

FIG. 13B depicts the plot of relation (8.12), which gives the minimum value of $k=k_{MAX}$ that needs to be satisfied to give a desired value of Ulf. Since a given value of $\mu_f$ also gives the height $h_{INV2}$ ($\mu_f$,T2W) that the rocket reaches, a very important relationship exists between the height that the rocket can reach and the $k_{MAX}$ value, as shown in FIG. 13C.

Figure 13C:
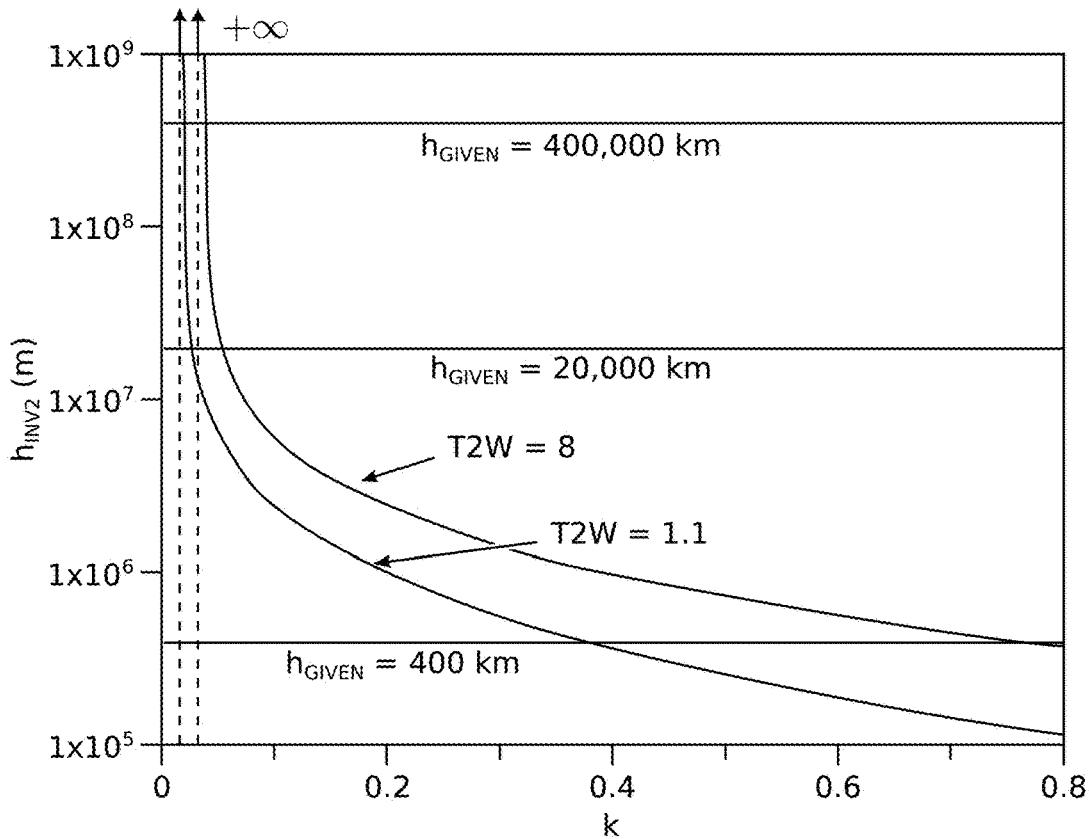
FIG. 13C depicts the height $h_{INV2}(k_{MAX}, T2W)$ function, an important relationship between the height that the rocket can reach and the $k_{MAX}$ value that the rocket design must satisfy, graphically permitting the determination of $k_{MAX}$ for $h_{GIVEN}=400$ km, 20,200 km, and 400,000 km.

FIG. 13C depicts the height $h_{INV2}$ ($k_{MAX}$,T2W) function, an important relationship between the height that the rocket can reach and the $k_{MAX}$ value that the rocket design must satisfy, graphically permitting the determination of $k_{MAX}$ for $h_{GIVEN}$=400 km, 20,200 km, and 400,000 km. As can be seen, reaching a given altitude requires a minimum value of K MAX to be satisfied. The higher the desired altitude, the smaller the value of $k_{MAX}$ that needs to be satisfied. If $k \geq k_{MAX}$, the rocket cannot reach the given altitude, $h_{GIVEN}=h_{INV2}(k_{MAX},T2W)$.

Relations (8.11) and (8.12) give the necessary conditions to be satisfied between them. The solution of the rocket equation for the rocket to reach the desired altitude h for a given T2W gives $\mu_f$(h,T2W) and (8.12) gives the minimum value of k needed. If this number is not a realizable quantity, then the launch will not be successful, leaving a multi-stage rocket as the only option to employ for a smaller k, which is an original relationship derived herein. If k is already given, then (8.11) gives the maximum value of $\mu_f$ and moreover the maximum altitude the rocket can reach. Since FIG. 13A gives k=f(r,$t_{skin}$), and as shown in FIG. 13C there is a functional relation between $k_{MIN}$ and $h_{INV2}(k_{MIN}$,T2W), the altitude that the rocket can reach, a functional relationship $h_{INV2}(r_{MIN}$,T2W), the radius of the rocket can be derived which is of interest. In other words, to reach a desired altitude there is a minimum rocket radius $r_{MIN}$ that enables it, which is a function of burn chemistry, density of the oxidizer and fuel, their mix ratios, thickness of skin, its density, and machining. Ideally a value can be given to the denominator of (8.9) which satisfies (8.11) and (8.12).

Figure 13D:
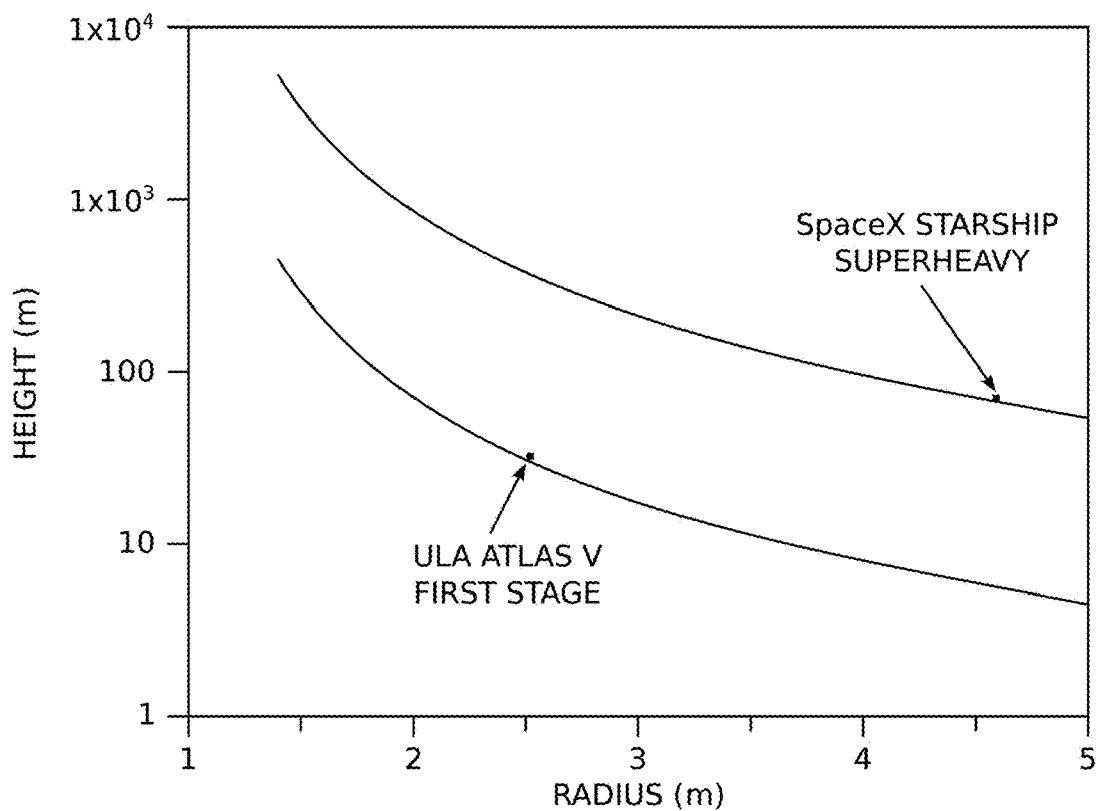
FIG. 13D depicts the SpaceX Starship Super Heavy (loaded with 3,400 tons of propellant) and the ULA Atlas first stage (loaded with 284 tons of propellant) booster heights with a $t_{SKIN}$ radius of 3 [cm], with respective diameters of 9 [m] and 3.81 [m].

FIG. 13D depicts the SpaceX Starship Super Heavy (loaded with 3,400 tons of propellant) and the ULA Atlas first stage (loaded with 284 tons of propellant) booster heights with a $t_{skin}$ radius of 3 [cm] with respective diameters of 9 [m] and 3.81 [m]. The relationship between the booster radius and the booster height is shown in FIG. 13D for the SpaceX Starship Super Heavy and the ULA (United Launch Alliance) first stage of Atlas V for known parameters such as their actual propellant mass and tank parameters. Both curves in FIG. 13D show an excellent fit for rocket booster heights. For the SpaceX Super Heavy the curve gives 71 [m] of booster height with the actual diameter of 9 [m] loaded with 3,400,000 [kg] of propellant mass. For ULA's first stage of Atlas V the curve gives 32.5 [m] of booster height at the actual diameter of 3.81 [m] loaded with 284,089 [kg] of propellant mass.

Figure 13E:
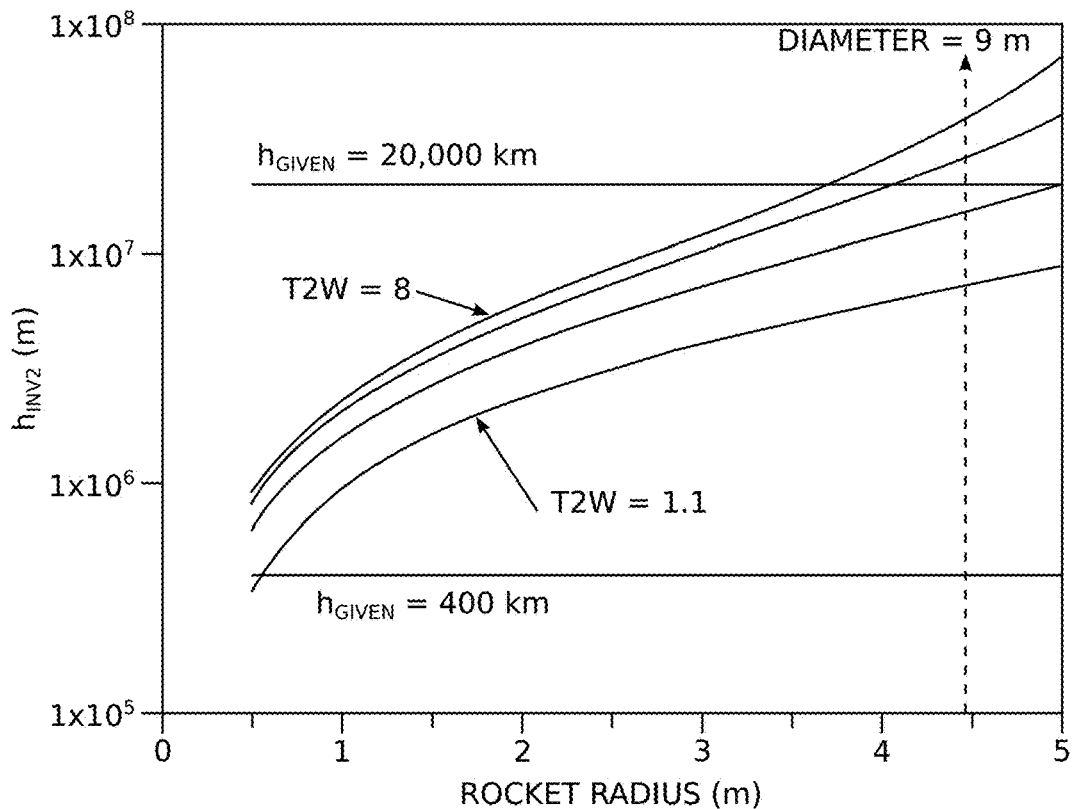
FIG. 13E depicts $h_{INV2}(r, T2W)$, where r is the rocket diameter of the SpaceX Starship Super Heavy loaded with 3,400 Tons of propellant having $t_{SKIN}=3$ [cm].

FIG. 13E depicts $h_{INV2}$(r,T2W), where r is the rocket diameter of the SpaceX Starship Super Heavy loaded with 3,400 Tons of propellant having $t_{SKIN}$=3 [cm]. FIG. 13E shows the relationship between the SpaceX Starship Super Heavy maximum altitude as a function of its radius loaded with 3,400,000 [kg] of propellant mass and same tank parameters for T2W=1.1, 2, 4, and 8. It is clear that having a larger diameter gives a lower k, resulting in a higher maximum altitude that can be reached. The lowest k can be obtained with a spherical tank geometry giving the smallest area enclosing a given propellant volume.

If the single rocket engine cannot give the desired thrust $F_T$, then several rocket engines must be deployed. For this case the thrust relation (8.9) must be modified. Assuming all the rocket engines have the same mass $m_{PRE}$ (mass Per Rocket Engine) and they all generate the same thrust per engine $F_{TPRE}$, the number of rocket engines PRE can be calculated from the calculated Fr. The equivalent rocket engine mass $m_{RE}$ and the total thrust in (8.6) and (8.7) become related to the number of rocket engines that gives the necessity of including this effect. As an example, for cases where the needed thrust Fr is larger than $F_{TPRE}$, the number of rocket engines $n_{RE}$ that is needed becomes, $$n_{RE} = \frac{F_T}{F_{TPRE}} \geq 1 \quad (8.13)$$

where, $F_{TPRE}$ is the thrust per rocket engine. There can only be an integer number of rocket engines and this number also has to be greater than 1. The number $n_{RE}$ as calculated by relation (8.13) does not necessarily give an integer number. It can even be a number smaller than 1 if the calculated thrust $F_T$ is less than the selected rocket engine thrust $F_{TPRE}$. Therefore, $n_{RE}$ is named the "engine thrust scaling factor" to represent its non-integer value. The engine thrust scaling factor $n_{RE}$ is used to calculate the total equivalent rocket engine mass to match the needed thrust $F_T$. Using $F_{TPRE}$, the corresponding equivalent total rocket engine mass $m_{RE}$, which appears in the Fr thrust relation (8.9) becomes, $$m_{RE} = n_{RE} \cdot m_{PRE} = \frac{F_T}{F_{TPRE}} m_{PRE} \qquad (8.14)$$

A more widely used rocket engine parameter instead of mass per rocket engine $m_{PRE}$ is the thrust-to-weight ratio of the rocket engine $T2W_{PRE}$, a number like 100 to 200, a much larger number than any jet engine. As an example, the jet engine with the highest thrust-to-weight ratio is 8 for the GE J85 powering many airplanes like the F-5 and T-38, giving 13.1 [kN] with a mass of 140 kg (afterburner versions give 22 [kN] with a mass of 230 [kg]). The F-1 rocket engine that powered the Saturn-5 had a thrust-to-weight ratio of 94. This is an important parameter in making the rocket engine selection. Using the $T2W_{PRE}$ parameter the mass per rocket engine can be calculated as, $$m_{PRE} = \frac{F_{TPRE}}{g \cdot T2W_{PRE}} \qquad (8.15)$$

Substituting (8.15) in (8.14) gives, $$m_{RE} = \frac{F_T}{F_{TPRE}} \cdot \frac{F_{TPRE}}{g \cdot T2W_{PRE}} = \frac{F_T}{g \cdot T2W_{PRE}} \qquad (8.16)$$

Substituting (8.16) in (8.7) gives another term with $F_T$ dependency on the right-hand side as, $$\frac{F_T}{g \cdot T2W} = \frac{F_T}{g \cdot T2W}(1-\mu_f)(1+k) + \frac{F_T}{g \cdot T2W_{PRE}} + m_{PAY} \qquad (8.17)$$

Arranging (8.16) gives, $$\frac{F_T}{g \cdot T2W}\left[1 - (1-\mu_f)(1+k) - \frac{T2W}{T2W_{PRE}}\right] = m_{PAY} \qquad (8.18)$$

As can be seen the thrust equation (8.9) incorporates another parameter involving the ratio between the rocket engine thrust-to-weight number and the rocket thrust-to-weight number. Since rocket mass is larger than the rocket engine mass, and the only thrust in the rocket is given by the rocket engine, this ratio is always given as less than 1 as, $$\frac{T2W}{T2W_{PRE}} < 1 \text{ or } T2W < T2W_{PRE} \qquad (8.19)$$

Solving thrust Fr from the modified thrust equation (8.18) gives, $$F_T = \frac{g \cdot T2W}{\mu_f(1+k) - k - \frac{T2W}{T2W_{PRE}}} m_{PAY} \qquad (8.20)$$

To have $F_T > 0$ and a bounded value for it, the $\mu_f$, k relations derived at (8.11) and (8.12) must be modified as, $$\mu_f > \frac{k + \frac{T2W}{T2W_{PRE}}}{(1+k)}$$

where $0 < \mu_{MIN} < \mu_f < 1$ \qquad (8.21)

and, $$k < \frac{\mu_f - \frac{T2W}{T2W_{PRE}}}{(1-\mu_f)} \qquad (8.22)$$

For k>0, relation (8.22) enforces, $$\frac{T2W}{T2W_{PRE}} < \mu_f \qquad (8.23)$$

Since $0 < \mu_{MIN} < \mu_f < 1$, it also enforces, $$T2W < < T2W_{PRE} \qquad (8.24)$$

A condition far "stronger" than the relation given in (8.18), since $\mu_f$ is generally much smaller than 1 for any orbital altitude, can be seen in FIG. 6A, FIG. 7E, FIG. 8, and FIGS. 9A-10B. T2W is a user defined parameter entered into the modified rocket equation, where the best value for the mission is searched. On the other hand, $T2W_{PRE}$ is a given, and just depends on the rocket engine that is selected, not a user defined parameter, the larger the better along with other parameters for selecting the rocket engine. In general, the larger the $T2W_{PRE}$ number, the smaller the ratio is in (8.23) for any given T2W.

As can be seen the ratio (8.23) also determines the denominator in the thrust relation. Besides satisfying relation (8.22) for k, the numerical value of the denominator D is something which can be optimized for the minimum thrust needed for the mission. The denominator of equation (8.20) can be re-written with the denominator D represented explicitly as, $$F_T = \frac{g \cdot T2W}{D} m_{PAY} \qquad (8.25)$$

Where D is, $$\mu_f(1+k) - k - \frac{T2W}{T2W_{PRE}} = D \qquad (8.26)$$

Solving k from (8.26) gives, $$k = \frac{\mu_f - D - \frac{T2W}{T2W_{PRE}}}{(1-\mu_f)} \qquad (8.27)$$

Since k>0, the upper bound of D becomes, $$0 < D < \left(\mu_f - \frac{T2W}{T2W_{PRE}}\right) < 1 \qquad (8.28)$$

As can be seen the denominator D is always less than 1 and relation (8.28) gives an upper bound to T2W as, $$T2W_{MAX} \leq \mu_f T2W_{PRE} \quad (8.29)$$

As can be seen the inequalities and relations given by (8.22)-(8.29) are very powerful relations. Once U is solved, the equations give what k and T2W can be used with very simple relations. Setting all the parameters as a function of the calculated value of $\mu$ and satisfying (8.27)-(8.29) becomes a simple task. A simple example can demonstrate it as, $$\frac{T2W}{T2W_{PRE}} = 0.25\mu_f \text{ and } D = 0.5\mu_f \quad (8.30)$$

Resulting k becomes, $$k = \frac{\mu_f - 0.5 \cdot \mu_f - 0.25 \cdot \mu_f}{(1 - \mu_f)} = \frac{0.25}{(1 - \mu_f)}\mu_f \quad (8.31)$$

If this is not realizable, k then defines the need for multi-stage rockets and aids a very easy method of figuring each stage constraint. As can be seen in (8.30) for a realizable k defining a set of targeted $\mu_f$ for each stage becomes a trivial task. Relation (8.29) is thus the key starting point for the rocket design.

To this point the theoretical and engineering aspects of rockets have been explained in a mathematical framework. At this point it is useful to examine actual technical data of some well-known rockets for comparison the calculations that have been made, derived, and formulated.

Historically, the most important rocket is probably the German V-2 of the World War II. The first successful V-2 launch was on 3 Oct. 1942 reaching an altitude of 84.5 km. It burned 55 [kg/s] alcohol with 25% water mixture and 68 [kg/s] of Liquid OXygen, LOX. Total burn time was 65 second and it carried a fuel mass was of 3,810 [kg] (% 75 Ethanol, % 25 Water) and 4,910 [kg] LOX as oxidizer. Its maximum range was 320 [km], reaching 88 [km] altitude, 206 [km] if launched vertically. It carried a 910-1,000 [kg] Amatol high explosive warhead, and more than 3,000 of them were launched.

Space launches are expensive undertakings. An Ariene cost per launch ranges 139,000,000-185,000,000 Euros, depending on the payload and launch orbit.

Table 4A gives some technical data for most well-known air-to air rockets. The AIM-9 Sidewinder was used in downing all the Chinese balloons by the US Air Force.

TABLE 4A specifications for well-known air-to-air missiles

| Missile | Thrust Rocket Motor Model | Isp | Mass Flow Rate | Diameter | Length | Mass | Burn Time |
|---|---|---|---|---|---|---|---|
| AIM-9 Sidewinder | 17.792 [kN] Hercules and Bermite Mk 36 Mod 71, 8 (solid propellant) | | | 0.127 m | 2.87 m | 85.5 kg | |
| Sparrow | 35 [KN] Aerojet 1.8KS7800 (solid propellant) | 238.8 s | 14.56 kg/s | 0.2 m | 3.7 m | 230 kg (40 kg fragmentation warhead) | 1.8 s |

TABLE 4B specifications for well-known rockets

| Rocket | Engine | Diameter | Height | Dry Mass | Propellant Mass | Burn Time |
|---|---|---|---|---|---|---|
| TITAN II GLV (Gemini Launch Veichle) | LR-87-AJ-1 | 3 m | 33 m | 150 Ton | | 156 s |
| Atlas V First Stage | Enorgamash RD-180 | 3.81 m | 32.5 m | 333 Ton | 284 Ton | 255 s |
| Saturn V First Stage | 5 X F-1 | 10.1 | 42.1 m | 130 Ton | 2,290 Ton | 168 s |
| Space Shuttle SLWT (Super Light Tank) | 3 X Rocketdyne RS-25 + 2 X Thiokol/Pratt-Withney SRB | 8.4 m | 46.9 m | 26.5 Ton | 760 Ton | 510 s |

TABLE 4B-continued specifications for well-known rockets

| Rocket | Engine | Diameter | Height | Dry Mass | Propellant Mass | Burn Time |
|---|---|---|---|---|---|---|
| Ariene-5 First Stage | Vulcain-2 | 5.4 m | 46-52 m | 777 Ton | | |
| Falcon V1.1 | Merlin | 3.7 m | 68.4 m | 506 Ton | | 180 |
| SpaceX Starship Heavy | Raptor | 9 m | 71 m | 200 Ton | 3,400 Ton | Failed Launch |
| Soyuz First Stage | 4 RD-107 4 X 813 kN | 2.68 | 19.6 | 3,784 kg | 39.2 Ton | 118 s |

9. Newton's Method of Solving Non-Linear Equations and Kantorovich's Theorem for Guaranteeing Quadratic Convergence.

As can be seen in FIG. 4A-FIG. 9A all the functions generated by the rocket equation for constant acceleration or for the inverse square gravitational field modification made in this work are non-linear functions in $\mu_f$. The bulk of the engineering problem in rocketry is to design a rocket that can reach a given altitude or an orbit with desired orbital parameters and a given payload. For this work a rocket must be designed that can reach a given altitude higher than the balloon that it is intended to bring down a balloon with a given payload. This requires the solution of several non-linear equations. The task is to solve the nonlinear equations $h_{GIVEN} - h(\mu_f, T2W) = 0$ for the constant acceleration assumption, or $h_{GIVEN} - h_{INV2}(\mu_f, T2W) = 0$ for the inverse square gravitational field assumption for a given T2W. Since the rocket design requires optimization, this task may be done many times.

Conventionally, the solutions are accomplished by graphical methods as explained above. The graphical solution method can be implemented into a computer program by generating n equally spaced sample points in the interval of $\mu_{MIN}$ and $\mu_{MAX}$ and calculating $h(\mu_f, T2W)$ or $h_{INV2}(\mu_f, T2W)$ functions at each sample point k, where $1 \leq k \leq n$. Then the interval is found within $h_{GIVEN}$ resides given as, $h[\mu_f(k), T2W] \leq h_{GIVEN} \leq h[\mu_f(k+1), T2W]$ for constant acceleration assumption or $h_{INV2}[\mu_f(k), T2W] \leq h_{GIVEN} \leq h_{INV2}[\mu_f(k+1), T2W]$ if the inverse square gravitational field assumption is employed. The only condition that needs to be satisfied is $h(\mu_{MIN}, T2W) \geq h_{GIVEN} \geq h(\mu_{MAX}, T2W)$ for constant acceleration assumption or $h_{INV2}(\mu_{MIN}, T2W) \geq h_{GIVEN} \geq h_{INV2}(\mu_{MAX}, T2W)$ if the inverse square gravitational field assumption is employed. For constant acceleration assumption $\mu_{MIN}$ and $\mu_{MAX}$ are $\mu_{MIN} = \delta$ and $\mu_{MAX} = 1$, and for the inverse square gravitational field assumption $\mu_{MIN} = \mu_{ASYM}(T2W) + \delta$ and $\mu_{MAX} = 1$ where $\delta$ is a small enough value to satisfy the given simple conditions as explained above, as well as in Section 6.

Once the interval k, where $1 \leq k \leq n$, and where $h_{GIVEN}$ resides is found, linear interpolation, quadratic, or a cubic spline fit can be performed to get a better approximation of the solution. In this work Newton's method is employed, which gives quadratic convergence if certain conditions are satisfied following the interpolation.

Newton's method is the most widely used non-linear equation solution method and it requires an initial approximation. Also known as Newton-Raphson method, it is based on Taylor's expansion of a non-linear function around an initial approximation. Newton used the method to solve a third order equation, a single non-linear equation, like in this work. Over the years Newton's method was generalized for systems of equations as well. If the initial approximation meets certain criteria, it will converge quadratically, if not it can have a slow rate of convergence, or in some cases, it can even diverge. Like in any iterative method a good initial approximation can eliminate problems related to convergence.

Since every non-linear problem is unique, before going into Newton's method it is necessary to go over the initial approximation methodology employed for the solution of the non-linear equations faced in this work. The methodology is based on a computer program adaptation of the geometrical method of solving non-linear equations. The computer algorithm for solving the equation geometrically $h_{GIVEN} - h(\mu_f, T2W) = 0$ is as follows:

a. Find $\mu_{MIN}$ and $\mu_{MAX}$ where $h(\mu_{MIN}, T2W) > h_{GIVEN}$ and $h(\mu_{MAX}, T2W) < h_{GIVEN}$. This is done by solving the asymptote equation (6.7) with Newton's method to get $\mu_{ASYM}(T2W)$, which is the x intercept of the asymptote along with an arbitrarily defined small enough $\delta$.

ii) Equally divide the region starting from $\mu_{MIN}$ to $\mu_{MAX}$ with n sample points, having $\mu_f(1) = \mu_{MIN}$ and $\mu_f(n) = \mu_{MAX}$. Since for $h(\mu_f, T2W)$ the asymptote for this curve is at $\mu_f = 0$, which $h(\mu_f, T2W) \rightarrow +\infty$ for $\mu_f = 0$. This makes it clear that $\mu_{MIN} > 0$. Simply a small enough $\delta$ can be found that gives $h(\mu_{MIN}, T2W) > h_{GIVEN}$, which is an important condition to satisfy. Since there is no computational value issue in calculation of $\mu_f = 1$, establishing a value for $\mu_{MAX}$ is more straightforward, therefore setting $\mu_{MAX} = 1$ does not create a computational issue.

iii) Calculate $h(\mu_f, T2W)$ at each sampling point, having $h(1) = h[\mu_f(1), T2W]$ and $h(n) = h[\mu_f(n), T2W]$.

iv) Find the interval k, where $h_{GIVEN}$ resides with $h[\mu_f(k), T2W] \leq h_{GIVEN} \leq h[\mu_f(k+1), T2W]$.

v) Apply linear interpolation to calculate the initial approximation of $\mu_f$ at $h_{GIVEN}$ noted as $\mu_f^{(o)}$.

The algorithm for solving the equation $h_{GIVEN} - h_{INV2}(\mu_f, T2W) = 0$.

The only difference from the earlier algorithm given is in equally dividing the region starting from $\mu_{MIN}$ to $\mu_{MAX}$ with n sample points, having $\mu_f(1) = \mu_{MIN}$ and $\mu_f(n) = \mu_{MAX}$. The importance of finding a $\mu_{MIN}$, just a small $\delta$ larger then $\mu_{ASYM}(T2W)$ giving $h_{INV2}(\mu_{MIN}, T2W) > h_{GIVEN}$, has been pointed out above in the explanation of FIG. 7F, indicating that the $h_{INV2}(\mu_{MIN}, T2W)$ function becomes non-physical for the interval $0 \leq \mu_f \leq \mu_{ASYM}(T2W)$.

As can be seen having a larger number of sampling points gives a more accurate initial approximation at any point.

Figure 9A:
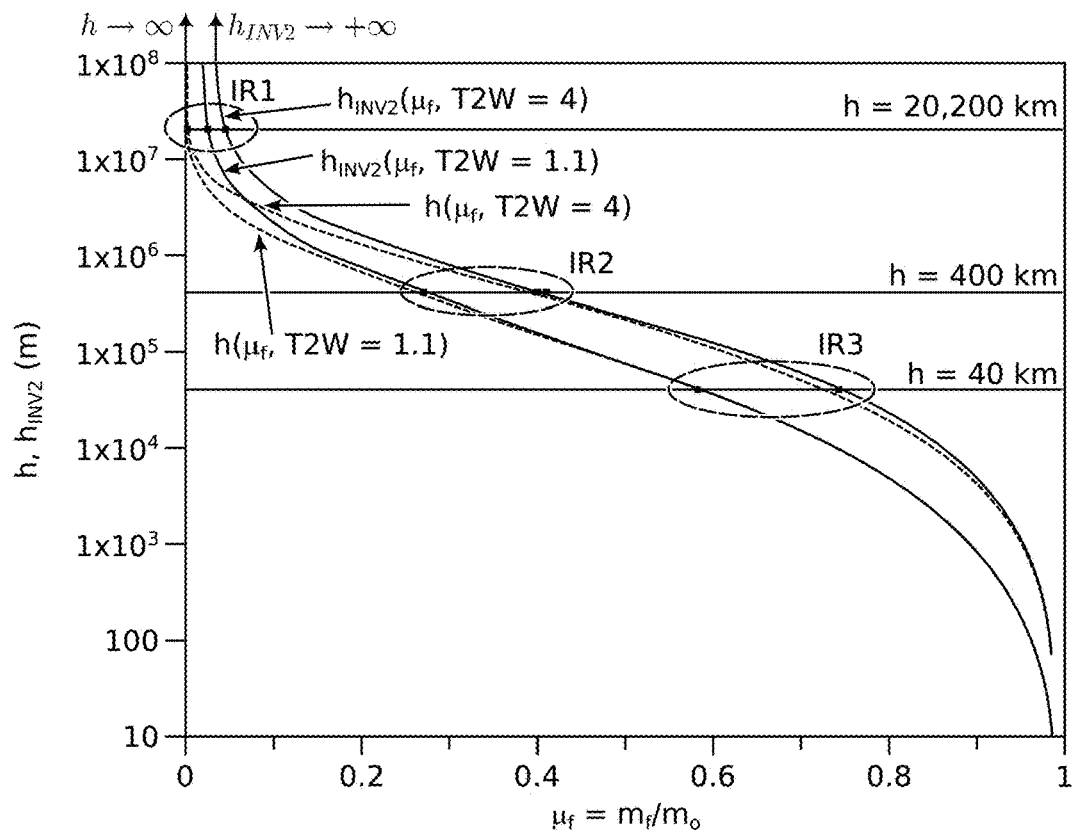
FIG. 9A depicts climb altitude $h_{INV2}(\mu_f, T2W)$ and inverse square gravitational field $h(\mu_f, T2W)$ functions for T2W=1.1 and 4 constructed over 400 uniformly spaced discrete sampling points.

FIG. 9A depicts climb altitude $h_{INV2}(\mu_f, T2W)$ and inverse square gravitational field $h(\mu_f, T2W)$ functions for T2W=1.1 and 4 constructed over 400 uniformly spaced discrete sampling points. The horizontal lines represent $h_{GIVEN} = 40, 400,$ and 20,200 km altitudes, where the intersection points of these lines with the functions becomes the geometric solution to $h_{GIVEN} - h_{INV2}(\mu_f, T2W) = 0$ and $h_{GIVEN} - h(\mu_f, T2W) = 0$. At $\mu_f > 0.3$, the $h(\mu_f, T2W)$ and $h_{INV2}(\mu_f, T2W)$ curves become indistinguishable. The Intersection Regions between the functions and $h_{GIVEN}$ lines are circled as IR 1, IR 2, and IR 3.

Figure 9B:
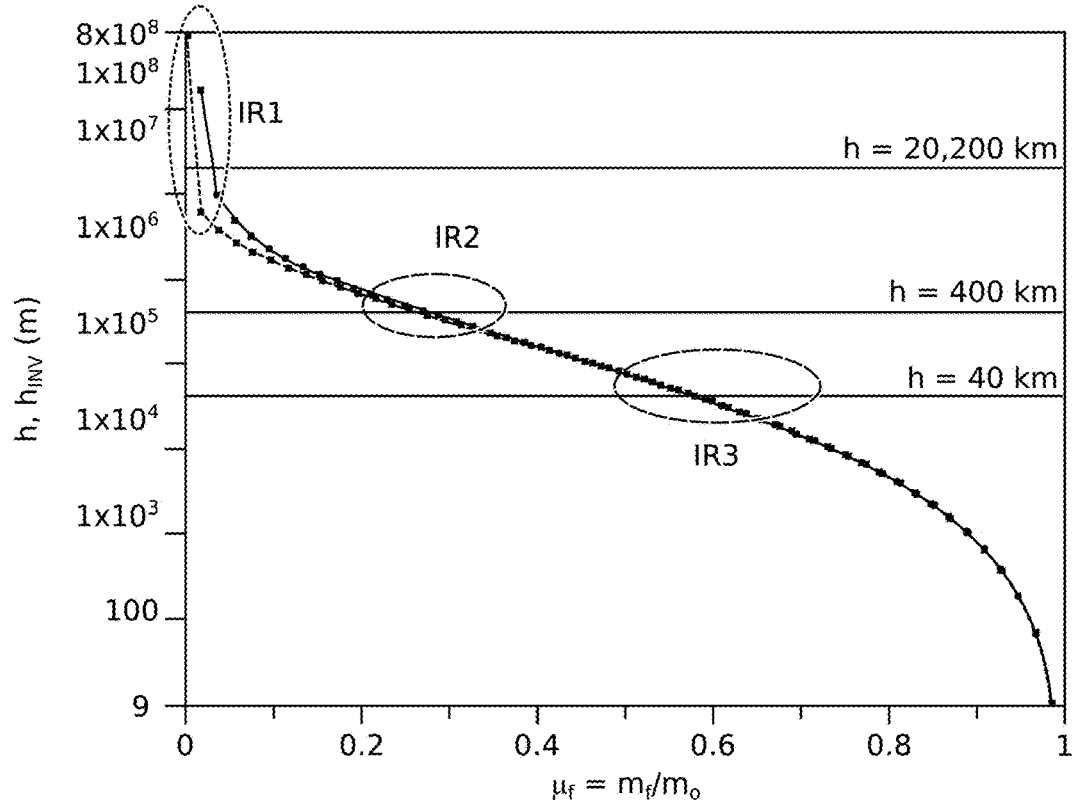
FIG. 9B depicts the functions plotted in FIG. 9A constructed with 40 discrete sampling points marking the curves to show a numerical algorithm for implementing the geometrical solution method in a computer program based on interpolation between the discrete sampling points.

FIG. 9B depicts the functions plotted in FIG. 9A constructed with 40 discrete sampling points marking the curves to show a numerical algorithm for implementing the geometrical solution method in a computer program based on interpolation between the discrete sampling points.

Figure 9C:
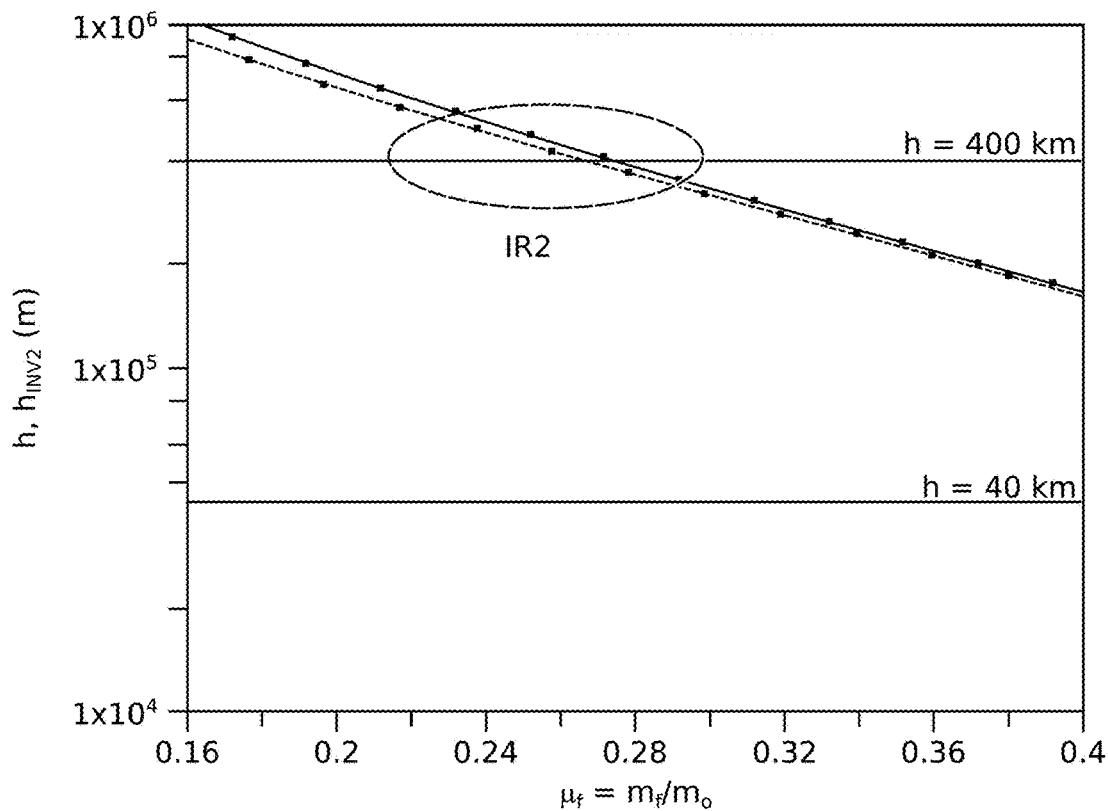
FIG. 9C depicts a detailed view of the IR 2 region showing the discrete sampling points in the neighborhood of intersection with $h_{GIVEN}=40$ km of the $h_{INV2}(\mu_f, T2W=1.1)$ and $h(\mu_f, T2W=1.1)$ functions.
Figure 10A:
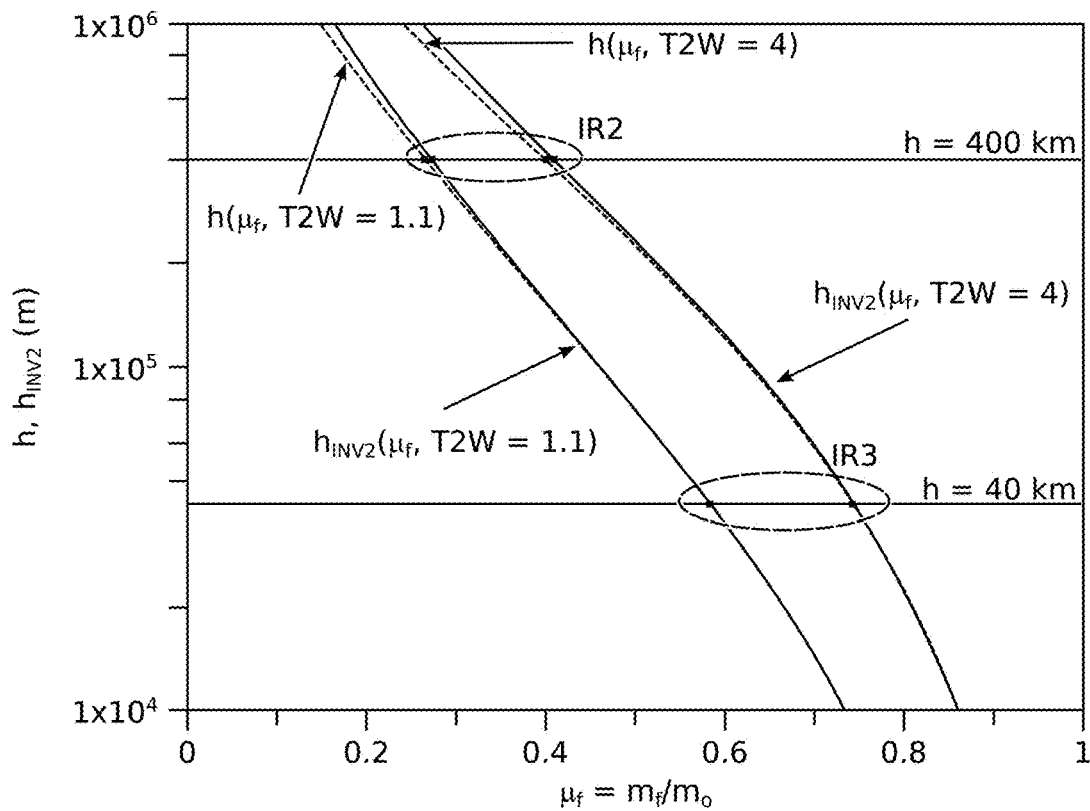
FIG. 10A depicts a detailed view of the IR 1 and IR 2 regions showing discrete sampling points in the neighborhood of intersection between $h_{GIVEN}=40$ km and 400 km for the $h_{INV2}(\mu_f, T2W=1.1)$ and $h(\mu_f, T2W=1.1)$ functions.

FIG. 9C depicts a detailed view of the IR 2 region showing the discrete sampling points in the neighborhood of intersection with $h_{GIVEN} = 40$ km of the $h_{INV2}(\mu_f, T2W=1.1)$ and $h(\mu_f, T2W=1.1)$ functions. FIG. 10A depicts a detailed view of the IR 1 and IR 2 regions showing discrete sampling points in the neighborhood of intersection between $h_{GIVEN} = 40$ km and 400 km for the $h_{INV2}(\mu_f, T2W=1.1)$ and $h(\mu_f, T2W=1.1)$ functions.

Figure 10B:
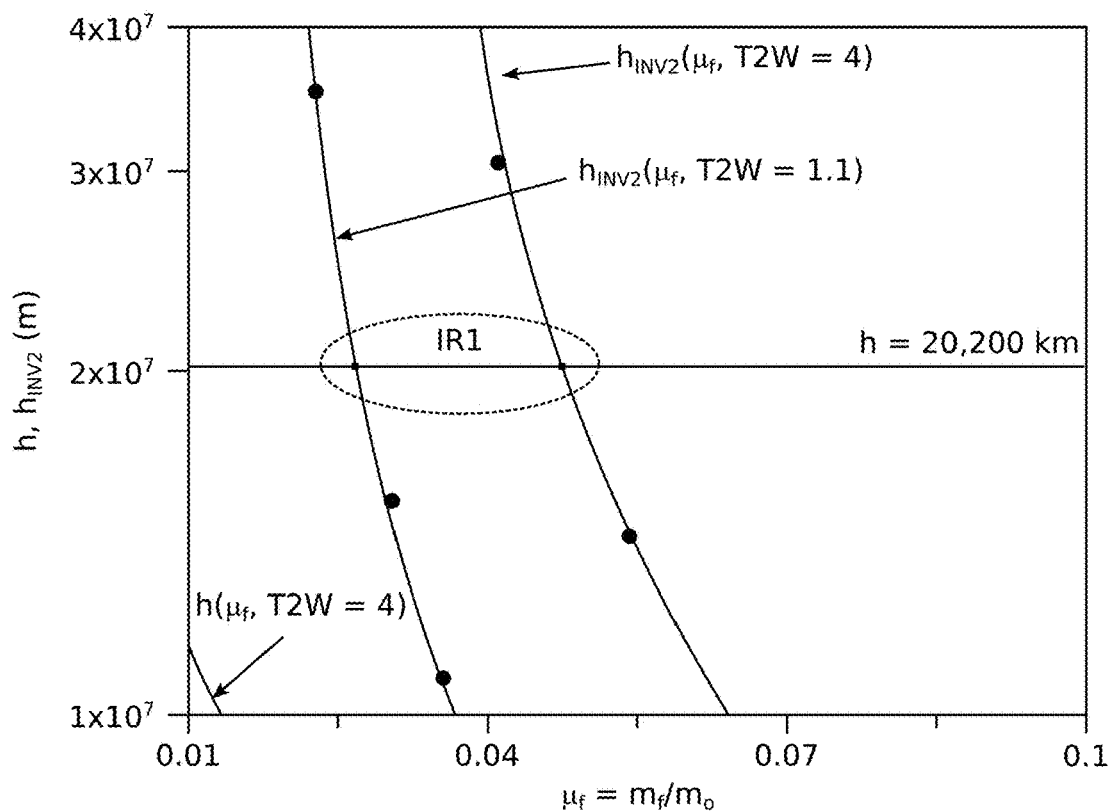
FIG. 10B depicts a detailed view showing discrete sampling points in the neighborhood of the intersection region IR 1 between $h_{GIVEN}=20,200$ km with the $h_{INV2}(\mu_f, T2W=1.1)$ and $h_{INV2}(\mu_f, T2W=4)$ functions.

FIG. 10B depicts a detailed view showing discrete sampling points in the neighborhood of the intersection region IR 1 between $h_{GIVEN} = 20,200$ km with the $h_{INV2}(\mu_f, T2W=1.1)$ and $h_{INV2}(\mu_f, T2W=4)$ functions. In the left lower corner, a small portion of the $h(\mu_f, T2W=4)$ function is in the view. The question of finding simple sufficient conditions for the convergence of Newton's method to a solution of a non-linear system was considered a difficult problem of numerical analysis until L. V. Kantorovich published a theorem in 1937 which guarantees the convergence of Newton's method under very general circumstances, without even assuming the existence of a solution [26-28]. Before getting into Kantorovich theorem, it is useful to start with the Newton's method, to prevent any confusion due to the notation [25-28].

In Newton's method for systems of non-linear equations, let the n equations, $$\phi_i(y_1, y_2, \ldots y_n) = 0 \tag{9.1}$$

For the n unknowns $y_1, y_2, \ldots y_n$ are written in vector form as, $$\Phi(Y) = 0 \tag{9.2}$$

Let $A(Y) = a_{i,j}$ denote the matrix with elements, $$a_{i,j} = \frac{\partial \Phi_i(Y)}{\partial y_j} i, j = 1, 2 \ldots n \tag{9.3}$$

If the vector $Y = Y^{(0)}$ is an initial approximation to a solution of the system (9.2) and if the matrix $A[Y^{(0)}]$ is nonsingular, one may hope that the vector, $$Y^{(1)} = Y^{(0)} - A[Y^{(0)}]^{-1} \Phi[Y^{(0)}] \tag{9.4}$$

Obtained by linearizing the system (9.2) at $Y = Y^{(0)}$ is a better approximation to the solution. If the matrices $A[Y^{(v)}]$ involved continue to be nonsingular, one may hope to obtain a sequence of successively better approximations $Y^{(v)}$, ($v=1, 2, 3, \ldots$) by the algorithm:

$$Y^{(v+1)} = Y^{(v)} - A[Y^{(v)}]^{-1} \Phi[Y^{(v)}] \; v=1,2,3 \ldots \tag{9.5}$$

The vector and matrix norms used in Kantorovich's theorem and throughout are defined as follows: Let V be a vector and $$\|V\| = \text{Max}|v_i| \text{ where } 1 \le i \le n \tag{9.6}$$

and A be a matrix, $$|A| = \text{Max} \sum_{j=1}^{n} |a_{i,j}| 1 \le i \le n \tag{9.7}$$

In Kantorovich's theorem, assume that the following conditions are satisfied: (i) For $Y = Y^{(0)}$, the initial approximation, the matrix $A(Y^{(0)})$ has an inverse $\delta_0 = A(Y^{(0)})^{-1}$ and an estimate of its norm, $$|A^{-1}| = |\Gamma_0| \le B_0 \tag{9.8}$$

(ii) The vector $Y^{(0)}$ approximately satisfies the system of equations (9.2) in the sense that $$|\Gamma_0 \cdot \Phi(Y^{(0)})| \le \eta_0 \tag{9.9}$$

(iii) In the region defined by inequality (9.12) the vector $\Phi(Y)$ is twice continuously differentiable with respect to components of Y and satisfies $$\sum_{j,k=1}^{n} \left| \frac{\partial^2 \Phi_i}{\partial y_i \partial y_j} \right| \le K \text{ where } i = 1, 2, \ldots, n \tag{9.10}$$

(iv) The constants $\eta_0$, $B_0$, and K introduced above satisfy the inequality, $$h_0 = \eta_0 \cdot B_0 \cdot K \le \frac{1}{2} \tag{9.11}$$

Then the system of equations (9.2) has a solution Y* which is in the cube, $$|Y - Y^{(0)}| \le N(h_0) \cdot \eta_0 = \frac{1 - \sqrt{1 - 2 \cdot h_0}}{h_0} \tag{9.12}$$

Moreover, successive approximations of $Y^v$ defined by (9.5) exist and converge to Y and the rate of convergence may be estimated by the inequality, $$|Y^v - Y^*| \le \frac{1}{2^v - 1} (2h_0)^{2^v - 1} \cdot \eta_0 \tag{9.13}$$

From the application point of view, the most difficult problem is to evaluate the $B_0$ parameter in (9.8) for large systems. $\eta_0$ is the correction vector's maximum magnitude norm for the first iteration and can be calculated very easily whenever Newton's method is applied. K is not a difficult parameter to evaluate, because typically each equation is not a function of a large number of unknowns in any discrete variable method. Therefore, $B_0$ is the parameter that makes the Kantorovich's theorem difficult to apply for large systems of non-linear equations.

Kantorovich's theorem can be applied to a single non-linear equation. Since we are only interested in finding sufficient condition for quadratic convergence for a single non-linear equation, the Kantorovich's theorem can be applied with no difficulty. Let the only non-linear equation that needs to be solved be represented as, $$y(x) = 0 \tag{9.14}$$

where it's first derivative with respect to x is, $$f(x) = \frac{dy}{dx} \qquad (9.15)$$

The second derivative of (9.14) with respect to x is, $$g(x) = \frac{d^2y}{dx^2} \qquad (9.16)$$

Let $x^{(0)}$ be the initial approximation to the solution and $$|\Gamma_0| = \frac{1}{|f(x^{(0)})|} \le B_0 \qquad (9.17)$$

Similarly, (9.18) becomes the first correction in Newton's method given as, $$\frac{|y(x^{(0)})|}{|f(x^{(0)})|} \le \eta_0 \qquad (9.18)$$

Finally (9.10) takes the form of, $$g(x^{(0)}) = \left|\frac{d^2y}{dx^2}\right| \le K \text{ at } x = x^{(0)} \qquad (9.19)$$

Resulting in the Kantorovich's quadratic convergence criterion for a single non-linear equation becoming, $$h_0 = \eta_0 \cdot B_0 \cdot K = \frac{|y(x^{(0)})|}{|f(x^{(0)})|} \frac{1}{|f(x^{(0)})|} g(x^{(0)}) \le \frac{1}{2} \qquad (9.20)$$

9.1 Application of the Kantorovich Quadratic Convergence Criteria to the Solution for the Rocket Equation Related Problems As explained in detail above there are three non-linear equations that need to be solved in the rocket related problems. The first one is finding the asymptote x intercept for the inverse square gravitational field formulation given in this work for the rocket equation. This is represented as $\mu_{ASY}$(T2W), which is the solution of (6.7) explicitly given by (6.8), and which can be written in short with the introduction of a constant $\beta$, where $\beta = 2Gm_{EARTH}$, giving $\beta - r_B(\mu_f)v_B^2(\mu_f) = 0$.

The second non-linear equation is the $h_{GIVEN} - h(\mu_f, T2W) = 0$ equation for constant gravitational acceleration and the third one is $h_{GIVEN} - h_{INV2}(\mu_f, T2W) = 0$, the inverse square gravitational field formulation given in this work for the rocket equation.

The goal is to find an initial approximation of the solution for every non-linear equation encountered in this work which is being solved to satisfy Kantorovich's quadratic convergence criterion.

Finding an initial approximation which satisfies the Kantorovich Quadratic Convergence Criterion for solving $\mu_{ASY}$(T2W) from $$\beta - r_B(\mu_f)v_B^2(\mu_f) = 0 \qquad (9.21)$$

The solution of (9.21) corresponds to escape velocity from earth at an altitude of $h_B$. Even at $\mu_f = 0$ $h_B$, as can be seen in FIG. 5A and FIG. 5B, which gives the maximum possible value of $h_B$ for any T2W, it is small compared to the earth radius $r_{EARTH}$. Therefore, the initial approximation of $v_B$ can be closely approximated with escape velocity from the Earth as, $$v_B^{(0)} \cong \sqrt{\frac{2Gm_{EARTH}}{r_{EARTH}}} \qquad (9.22)$$

Relation (5.40) which gives the $v_B$ can also be approximated as, $$v_B^{(0)} = v_E\left[\ln\left(\frac{1}{\mu_f}\right) - \frac{(1-\mu_f)}{T2W}\right] \cong v_E\ln\left(\frac{1}{\mu_f}\right) \qquad (9.23)$$

for small $\mu_f \ll 1$ as it should be close to zero, where the asymptotes are located which gives an analytically available initial approximation for $\mu_f^{(0)}$ as, $$\mu_f^{(0)} \cong e^{-\frac{v_B^{(0)}}{v_E}} \qquad (9.24)$$

Using (9.24) as initial approximation for solving (9.21) satisfies Kantorovich quadratic convergence criterion for solving $\mu_{ASY}$(T2W) for any T2W.

For the other two equations the region starting from $\mu_{MIN}$ to $\mu_{MAX}$ with n sample points, having $\mu_f(1) = \mu_{MIN}$ and $\mu_f(n) = \mu_{MAX}$ is used to find the interval where the solution resides, as it is explained above. The solution is approximated by linear interpolation in the interval and the $h_0 = \eta_0 \cdot B_0 \cdot K$ value is calculated. If $h_0 > 0.5$ the interval is halved until $h_0 \le 0.5$, before going into Newton's method.

Figure 10C:
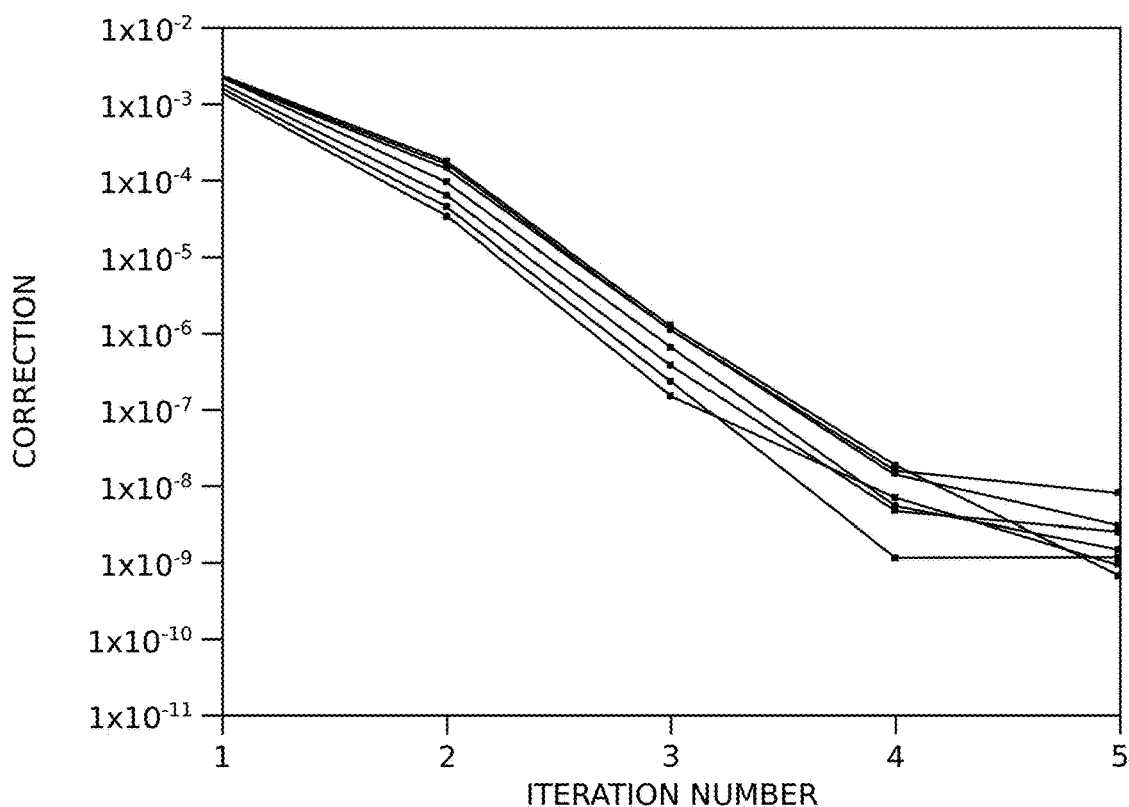
FIG. 10C shows the convergence properties of Newton's method employed in solving rocket equations.

FIG. 10C shows the convergence properties of Newton's method employed in solving rocket equations. As can be seen, the magnitude of the correction terms reduces quadratically with increasing iterations. These very small correction numbers, or in other words, the accuracy in the solution cannot be achieved with interpolation, cubic spline fits, or any other interpolation or search methods. This level of accuracy may potentially be seen as academic, as derived from mathematics. Basically employing Kantorovich theorem, since the initial approximation to the solution satisfies the quadratic convergence criterion of Newton's method, the solution is obtained in 3-4 iterations.

Since Newton's method requires only the first derivatives of the related non-linear functions and Kantorovich criterion also needs their second derivatives, they both must be calculated at any given $\mu_f$ between $\mu_{MIN}$ to $\mu_{MAX}$ for this method to be applied. Analytical derivation of the first and second derivatives can be very cumbersome as can be seen in Sections 10-12. A discrete value representation of the first and second derivatives becomes a lot simpler way of evaluating this method as $$\frac{dy}{dx} = \frac{y_{k+1} - y_{k-1}}{h_k} \qquad (9.25)$$

$$\frac{d^2y}{dx^2} = \frac{y_{k+1} - 2y_k + y_{k-1}}{h_k^2} \qquad (9.26)$$

where k represents the interval, and y and h are the function values at the sampling points k, k−1, and k+1 and the uniform spacing between the adjacent sampling points respectively [22-25, 27, 28].

10. The Analytical Calculation of the First Derivatives of the Functions Derived in the Rocket Equation Under Constant Acceleration Inverse Square Law Gravitational Field.

There are four functions of interest namely $v_B(\mu_f)$, $h_B(\mu_f)$, $h_C(\mu_f)$ and $h(\mu_f)$ that all are functions of $\mu_f$ and that need to be differentiated with respect to $\mu_f$ in applying Newton's method for the solution. The $v_B(\mu_f)$ relation given in (5.40) has two terms in the square bracket with each a function of $\mu_f$. The first term in the bracket of the $v_B$ expression given at (5.40) is, $$\ln\left(\frac{1}{\mu_f}\right) \tag{10.1}$$

Applying the basic differentiation rule of, $$\frac{d}{d\mu_f}[\ln(u)] = \frac{1}{u}\frac{du}{d\mu_f} \tag{10.2}$$

to (10.1) with the following variable transformation, $$u = \frac{1}{\mu_f} \tag{10.3}$$

Along, $$\frac{du}{d\mu_f} = -\frac{1}{\mu_f^2} \tag{10.4}$$

Resulting in, $$\frac{d}{d\mu_f}\left[\ln\left(\frac{1}{\mu_f}\right)\right] = \mu_f\left(-\frac{1}{\mu_f^2}\right) = -\frac{1}{\mu_f} \tag{10.5}$$

The differentiation of the second term in the bracket given in (5.40) is straightforward and need not be shown, resulting in the final differentiation being, $$\frac{dv_B}{d\mu_f} = v_E\left(\frac{1}{T2W} - \frac{1}{\mu_f}\right) \tag{10.6}$$

As can be seen there are four terms in the bracket of (5.59) that give $h_B$. All four terms must be differentiated with respect to $\mu_f$ and summed up. The first and third terms in the bracket of (5.59) are 1 and $-\mu_f$ and their derivatives with respect to Ulf are 0 and −1 respectively. The second term in the bracket of (5.59) can be differentiated by "differentiation of a product" rule giving, $$\frac{d}{d\mu_f}\left[\mu_f\ln\left(\frac{1}{\mu_f}\right)\right] = \ln\left(\frac{1}{\mu_f}\right) - \mu_f\left(-\frac{1}{\mu_f}\right) \tag{10.7}$$

Giving, $$\frac{d}{d\mu_f}\left[\mu_f\ln\left(\frac{1}{\mu_f}\right)\right] = \ln\left(\frac{1}{\mu_f}\right) + 1 \tag{10.8}$$

The last term in (5.57) can be differentiated with respect to $\mu_f$ as, $$\frac{d}{d\mu_f}\left[\frac{1}{2}\frac{(1-\mu_f)^2}{T2W}\right] = -\frac{(1-\mu_f)}{T2W} \tag{10.9}$$

Finally, the sum of the four differentials gives, $$\frac{dh_B}{d\mu_f} = \frac{v_e^2}{g \cdot T2W}\left[\frac{(1-\mu_f)}{T2W} - \ln\left(\frac{1}{\mu_f}\right)\right] \tag{10.10}$$

Differentiation of $h_C$ as given in (5.65) is straightforward giving, $$\frac{dh_C}{d\mu_f} = \frac{v_E}{g}v_B\frac{dv_B}{d\mu_f} = v_B\frac{v_e^2}{g}\left(\frac{1}{T2W} - \frac{1}{\mu_f}\right) \tag{10.11}$$

Finally, differentiation of h as given in (5.66) can be written as the sums of (10.10) and (10.11) giving, $$\frac{dh}{d\mu_f} = \frac{dh_B}{d\mu_f} + \frac{dh_C}{d\mu_f} \tag{10.12}$$

Derivatives for the inverse square law height $h_{INV}$ and radius $r_{hINV}$ with respect to $\mu_f$ are more complex, but still analytically available.

11.0 the Analytical Calculation of the First Derivatives of the Functions Derived in the Rocket Equation Under the Inverse Square Law Gravitational Field.

Next, the first derivatives of the functions derived in the rocket equation under inverse square law gravitational field can be found. Re-writing (6.6) in short form and showing the explicit $\mu_f$ dependency is, $$r_{hINV}(\mu_f) = \beta\frac{r_B(\mu_f)}{\beta - r_B(\mu_f)v_B^2(\mu_f)} \tag{11.1}$$

Where β is, $$\beta = 2Gm_{EARTH} \tag{11.2}$$

The expression $r_{hINV}(\mu_f)$ in (11.1) is a function of 2 variables, where both variables are functions of $\mu_f$, explicitly given at (4.40) and (4.59), where the relation between $r_B$ and $h_B$ is given in (5.52).

$$r_{hINV}(\mu_f) = f(r_B, v_B) \text{ where } r_B(\mu_f) \text{ and } v_B(\mu_f) \tag{11.3}$$

Using the Leibnitz's chain rule for 2 variables $r_B$ and $v_B$ greatly reduces the complexity of differentiation with respect to $\mu_f$, compared to explicitly writing the $r_{hINV}(\mu_f)$ by substituting the open forms $r_B(\mu_f)$ and $v_B(\mu_f)$ in (11.3) and differentiating it. Leibnitz's chain rule for 2 variables $r_B$ and $v_B$ can be written as, $$\frac{dr_{hINV}}{d\mu_f} = \frac{\partial r_{hINV}}{\partial r_B}\frac{dr_B}{d\mu_f} + \frac{\partial r_{hINV}}{\partial v_B}\frac{dv_B}{d\mu_f} \quad (11.4)$$

Since derivatives of $v_B$ and $h_B$ with respect to $\mu_f$ are already given at (10.6) and (10.10), and the derivative of $h_B$ is equal to the derivative of $r_B$ with respect to $\mu_f$ as given in (6.3), the partial derivatives at (11.4) can be calculated with standard differentiation rules for divisional functions.

The dominator of (11.1) and its derivative with respect to $r_B$ are, $$\text{dom}=\beta r_B \quad (11.5)$$

$$\frac{\partial \text{dom}}{\partial r_B} = \beta \quad (11.6)$$

the denominator of (11.1) P and its derivative with respect to $r_B$ are, $$P=\beta - r_B v_B^2 \quad (11.7)$$

$$\frac{\partial P}{\partial r_B} = -v_B^2 \quad (11.8)$$

Using the standard differentiation rule for a division gives, $$\frac{\partial r_{hINV}}{\partial r_B} = \frac{\frac{\partial \text{dom}}{\partial r_B}P - \frac{\partial P}{\partial r_B}\text{dom}}{P^2} \quad (11.9)$$

Explicitly (11.9) is, $$\frac{\partial r_{hINV}}{\partial r_B} = \frac{\beta(\beta - r_B v_B^2) + \beta r_B v_B^2}{(\beta - r_B v_B^2)^2} \quad (11.10)$$

Finally resulting in, $$\frac{\partial r_{hINV}}{\partial r_B} = \frac{\beta^2}{(\beta - r_B v_B^2)^2} = \frac{\beta^2}{P^2} \quad (11.11)$$

Similarly, derivatives of the dominator and denominator with respect to $v_B$ are, $$\frac{\partial \text{dom}}{\partial v_B} = 0 \quad (11.12)$$

$$\frac{\partial P}{\partial v_B} = -2r_B v_B \quad (11.13)$$

$$\frac{\partial r_{hINV}}{\partial v_B} = \frac{2r_B v_B}{P^2} \quad (11.14)$$

Explicitly (11.14) becomes, $$\frac{\partial r_{hINV}}{\partial v_B} = \frac{2r_B v_B}{(\beta - r_B v_B^2)^2} = \frac{2r_B v_B}{P^2} \quad (11.15)$$

Applying the chain rule (11.4) explicitly gives, $$\frac{dr_{hINV}}{d\mu_f} = \frac{1}{P^2}\left(\beta^2 \frac{dr_B}{d\mu_f} + 2r_B v_B \frac{dv_B}{d\mu_f}\right) \quad (11.16)$$

where the derivatives of $v_B$ and $h_B$ are given in (10.6) and (10.10) respectively and substituting the relation (6.3) in (11.16) gives, $$\frac{dr_{hINV}}{d\mu_f} = \frac{1}{P^2}\left(\beta^2 \frac{dh_B}{d\mu_f} + 2r_B v_B \frac{dv_B}{d\mu_f}\right) \quad (11.17)$$

where every term in (11.18) is an explicitly derived function of $\mu_f$.

11.1 the Analytical Calculation of the First Derivative Needed for Solving the Asymptote Location $\mu_{ASY}$ in the Rocket Equation Under the Inverse Square Law Gravitational Field.

For solving the $\mu_{ASY}$, where the asymptote is located, on the horizontal axes of $r_B(\mu_f)$ curve giving $r_{hINV} \to \infty$, the denominator of (11.17) noted as $P^2$ must be equated to zero, giving the equation to be solved as, $$\beta - r_B(\mu_{ASY})v_B^2(\mu_{ASY}) = 0 \quad (11.18)$$

To apply Newton's method to solve (11.18) needed is the first derivative of, $$P(\mu_f) = \beta - r_B(\mu_f)v_B^2(\mu_f) \quad (11.19)$$

and must be evaluated with respect to $\mu_f$. Applying Leibnitz's chain rule for 2 variables, this time the function to be differentiated with respect to $\mu_f$ is represented as $P(r_B, v_B)$, $$P(r_B, v_B) \text{ where } r_B(\mu_f) \text{ and } v_B(\mu_f) \quad (11.20)$$

$$\frac{\partial P}{\partial r_B} = -v_B^2 \quad (11.21)$$

and $$\frac{\partial P}{\partial v_B} = -2v_B r_B \quad (11.22)$$

Giving Leibnitz's chain rule for 2 variables as, $$\frac{dP}{d\mu_f} = \frac{\partial P}{\partial r_B}\frac{dr_B}{d\mu_f} + \frac{\partial P}{\partial v_B}\frac{dv_B}{d\mu_f} \quad (11.23)$$

where the derivatives of $r_B$ and $v_B$ are given in (10.6) and (10.10) respectively. Substituting the calculated partial derivatives in (11.23) becomes explicitly, $$\frac{dP}{d\mu_f} = -v_B^2 \frac{dr_B}{d\mu_f} - 2v_B r_B \frac{dv_B}{d\mu_f} \quad (11.24)$$

Again, substituting the relation (5.3) in (11.24) gives, $$\frac{dP}{d\mu_f} = -v_B^2 \frac{dh_B}{d\mu_f} - 2v_B r_B \frac{dv_B}{d\mu_f} \quad (11.25)$$

where every function and derivative in (11.25) is an explicitly derived function of $\mu_f$.

12. The Analytical Calculation of the Second Derivatives of the Functions Derived in the Rocket Equation Under Constant Acceleration and the Inverse Square Law Gravitational Field.

The second derivatives are important for applying the Kantorovich's theorem which guarantees the quadratic convergence of the Newton's method if it is met [26-28].

$$\frac{d^2 h_B}{d\mu_f^2} = \frac{v_e^2}{g \cdot T2W} \left( \frac{1}{\mu_f} - \frac{1}{T2W} \right) \quad (12.1)$$

$$\frac{d^2 h_C}{d\mu_f^2} = \frac{v_e^2}{g} \left[ \frac{dv_B}{d\mu_f} \left( \frac{1}{T2W} - \frac{1}{\mu_f} \right) + \frac{v_B}{\mu_f^2} \right] \quad (12.2)$$

$$\frac{d^2 h}{d\mu_f^2} = \frac{d^2 h_B}{d\mu_f^2} + \frac{d^2 h_C}{d\mu_f^2} \quad (12.3)$$

$$\frac{d^2 v_B}{d\mu_f^2} = \frac{v_E}{\mu_f^2} \quad (12.4)$$

The second derivative is needed for solving the asymptote location $\mu_{ASY}$ in the rocket equation under the inverse square law gravitational field. Differentiating (11.25) with respect to $\mu_f$, $$\frac{\partial^2 P}{\partial \mu_f^2} = \frac{\partial}{\partial \mu_f} \left( -v_B^2 \frac{dh_B}{d\mu_f} - 2v_B r_B \frac{dv_B}{d\mu_f} \right) \quad (12.5)$$

$$\frac{\partial^2 P}{\partial \mu_f^2} = \frac{\partial}{\partial \mu_f} (A + B) = \frac{\partial A}{\partial \mu_f} + \frac{\partial B}{\partial \mu_f} \quad (12.6)$$

$$A = -v_B^2 \frac{dh_B}{d\mu_f} \quad B = -2r_B v_B \frac{dv_B}{d\mu_f} \quad (12.7)$$

$$\frac{\partial A}{\partial \mu_f} = -2v_B \frac{dv_B}{d\mu_f} \frac{dh_B}{d\mu_f} - v_B^2 \frac{d^2 h_B}{d\mu_f^2} \quad (12.8)$$

$$\frac{\partial B}{\partial \mu_f} = -2v_B \frac{dr_B}{d\mu_f} \frac{dv_B}{d\mu_f} - 2r_B \frac{dv_B}{d\mu_f} \frac{dv_B}{d\mu_f} - 2v_B r_B \frac{d^2 v_B}{d\mu_f^2} \quad (12.9)$$

$$\frac{\partial B}{\partial \mu_f} = -2v_B \frac{dh_B}{d\mu_f} \frac{dv_B}{d\mu_f} - 2r_B \frac{dv_B}{d\mu_f} \frac{dv_B}{d\mu_f} - 2v_B r_B \frac{d^2 v_B}{d\mu_f^2} \quad (12.10)$$

where every function and derivative in (12.8) and (12.10) is an explicitly derived function of $\mu_f$ previous to calculating (12.6).

$$\frac{\partial^2 P}{\partial \mu_f^2} = \frac{\partial A}{\partial \mu_f} + \frac{\partial B}{\partial \mu_f} \quad (12.11)$$

The open form of the second derivative of (11.18) with respect to $\mu_f$ can be written as, $$\frac{\partial^2 r_{hINV}}{\partial \mu_f^2} = \frac{\partial}{\partial \mu_f} \left[ \frac{1}{P^2} \left( \beta^2 \frac{dh_B}{d\mu_f} + 2r_B v_B \frac{dv_B}{d\mu_f} \right) \right] \quad (12.12)$$

Symbolically (12.12) can be written as, $$\frac{\partial^2 r_{hINV}}{\partial \mu_f^2} = \left( \frac{\partial Q}{\partial \mu_f} + \frac{\partial R}{\partial \mu_f} \right) \quad (12.13)$$

where $\alpha(T_B, v_B)$ and $\beta$ are constants, $$Q = \beta^2 \left( \frac{1}{P^2} \frac{dh_B}{d\mu_f} \right) \quad (12.14)$$

$$\frac{\partial Q}{\partial \mu_f} = \beta^2 \left( -\frac{2}{P^3} \frac{dP}{d\mu_f} \frac{dh_B}{d\mu_f} + \frac{1}{P^2} \frac{d^2 h_B}{d\mu_f^2} \right) \quad (12.15)$$

The derivative of P with respect to $\mu_f$ in (12.15) is already given in (11.25) as, $$\frac{\partial P}{\partial \mu_f} = -v_B^2 \frac{dh_B}{d\mu_f} - 2v_B r_B \frac{dv_B}{d\mu_f} \quad (12.16)$$

Making it readily available.

$$R = 2 \frac{\partial}{\partial \mu_f} \left( \frac{1}{P^2} r_B v_B \frac{dv_B}{d\mu_f} \right) \quad (12.17)$$

The differentiation in the parenthesis in (12.17) has 4 terms as multipliers which are all functions of $\mu_f$ therefore splitting it as, $$Z = r_B v_B \frac{dv_B}{d\mu_f} \quad (12.18)$$

$$\frac{\partial R}{\partial \mu_f} = 2 \left( -\frac{2}{P^3} \frac{dP}{d\mu_f} Z + \frac{1}{P^2} \frac{\partial Z}{\partial \mu_f} \right) \quad (12.19)$$

$$\frac{\partial Z}{\partial \mu_f} = v_B \frac{\partial r_B}{\partial \mu_f} \frac{dv_B}{d\mu_f} + r_B \frac{\partial v_B}{\partial \mu_f} \frac{dv_B}{d\mu_f} + r_B v_B \frac{d^2 v_B}{d\mu_f^2} \quad (12.20)$$

$$\frac{\partial Z}{\partial \mu_f} = v_B \frac{\partial h_B}{\partial \mu_f} \frac{dv_B}{d\mu_f} + r_B \frac{\partial v_B}{\partial \mu_f} \frac{dv_B}{d\mu_f} + r_B v_B \frac{d^2 v_B}{d\mu_f^2} \quad (12.21)$$

All the needed terms in (12.13) are given and the second derivative of $r_{hINV}$ can be calculated summing up (12.15) and (12.19).

13. The Balloon Take-Down System

Figure 14A:
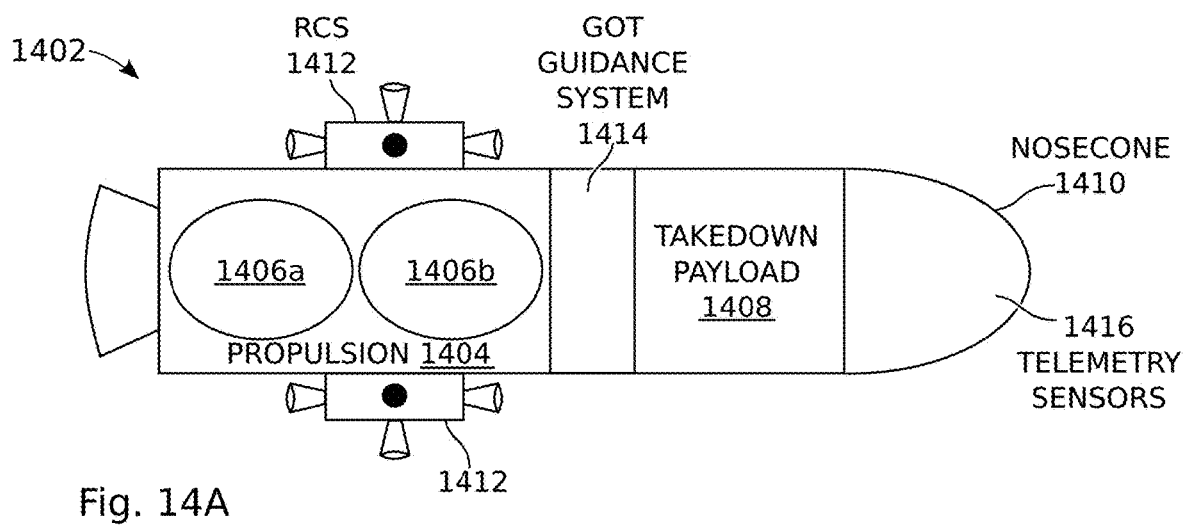
FIG. 14A and FIG. 14B are diagrams of a high-altitude non-destructive aerial object takedown system.
Figure 14B:
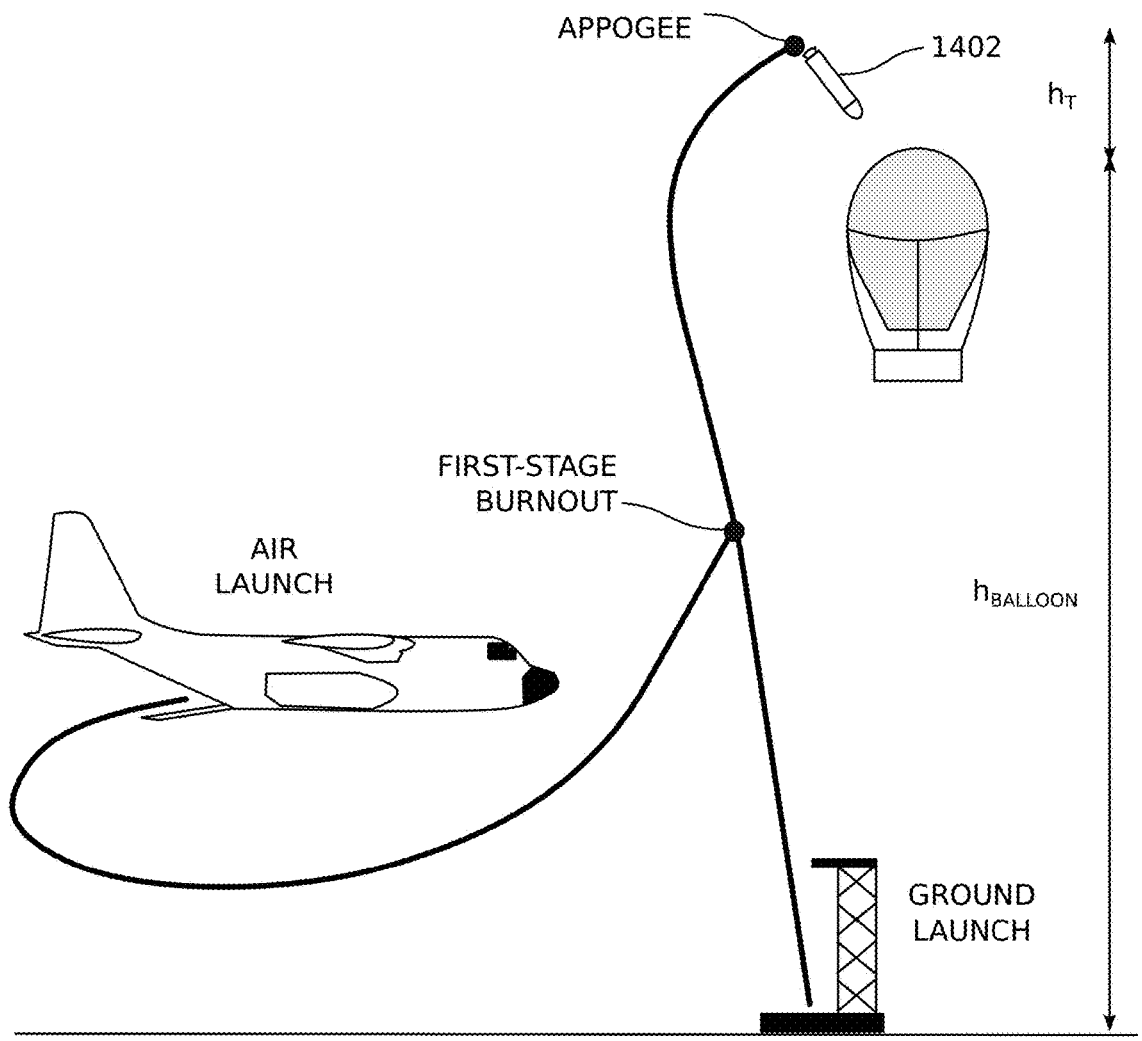

FIG. 14A and FIG. 14B are diagrams of a high-altitude non-destructive aerial object takedown system. The system comprises a rocket 1402 with a propulsion system 1404 with propellant tanks 1406b and 1406c for example, but the system is not limited to any particular means of propulsion. In FIG. 14A a single-stage rocket 1402 is depicted, but the system 1400 may alternatively use multi-stage rockets. A takedown payload 1408 is embedded with the rocket 1402. In this example the takedown payload 1408 is packaged with the rocket nosecone 1410. As shown in FIG. 14B, the rocket launch mechanism may be airborne (e.g., from C-130) and from a (fixed or mobile) ground site. Shown in FIG. 14B is a two-stage implementation of the rocket.

As an example, the aerial object, e.g. a balloon, may have a mass of 1,000 kg and a diameter and height of 30 meters, similar to the Chinese balloon of January 2023. The radius of the balloon in this case is r=15 meters. In the case of a two-stage rocket, the first stage of the air launched or ground launched system is programmed to fly a specific trajectory that brings the second stage right over top of the target in its descent phase. The rocket runs out of fuel (zero thrust condition) at an altitude calculated as a function of the target altitude $h_{BALLOON}$. During its descent, when the second stage is at an altitude of $h_P = h_T + h_{Balloon}$, the nosecone may be jettisoned and the ballast units (e.g., 5 ballast units with ballast (takedown) rockets)), each having 200 kg of ballast, are launched. Typically, the ballast units are launched simultaneously.

Figure 15A:
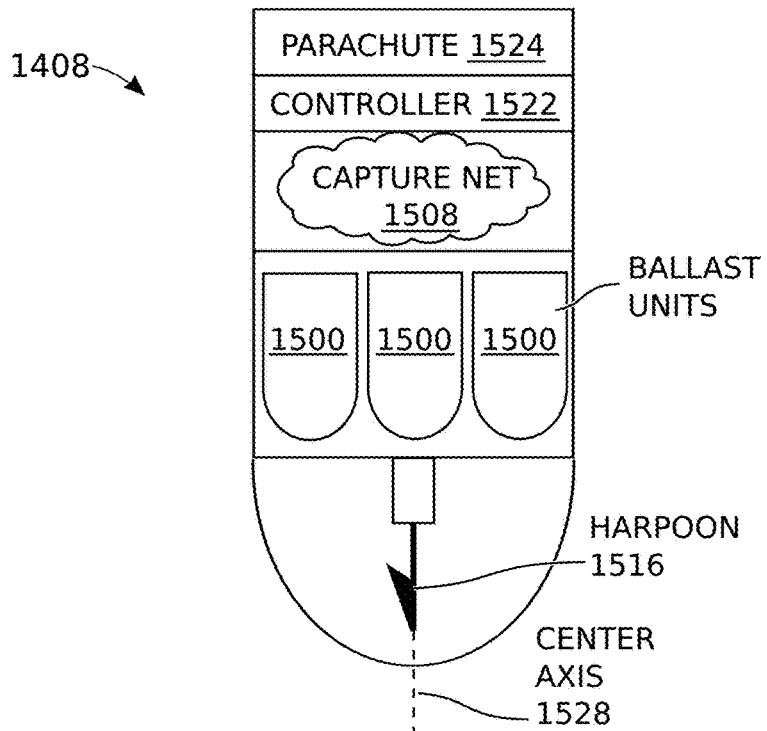
FIG. 15A through FIG. 15C are pre-release and post-release diagrams of the takedown payload.
Figure 15B:
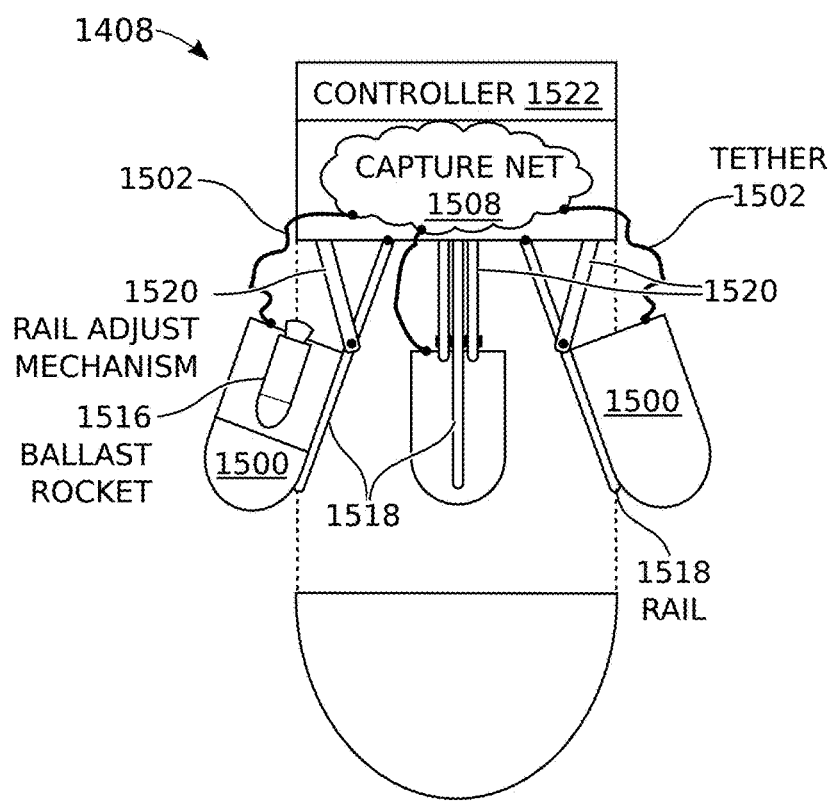
Figure 15C:
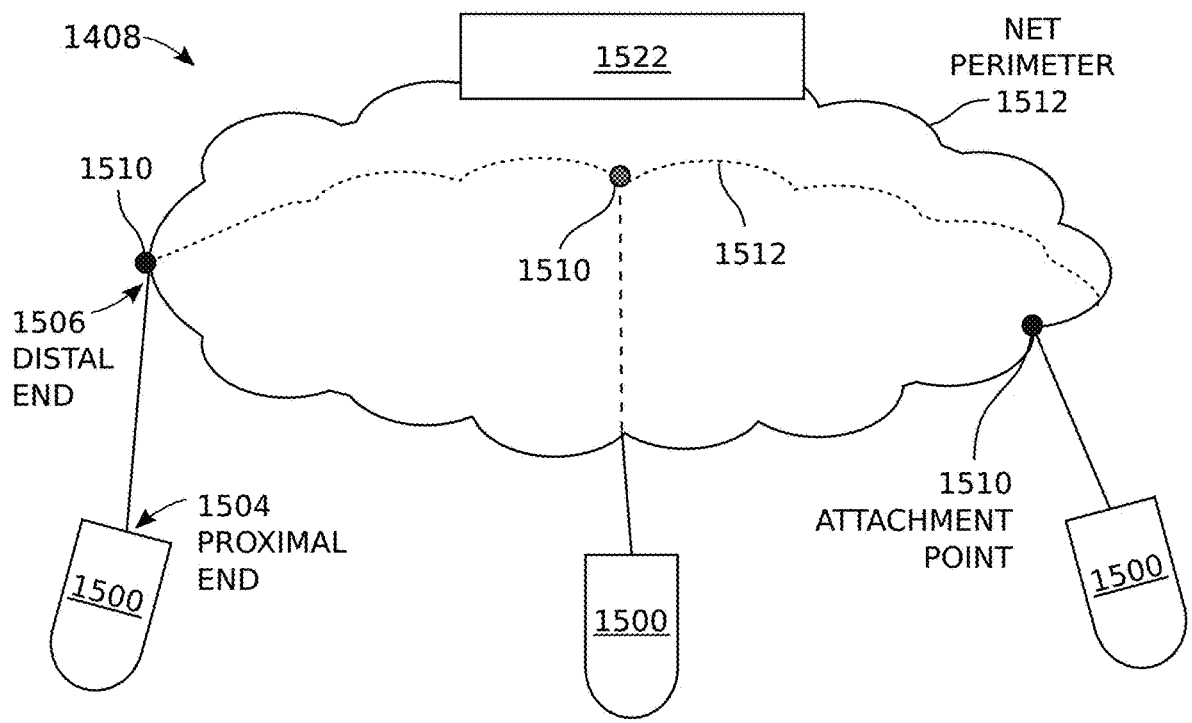

FIG. 15A through FIG. 15C are pre-release and post-release diagrams of the takedown payload. The takedown payload 1408 comprises a first plurality of ballast units 1500 releasable from the takedown payload. As shown in some detail in subsequent figures, the ballast units 1500 are typically released in a circular capture pattern, as viewed from a perspective looking down on the top of the aerial object, vertically from the rocket and payload 1408. Here, three ballast units 1500 are shown, but the takedown payload is not limited to any particular number of ballast units. The takedown payload 1408 also includes a first plurality of tethers or cords 1502. Each tether 1502 has a proximal end 1504 attached to a corresponding ballast unit 1500 and a distal end 1506 connected to a takedown payload capture net 1508. The capture net or web 1508 includes a first plurality attachment points 1510, typically equally spaced, formed along a capture net perimeter 1512, with each attachment point 1510 connected to a corresponding tether distal end 1506. The number of attachment points 1510, which is three in this example, matches the number of ballast units 1500. The takedown payload 1408 further comprises a release mechanism 1514 associated with each ballast unit 1500. As shown, the release mechanism 1514 is an attached ballast rocket 1516 fired from rail 1518. A rail adjustment mechanism 1520 controls the angle at which the ballast units are released in response to signals from a takedown payload controller 1522. Alternatively, the ballast rockets may be launched from tubes, which may also have an adjustable release angle. In another alternative not shown, the ballast units may be loaded into launch tubes and fired from the takedown payload using a compressed spring or compressed gas discharge. The launch tube/rail angles may be adjusted in response to controller signals.

Returning to FIG. 14A, the rocket 1402 further comprises a reaction control system (RCS) 1412 having an input to accept adjustment instructions and an output mechanism controlling the movement of the rocket. The RCS 1412 can typically be enabled as a plurality of small reaction control rockets to control movement during descent to the target. Alternatively, a reaction wheel (as shown) can be used, or a combination of both a reaction wheel control rockets, as would be known by one with skill in the art. A reaction wheel acts a momentum wheel by operating at a constant (or near-constant) rotation speed, to provide a rocket with a large amount of stored angular momentum. Disturbance torques perpendicular to one axis of the rocket parallel to the wheel's spin axis result in angular motion of the rocket about a perpendicular axis, and so effect stability and minor course adjustments.

The rocket 1402 further comprises a go-onto-target (GOT) guidance system 1414 to accept aerial object altitude, position, and motion data from telemetry sensors 1416, and an output to supply the adjustment instructions to the RCS 1412. In some aspects, the GOT guidance system and takedown controller payload controller are the same system. The telemetry sensors may include a nose camera to make optical measurements and help control optically vertical decent speed for accurate aiming to the target. Again, GOT guidance systems and telemetry sensors are well known to those with skill in the art.

Figure 16A:
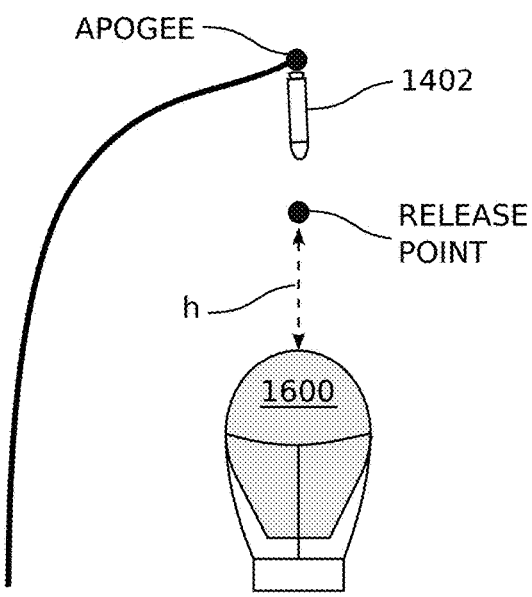
FIG. 16A through FIG. 16D are a series of perspective views of the system enabled to capture a gas inflated balloon aerial object.
Figure 16B:
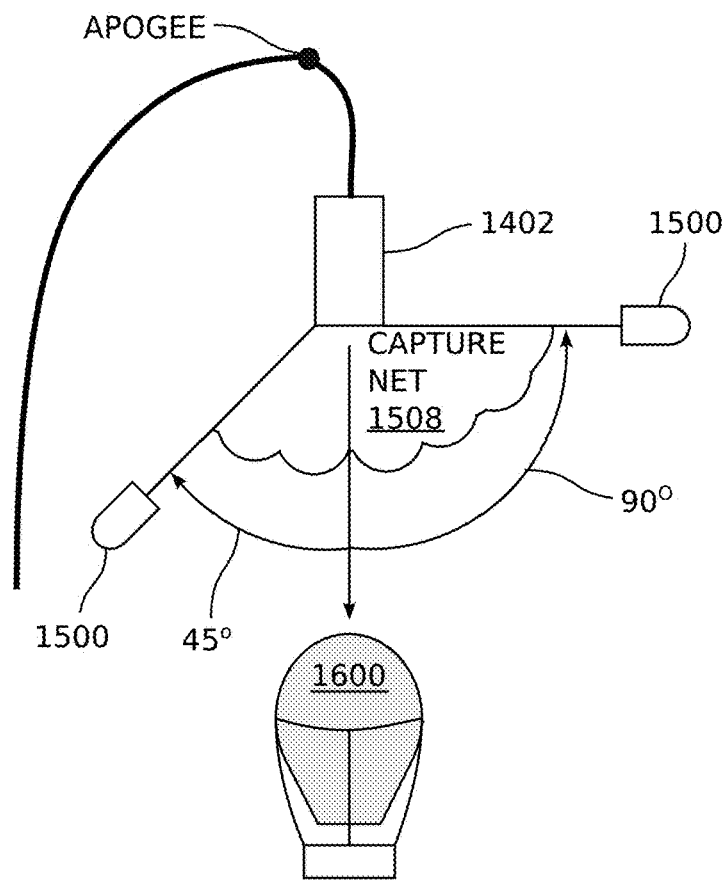
Figure 16C:
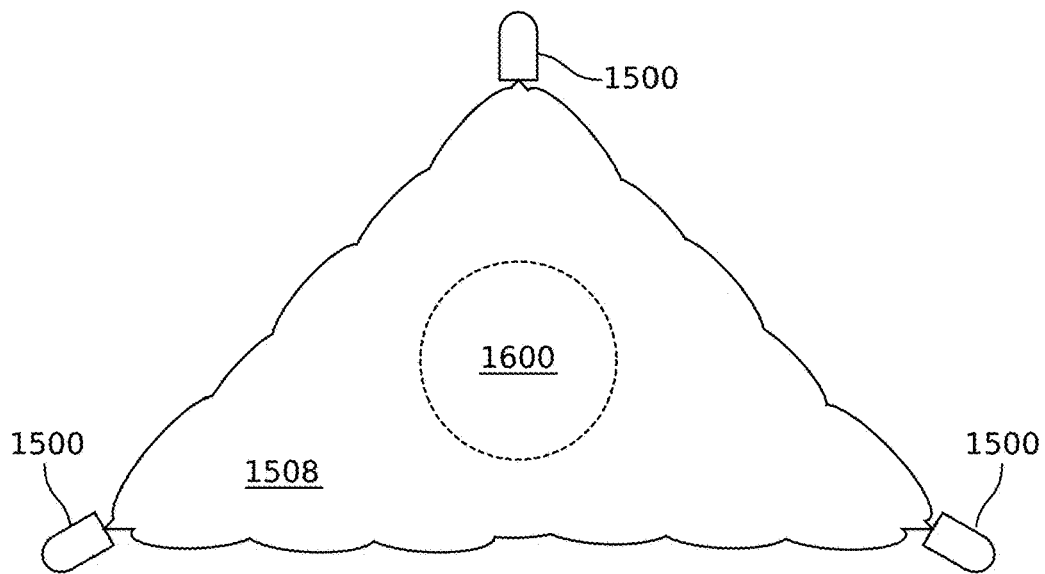

FIG. 16A through FIG. 16D are a series of perspective views of the system enabled to capture a gas inflated balloon aerial object. One task of the GOT guidance system is to locate the apogee of the rocket above the aerial object 1600 (FIG. 16A). The GOT guidance system also calculates a ballast unit release height (h) between the takedown payload 1408 and the aerial object 1600. Note, the ballast release height need not necessarily be the same location as the rocket apogee. In FIG. 16B the ballast units 1500 are released from the takedown payload 1408 at an angle of 135 degrees, or less, with respect to a downward vertical direction 1602. The release angles need not necessarily be the same. Shown are release angles of 45 and 90 degrees. The release angles may differ based upon the relative differences between the takedown payload 1408 and aerial object 1600 velocities and/or altitudes for example. Typically, the ballast units are released simultaneously, but again the release times may be varied to account for relative changes in velocity or altitude. FIG. 16C is a top-down perspective view.

Figure 16D:
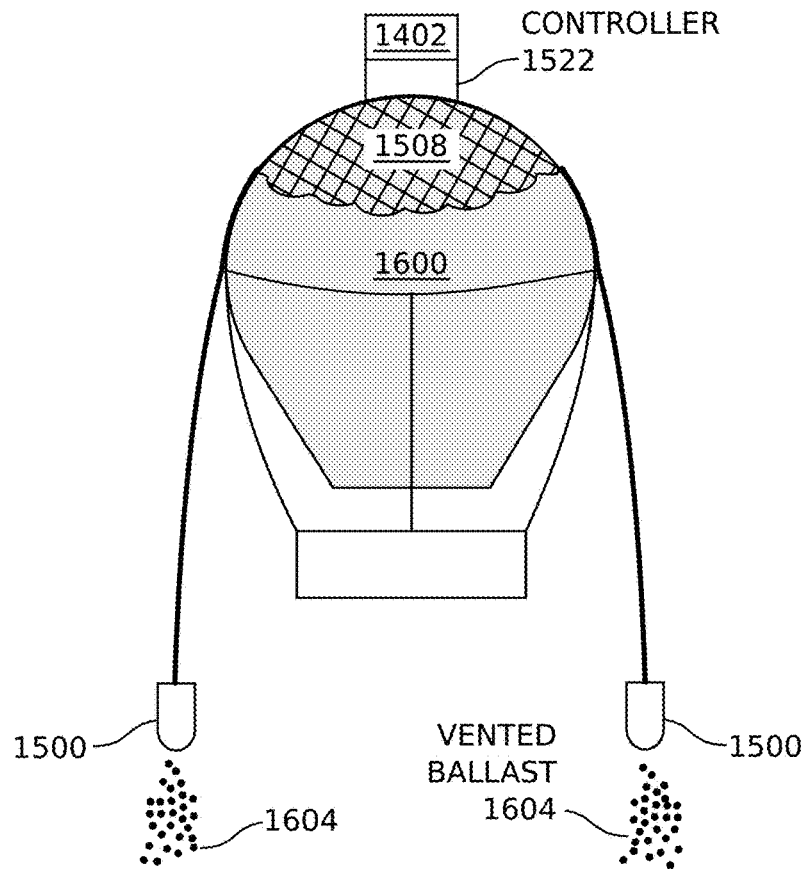

In FIG. 16D the aerial object balloon is initially captured, meaning that the capture net 1508 covers the top of balloon 1600. The takedown payload controller 1522 has signal inputs to accept altitude measurements from the telemetry sensor. The controller 1522 calculates an altitude decent rate and supplies a ballast management signal that is used control the decent rate by venting ballast 1604. Alternatively, the ballast management signal may be based upon a predetermined calculation. In another alternative the ballast units may simply have a fixed mass that is not adjustable.

Figure 17:
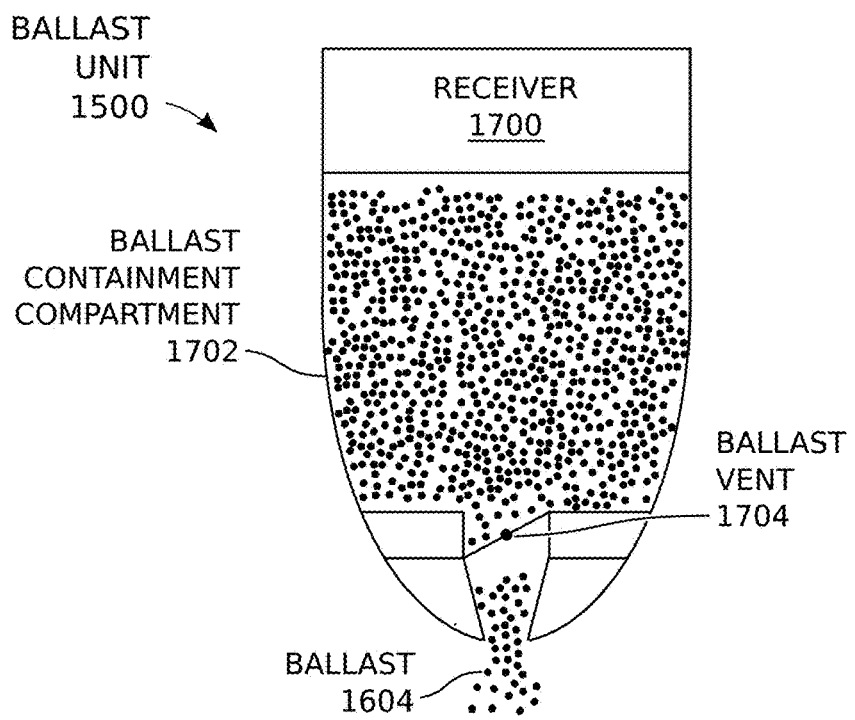
FIG. 17 is a partial cross-sectional view of an exemplary ballast unit.

FIG. 17 is a partial cross-sectional view of an exemplary ballast unit. Each ballast unit 1500 comprises a receiver 1700 to accept the ballast management signal from the takedown payload controller. A ballast containment compartment 1702 includes a default mass of divisible ballast 1604, which may be sand, liquid (e.g., water), or small metal balls (e.g., ball bearings) for example. A ballast vent 1704 releases a measured amount of ballast mass in response to the ballast management signal. In one aspect, the ballast management signal is sent before the ballast unit 1500 is released via a hardwired connection that is broken upon release. Alternatively, or in addition, the receiver 1700 may be a wireless communication device to receive ballast management signals. In the wireless configuration, ballast 1604 may optionally be vented either before or after the ballast units 1500 are released. The result is that the capture net has a mass responsive to the combined mass of the ballast units, as well as any remaining components of the rocket and takedown payload. To cause the balloon to descend, this combined mass must be greater than the mass of the balloon. In this example, there is no ballast rocket and the ballast unit is released using a compressed mechanical spring or compressed gas.

Returning to FIG. 15A, the takedown payload 1408 may optionally comprise a deployable parachute 1524 configured to diminish the effective capture net mass when the capture net is deployed in the atmosphere. As another option the takedown payload 1408 may further comprise a harpoon 1526 aligned along a center axis 1528 that is releasable downward in response to a harpoon command from a takedown payload controller 1522. In the case of a balloon aerial object, the harpoon can be used to decrease the balloon mass by puncturing the balloon and causing the escape of gas.

The ballast (takedown) rockets 1516 are very short-range rockets that have, for example, 200 kg of liquid, sand, or small metal ball ballast loads that is vented if needed. The purpose of these rockets is to propel the ballast units 1500 away from the launch point, further than the radius of the target aerial object. In the case of the balloon example mentioned above, the ballast units travel at least 30 meters horizontally ("sideways"). For the 5-rocket capture system with a goal of having a total ballast of 1,000 kg, designed to bring down a 30-meter diameter balloon, each ballast unit 1500 may have a minimum 30 meters of chords attached to the capture net web 1508, which has its radius of 15 meters, giving a total ballast weight of 1,000 kg, making the overall mass of the takedown payload greater than the balloon mass. In the center of the web 1508 is the controller (head) 1522, which may house devices for radio frequency (RF) communications, and for the control of the ballast unit, parachute, and harpoon, if so enabled.

The capture net web 1508 is folded like a parachute in the takedown payload storage compartment along with the controller, at the very back. The ballast rockets 1516 are housed in a launch tubes or mounted on rails 1518 (as shown), which are symmetrically assembled about the center axis 1528 at an angle (e.g., 45°) angle from the center axis. In some aspects the angle is fixed and in others it is adjustable. The ballast units 1500 may also be stored parallel to the center axis and moved outwards prior to the launch of the ballast units.

The goal is to deploy the web completely enveloping the top section of the balloon as symmetrically as possible with respect to the center of the balloon, with the (e.g., five 200 kg of) mass hanging again symmetrically below the target balloon, which makes the combined mass greater than the target balloon mass for a stable and controllable decent. During the takedown, the sensors in the controller may monitor the speed of the decent and if needed can send control signals to all ballast units to vent a calculated amount of mass from the ballast loads, if so enabled, by opening their valves during the descent for lighter balloon takedown operations. Additionally, final takedown decent speed can be reduced with deploying a parachute or harpoon (in the case of a balloon).

Figure 18:
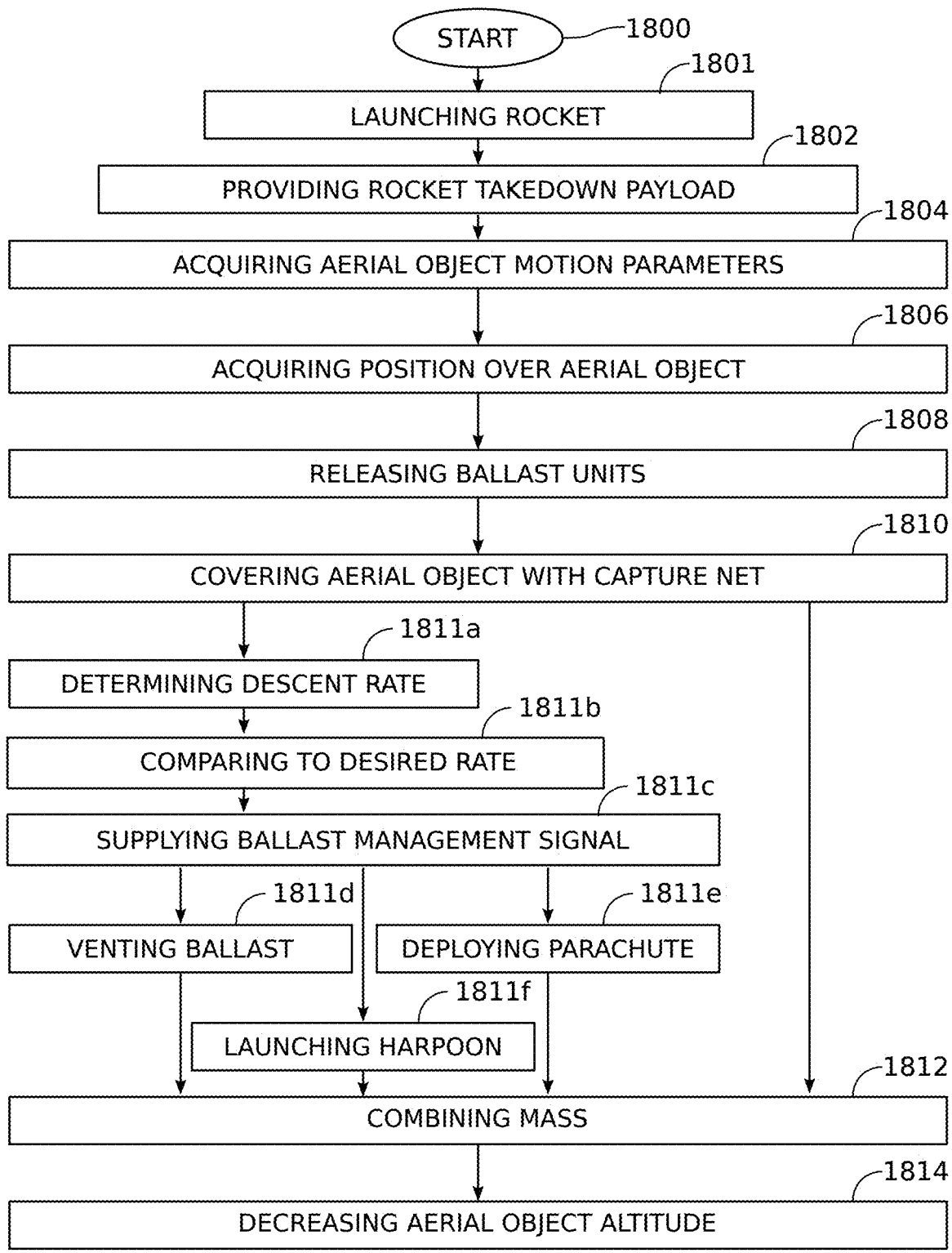
FIG. 18 is a flowchart illustrating a method for the non-destructive takedown of a high-altitude aerial object.

FIG. 18 is a flowchart illustrating a method for the non-destructive takedown of a high-altitude aerial object. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method steps are supported by the above system descriptions and, generally, the method follows the numeric order of the depicted steps. The method starts at Step 1800.

Step 1801 launches a rocket using a rocket using an airborne or ground launch mechanism. Step 1802 provides a thrusting rocket enabled with a takedown payload. In Step 1804 the takedown payload (or rocket) acquires the altitude, motion, and position parameters of a high altitude aerial object. In Step 1806 the rocket, with payload, acquires a position overlying the aerial object. In Step 1808 the takedown payload releases a first plurality of ballast units, attached to a capture net, downward in a capture pattern, typically circular, surrounding the aerial object. In response to releasing the ballast units, Step 1810 covers the top surface of the aerial object with the capture net. Step 1812 combines the mass of each ballast unit with a mass of the aerial object to form a combined mass. In other words, Step 1812 combines the mass of the takedown payload with the mass of the aerial object. In response to the combined mass, Step 1814 decreases the aerial object altitude.

In one aspect, Step 1806 includes a GOT guidance system accepting aerial object altitude, positon, and motion data, and a RCS controls the movement of the rocket in response to signals from the GOT guidance system. Control of the rocket movement may further include the GOT guidance system calculating a ballast unit release height between the takedown payload and the aerial object. In some aspects the payload controller acts as the GOT guidance system.

In one aspect, releasing the first plurality of ballast units in Step 1808 includes releasing the ballast units from the takedown payload at an angle of 135 degrees, or less, with respect to a downward vertical direction. This step further includes a ballast unit release mechanism that may incorporate compressed springs, gas discharge, or attached ballast rockets.

In one aspect subsequent to covering the aerial object top surface in Step 1210, Step 1211a determines the aerial object altitude decent rate. This determination may be made by estimation prior to releasing the ballast units or by in-situ measurement. Step 1211b compares the aerial object altitude decent rate to a desired altitude decent rate, and Step 1211c supplies a ballast management signal in response to the comparison. In another aspect, releasing the first plurality of ballast units in Step 1808 includes releasing ballast units having a divisible default mass and Step 1211d vents ballast mass from the ballast units in response to the ballast management signal. As a result, forming the combined mass in Step 1212 includes diminishing the combined mass in response to venting the ballast.

In one aspect, providing the thrusting rocket with the takedown payload in Step 1802 further comprises providing a takedown payload parachute. Step 1211e may optionally deploy the parachute in response to comparing the aerial object altitude decent rate to a desired altitude decent rate (Step 1211b), and forming the combined mass in Step 1212 includes diminishing the effective combined mass in response to deploying the parachute. Alternatively, or in addition, providing the thrusting rocket with the takedown payload in Step 1802 may further comprise providing a takedown payload harpoon. Then, in Step 1211f the method may optionally launch the harpoon at an gas inflated balloon aerial object in response to comparing the aerial object altitude decent rate to a desired altitude decent rate in Step 1211b, so that the combined mass increases as a result of the harpoon puncturing the balloon.

REFERENCES ON ROCKET EQUATION

1. "Lecture L14—Variable Mass Systems: The Rocket Engine", J. Peraire, S. Widnal, 16.07 Dynamics, Fall 2008, Version 2.0.
2. "Lecture 14.2. The Rocket Equation", https://web.mit.edu/16.unified/www/SPRING/propulsion/notes/node103.html.
3. "Tsiolkovsky Rocket Equation", https://en.wikipedia.org/wiki/Tsiolkovysky_rocket_equation.
4. "Free Fall", https://en.wikipedia.org/wiki/Free_fall.
5. "From Moon-Fall to Motions Under Inverse Square Laws", S. K. Foong, European Journal of Physics, 2008, Vol 29, Number 5, pp. 987-1003.

REFERENCES ON TAKE-DOWN 6. https://www.forbes.com/sites/niallmccarthy/2016/08/16/the-hourly-cost-of-operating-the-u-s-militarys-fighter-fleet-infographic/?sh=259f3705685f 7. https://simpleflying.com/airbus-a320-variants-hourly-operating-costs/
8. "Solar Timer Using GPS Technology", O. E. Akcasu and Ibrahim Akcay, U.S. Pat. No. 9,551,980 B2, Jan. 24, 2017.
9. "Method and Apparatus for Controlling Electrical Power Usage Based on exact Sun Elevation Angle and Measured Geographical Location", Osman E. Akcasu, USPTO 9,949,339 B2, Apr. 17, 2018.
10. "Vehicle for Aerial Delivery of Fire Retardant", O. E. Akcasu, U.S. Pat. No. 7,975,774 B2, Jul. 12, 2011.
11. "System for Aerial Delivery of Fire Retardant", O. E. Akcasu, U.S. Pat. No. 8,165,731 B2, Apr. 24, 2012.
12. "System for Aerial Delivery of Fire Retardant", O. E. Akcasu, European Union Patent Number EP 2,163,279, Feb. 25, 2013.
13. "Vehicle for Aerial Delivery of Fire Retardant", O. E. Akcasu, European Union Patent Number EP 2,163,844 B1, Aug. 12, 2015.
14. "Rocket or Artillery Launched Smart Reconnaissance Pod", O. E. Akcasu, Ibrahim Onur Uslu and Yusuf Leblebici, U.S. Pat. No. 9,234,728 B2, Jan. 12, 2016.
15. "Rocket or Artillery Launched Smart Reconnaissance Pod", O. E. Akcasu, Ibrahim Onur Uslu and Yusuf Leblebici, European Patent EP 2 871 438 B1, Nov. 4, 2018.
16. "LZ 130 Graf Zeppelin II", https://en.wikipedia.org/wiki/LZ_130_Graf_Zeppelin_II
17. "1974 Airborne Launched Minuteman Missile", https://www.youtube.com/watch?v=zFIGqD3aVxw
18. "Rapid Dragon", https://en.wikipedia.org/wiki/Rapid_Dragon_(missile_system)
19. "JPL and the Space Age: Hunt for Space Rocks", https://www.youtube.com/watch?v=1wNzTyu36WA

REFERENCES ON MATH AND PHYSICS IN GENERAL

20. "Capacitor with High Aspect Ratio Silicon Cores", O. E. Akcasu, U.S. Pat. No. 10,510,828 B2, Dec. 17, 2019.
21. "The Feynman Lectures on Physics", Richard P. Feynman, Robert B. Leighton, Matthew L. and Sands, Copyright 1963, 1989 California Institute of Technology, ISBN 0-201-51003-0. Vol. II, pp. 7.9.
22. "Mathematical Handbook of Formulas and Tables," Murray R. Spiegel, Schaum's Outline Series, Copyright 1952 by McGraw-Hill, Inc.
23. "Handbook of Mathematical Functions," Edited by Milton Abramowitz and Irene A. Stegun, Dover Publications, Inc., New York, 1972, Library of Congress Catalog Card Number: 65-12253.
24. "Handbook of Chemistry and Physics," 66th Edition, 1985-1986, Copyright Chemical Rubber Publishing Company, ISBN-0-8493-0466-0.
25. "Applied Numerical Analysis," C. F. Gerald, Addison-Wesley Publishing Co., 1980, ISBN 0-201-02696-1.
26. "Functional Analysis and Applied Mathematics", L. V. Kantorovich, Usepkhi Mat. Nauk. Vol. 3, pp. 89-185, 1948.
27. "Discrete Variable Methods in Ordinary Differential Equations", P. Henrici, Wiley, New York, 1962.
28. "Convergence Properties of Newton's Method for the Solution of Semiconductor Carrier Transport Equations and Hybrid Solution Techniques for Multidimensional Simulation of VLSI Devices", O. E. Akcasu, Solid-State Electron. Vol. 27, pp. 319-328, April 1984.
29. "Brachistochrone Curve", https://en.wikipedia.org/wiki/Brachistochrone_curve

I claim:
1. A high-altitude non-destructive aerial object takedown system comprising:
   a rocket with a propulsion system;
   a takedown payload embedded with the rocket comprising:
      a first plurality of ballast units releasable from the takedown payload in a substantially circular capture pattern;
      a first plurality of tethers, each tether having a proximal end attached to a corresponding ballast unit and a distal end connected to a takedown payload capture net;
      the capture net with a first plurality equally spaced attachment points formed along a capture net perimeter, with each attachment point connected to a corresponding tether; and,
      a release mechanism associated with each ballast unit selected from the group consisting of a compressed spring, a gas discharge, and an attached ballast rocket.
2. The system of claim 1 wherein the rocket further comprises a reaction control system (RCS) having an input to accept adjustment instructions and an output mechanism controlling the movement of the rocket.
3. The system of claim 2 wherein the rocket further comprises a go-onto-target (GOT) guidance system with signal inputs to accept aerial object altitude, positon, and motion data, and an output to supply the adjustment instructions to the RCS.
4. The system of claim 3 wherein the GOT guidance system is configured to calculate a ballast unit release height between the takedown payload and the aerial object.
5. The system of claim 1 wherein the ballast units are released from the takedown payload at an angle of 135 degrees, or less, with respect to a downward vertical direction.
6. The system of claim 1 wherein the takedown payload further comprises a controller having signal inputs to accept altitude measurements, the controller configured to calculate an altitude decent rate and supply a ballast management signal.
7. The system of claim 6 wherein each ballast unit comprises:
   a receiver to accept the ballast management signal from the takedown payload controller;
   a ballast containment compartment including a default mass of divisible ballast; and,
   a ballast vent to release a measured amount of ballast mass in response to the ballast management signal.
8. The system of claim 7 wherein the capture net has a mass responsive to a combined mass of the ballast units.
9. The system of claim 1 wherein the takedown payload further comprises:
   a deployable parachute attached to the takedown payload configured to diminish an effective capture net mass when the capture net is deployed in the atmosphere.
10. The system of claim 1 wherein the takedown payload has a center axis and further comprises:
   a harpoon aligned along the center axis, releasable downward in response to a harpoon command from a takedown payload controller.
11. The system of claim 1 further comprising a rocket launch mechanism selected from the group consisting of airborne and ground launch.
12. A method for the non-destructive takedown of a high-altitude aerial object, the method comprising:

providing a thrusting rocket enabled with a takedown payload;
the takedown payload acquiring altitude, motion, and position parameters of a high altitude aerial object;
the rocket acquiring a position overlying the aerial object;
the takedown payload releasing a first plurality of ballast units, attached to a capture net, downward in a capture pattern surrounding the aerial object;
in response to releasing the ballast units, covering a top surface of the aerial object with the capture net;
subsequent to covering the top surface of the aerial object with the capture net, determining the aerial object altitude decent rate;
comparing the aerial object altitude decent rate to a desired altitude decent rate;
supplying a ballast management signal in response to the comparison;
combining a mass of each ballast unit with a mass of the aerial object to form a combined mass; and,
in response to the combined mass, decreasing the aerial object altitude.

13. The method of claim 12 wherein the rocket acquiring the position overlying the aerial object includes a go-onto-target (GOT) guidance system accepting aerial object altitude, positon, and motion data, and a reaction control system (RCS) controlling the movement of the rocket in response to signals from the GOT guidance system.

14. The method of claim 13 wherein controlling the movement of the rocket in response to signals from the GOT guidance system includes the GOT guidance system calculating a ballast unit release height between the takedown payload and the aerial object.

15. The method of claim 12 wherein releasing the first plurality of ballast units includes releasing the ballast units from the takedown payload at an angle of 135 degrees, or less, with respect to a downward vertical direction.

16. The method of claim 12 wherein releasing the first plurality of ballast units includes releasing the ballast units using a release mechanism selected from the group consisting of compressed springs, gas discharge, and attached ballast rockets.

17. The method of claim 12 wherein releasing the first plurality of ballast units includes releasing ballast units having a divisible default mass;
the method further comprising:
venting ballast mass from the ballast units in response to the ballast management signal; and,
wherein forming the combined mass includes diminishing the combined mass in response to venting the ballast.

18. The method of claim 12 wherein providing the thrusting rocket with the takedown payload further comprises providing a takedown payload parachute;
the method further comprising:
deploying the parachute in response to comparing the aerial object altitude decent rate to a desired altitude decent rate; and,
wherein forming the combined mass includes diminishing an effective combined mass in response to deploying the parachute.

19. The method of claim 12 wherein providing the thrusting rocket with the takedown payload further comprises providing a takedown payload harpoon;
the method further comprising:
launching the harpoon at an gas inflated balloon aerial object in response to comparing the aerial object altitude decent rate to a desired altitude decent rate; and,
wherein forming the combined mass includes increasing the combined mass in response to the harpoon puncturing the balloon.

20. The method of claim 12 further comprising:
launching the rocket using a rocket launch mechanism selected from the group consisting of airborne and ground launch.

21. A high-altitude non-destructive aerial object takedown system comprising:
a rocket with a propulsion system;
a takedown payload embedded with the rocket comprising:
a first plurality of ballast units releasable from the takedown payload in a substantially circular capture pattern;
a first plurality of tethers, each tether having a proximal end attached to a corresponding ballast unit and a distal end connected to a takedown payload capture net;
the capture net with a first plurality equally spaced attachment points formed along a capture net perimeter, with each attachment point connected to a corresponding tether; and,
a controller having signal inputs to accept altitude measurements, the controller configured to calculate an altitude decent rate and supply a ballast management signal.

22. The system of claim 21 wherein the ballast units are released from the takedown payload at an angle of 135 degrees, or less, with respect to a downward vertical direction.

23. The system of claim 21 wherein the takedown payload further comprises:
a release mechanism associated with each ballast unit selected from the group consisting of a compressed spring, a gas discharge, and an attached ballast rocket.

24. The system of claim 21 wherein each ballast unit comprises:
a receiver to accept the ballast management signal from the takedown payload controller;
a ballast containment compartment including a default mass of divisible ballast; and,
a ballast vent to release a measured amount of ballast mass in response to the ballast management signal.

25. The system of claim 24 wherein the capture net has a mass responsive to a combined mass of the ballast units.

26. The system of claim 21 further comprising a rocket launch mechanism selected from the group consisting of airborne and ground launch.

27. A high-altitude non-destructive aerial object takedown system comprising:
a rocket comprising:
a propulsion system;
a reaction control system (RCS) having an input to accept adjustment instructions and an output mechanism controlling the movement of the rocket;
a go-onto-target (GOT) guidance system configured to calculate a ballast unit release height between the takedown payload and the aerial object, with signal inputs to accept aerial object altitude, positon, and motion data, and an output to supply the adjustment instructions to the RCS;
a takedown payload embedded with the rocket comprising:
a first plurality of ballast units releasable from the takedown payload in a substantially circular capture pattern;

a first plurality of tethers, each tether having a proximal end attached to a corresponding ballast unit and a distal end connected to a takedown payload capture net; and, the capture net with a first plurality equally spaced attachment points formed along a capture net perimeter, with each attachment point connected to a corresponding tether.

28. The system of claim 27 wherein the ballast units are released from the takedown payload at an angle of 135 degrees, or less, with respect to a downward vertical direction.

29. The system of claim 27 wherein the takedown payload further comprises a controller having signal inputs to accept altitude measurements, the controller configured to calculate an altitude decent rate and supply a ballast management signal.

30. The system of claim 27 wherein the takedown payload further comprises:

a release mechanism associated with each ballast unit selected from the group consisting of a compressed spring, a gas discharge, and an attached ballast rocket.

* * * * *